United States Patent
Hardy et al.

(10) Patent No.: US 9,706,857 B2
(45) Date of Patent: *Jul. 18, 2017

(54) PRODUCT SECUREMENT AND MANAGEMENT SYSTEM

(71) Applicant: RTC Industries, Inc., Rolling Meadows, IL (US)

(72) Inventors: Stephen N. Hardy, Wadsworth, OH (US); David S. Breslow, Chicago, IL (US); Gideon Schlessinger, Rolling Meadows, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 658 days.

This patent is subject to a terminal disclaimer.

(21) Appl. No.: 14/172,617

(22) Filed: Feb. 4, 2014

(65) Prior Publication Data

US 2014/0190913 A1    Jul. 10, 2014

Related U.S. Application Data

(63) Continuation-in-part of application No. 13/858,574, filed on Apr. 8, 2013, now Pat. No. 9,526,351, which
(Continued)

(51) Int. Cl.
*H04N 7/18* (2006.01)
*A47F 1/04* (2006.01)
(Continued)

(52) U.S. Cl.
CPC .................. *A47F 1/04* (2013.01); *A47F 1/12* (2013.01); *A47F 1/126* (2013.01); *A47F 3/002* (2013.01);
(Continued)

(58) Field of Classification Search
CPC ..................... H04N 5/23241; H04N 5/23293
(Continued)

(56) References Cited

U.S. PATENT DOCUMENTS

| 309,715 A | 12/1884 | Harper |
| 806,719 A | 12/1905 | Winchel |

(Continued)

FOREIGN PATENT DOCUMENTS

| BE | 906083 A2 | 4/1987 |
| CH | 412251 A | 4/1966 |

(Continued)

OTHER PUBLICATIONS

RTC Industries, Inc v. Display Specialties, Inc., and Fasteners for Retail, Inc., Complaint, Document 1, Case 1:10-cv-02837 filed May 6, 2010.
(Continued)

*Primary Examiner* — Jay Patel
*Assistant Examiner* — Salame Amr
(74) *Attorney, Agent, or Firm* — Banner & Witcoff, Ltd.

(57) ABSTRACT

A merchandising system that improves the merchandising of product by limiting the number and the frequency with which product can be removed from, for example, a merchandising shelf. The merchandising system may include a base configured to support product and a housing configured to engage the base. The housing may comprise a top wall, a first side wall, a second side wall, and a front retaining wall mounted to the base at an angle. The system may further include a spring-urged pusher movably mounted on the base. The system may further include an opening defined by the first side wall and the front retaining wall through which product may be removed. The system may also include the use of over-the-air power to power any of the shelf components.

8 Claims, 78 Drawing Sheets

Related U.S. Application Data is a continuation of application No. 13/544,363, filed on Jul. 9, 2012, now Pat. No. 8,413,823, which is a continuation of application No. 13/230,362, filed on Sep. 12, 2011, now Pat. No. 8,235,227, which is a continuation-in-part of application No. 12/872,721, filed on Aug. 31, 2010, now Pat. No. 8,047,385, which is a continuation-in-part of application No. 12/496,389, filed on Jul. 1, 2009, now Pat. No. 8,113,601, which is a continuation-in-part of application No. 11/858,545, filed on Sep. 20, 2007, now Pat. No. 7,621,409, which is a continuation-in-part of application No. 11/685,530, filed on Mar. 13, 2007, now Pat. No. 7,451,881, and a continuation-in-part of application No. 11/612,210, filed on Dec. 18, 2006, now Pat. No. 7,299,934, which is a continuation of application No. 11/140,023, filed on May 27, 2005, now Pat. No. 7,150,365, which is a continuation-in-part of application No. 11/047,915, filed on Feb. 1, 2005, now Pat. No. 7,661,545.

(60) Provisional application No. 60/782,000, filed on Mar. 13, 2006, provisional application No. 60/541,804, filed on Feb. 3, 2004.

(51) Int. Cl.
  G06Q 10/08    (2012.01)
  G06Q 30/02    (2012.01)
  A47F 1/12     (2006.01)
  A47F 3/00     (2006.01)

(52) U.S. Cl.
  CPC ....... *G06Q 10/087* (2013.01); *G06Q 30/0241* (2013.01)

(58) Field of Classification Search
  USPC .......................................... 348/143
  See application file for complete search history.

(56) References Cited

U.S. PATENT DOCUMENTS

| | | |
|---|---|---|
| 849,590 A | 4/1907 | Bailey |
| 1,156,140 A | 10/1915 | Hair |
| 1,682,580 A | 8/1928 | Pratt |
| 1,703,987 A | 3/1929 | Butler |
| 1,712,080 A | 5/1929 | Kelly |
| 1,713,661 A | 5/1929 | Kemball et al. |
| 1,714,266 A | 5/1929 | Johnson |
| 1,718,249 A | 6/1929 | Morin |
| 1,731,661 A | 10/1929 | Hauenstein |
| 1,734,031 A | 11/1929 | Carlston |
| 1,786,392 A | 12/1930 | Kemp |
| 1,813,713 A | 7/1931 | Selby et al. |
| 1,964,597 A | 6/1934 | Rapellin |
| 1,971,749 A | 8/1934 | Hamilton |
| 1,991,102 A | 2/1935 | Kemaghan |
| 2,057,627 A | 10/1936 | Ferris |
| 2,079,754 A | 5/1937 | Waxgiser |
| 2,085,479 A | 6/1937 | Shaffer et al. |
| 2,110,299 A | 3/1938 | Hinkle |
| 2,111,496 A | 3/1938 | Scriba |
| 2,129,122 A | 9/1938 | Follett |
| 2,185,605 A | 1/1940 | Murphy |
| 2,218,444 A | 10/1940 | Vineyard |
| 2,247,834 A | 7/1941 | Davis, Jr. |
| 2,362,758 A | 11/1944 | Marrow et al. |
| 2,499,088 A | 2/1950 | Brill |
| 2,563,570 A | 2/1950 | Williams |
| 2,516,122 A | 7/1950 | Hughes |
| 2,538,165 A | 1/1951 | Randtke |
| 2,555,102 A | 5/1951 | Anderson |
| 2,629,644 A | 2/1953 | Heys |
| 2,652,154 A | 9/1953 | Stevens |
| 2,670,853 A | 3/1954 | Schneider |
| 2,678,045 A | 5/1954 | Erhard |
| 2,732,952 A | 1/1956 | Skelton |
| 2,738,881 A | 3/1956 | Michel |
| 2,750,049 A | 6/1956 | Hunter |
| 2,767,042 A | 10/1956 | Kesling |
| 2,775,365 A | 12/1956 | Mestman |
| 2,775,501 A | 12/1956 | Kyllo |
| 2,784,872 A | 3/1957 | Lux |
| 2,806,631 A | 9/1957 | Van Vactor |
| 2,828,178 A | 3/1958 | Dahlgren |
| 2,893,596 A | 7/1959 | Gabrielsen |
| 2,918,295 A | 12/1959 | Milner |
| 2,934,212 A | 4/1960 | Jacobson |
| 2,948,403 A | 8/1960 | Vallez |
| 2,964,154 A | 12/1960 | Erickson |
| 2,980,259 A | 4/1961 | Fowlds |
| 2,997,041 A | 8/1961 | Wolske |
| 3,083,067 A | 3/1963 | Vos et al. |
| 3,103,396 A | 9/1963 | Portnoy |
| 3,124,254 A | 3/1964 | Davidson |
| 3,151,576 A | 10/1964 | Patterson |
| 3,161,295 A | 12/1964 | Chesley |
| 3,166,195 A | 1/1965 | Taber |
| 3,285,429 A | 11/1966 | Propst |
| 3,308,961 A | 3/1967 | Chesley |
| 3,308,964 A | 3/1967 | Pistone |
| 3,348,732 A | 10/1967 | Shwarz |
| 3,405,716 A | 10/1968 | Cafiero |
| 3,425,765 A | 2/1969 | Levy |
| 3,452,899 A | 7/1969 | Libberton |
| 3,497,081 A | 2/1970 | Field |
| 3,501,020 A | 3/1970 | Krikorian |
| 3,512,652 A | 5/1970 | Armstrong |
| D219,058 S | 10/1970 | Kaczur |
| 3,550,979 A | 12/1970 | Protzmann |
| 3,575,480 A | 4/1971 | Peisker |
| 3,578,207 A | 5/1971 | Danow |
| 3,579,952 A | 5/1971 | Davies et al. |
| 3,598,246 A | 8/1971 | Galli |
| 3,625,371 A | 12/1971 | Dill |
| 3,652,154 A | 3/1972 | Gebel |
| 3,667,826 A | 6/1972 | Wood |
| 3,698,568 A | 10/1972 | Armstrong |
| 3,709,371 A | 1/1973 | Luck |
| 3,744,865 A | 7/1973 | Syverson |
| 3,751,129 A | 8/1973 | Wright et al. |
| 3,767,083 A | 10/1973 | Webb |
| 3,814,490 A | 6/1974 | Dean et al. |
| 3,815,519 A | 6/1974 | Meyer |
| 3,830,169 A | 8/1974 | Madey |
| 3,836,008 A | 9/1974 | Mraz |
| 3,848,745 A | 11/1974 | Smith |
| 3,868,021 A | 2/1975 | Heinrich |
| 3,870,156 A | 3/1975 | O'Neill |
| 3,942,649 A | 3/1976 | Hugelman et al. |
| 4,007,841 A | 2/1977 | Seipel |
| 4,007,853 A | 2/1977 | Bahneman |
| 4,042,096 A | 8/1977 | Smith |
| 4,095,861 A | 6/1978 | Kachidurian |
| 4,106,668 A | 8/1978 | Gebhardt et al. |
| 4,122,939 A | 10/1978 | Langen |
| 4,130,326 A | 12/1978 | Hornblad |
| 4,160,571 A | 7/1979 | Bigotti |
| 4,269,326 A | 5/1981 | Delbrouck |
| 4,300,693 A | 11/1981 | Spamer |
| 4,303,162 A | 12/1981 | Suttles |
| 4,308,974 A | 1/1982 | Jones |
| 4,314,700 A | 2/1982 | Dylag |
| 4,331,243 A | 5/1982 | Doll |
| 4,351,439 A | 9/1982 | Taylor |
| 4,378,872 A | 4/1983 | Brown |
| 4,437,572 A | 3/1984 | Hoffman |
| 4,448,653 A | 5/1984 | Wegmann |
| 4,454,948 A | 6/1984 | Spamer |
| 4,458,960 A | 7/1984 | Dunst |
| 4,460,096 A | 7/1984 | Ricci |

(56) References Cited

U.S. PATENT DOCUMENTS

| | | | |
|---|---|---|---|
| 4,463,854 A | 8/1984 | MacKenzie |
| 4,467,927 A | 8/1984 | Nathan |
| 4,476,985 A | 10/1984 | Norberg et al. |
| 4,482,066 A | 11/1984 | Dykstra |
| 4,487,024 A | 12/1984 | Fletcher et al. |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,610,491 A | 9/1986 | Freeman |
| 4,615,276 A | 10/1986 | Garabedian |
| 4,620,489 A | 11/1986 | Albano |
| 4,629,072 A | 12/1986 | Loew |
| 4,651,883 A | 3/1987 | Gullett et al. |
| 4,679,684 A | 7/1987 | Glaser |
| 4,682,825 A | 7/1987 | Crosslen |
| 4,685,574 A | 8/1987 | Young et al. |
| 4,705,175 A | 11/1987 | Howard et al. |
| 4,706,821 A | 11/1987 | Kohls et al. |
| 4,724,968 A | 2/1988 | Wombacher |
| 4,729,481 A | 3/1988 | Hawkinson et al. |
| 4,730,741 A | 3/1988 | Jackle, III et al. |
| 4,742,936 A | 5/1988 | Rein |
| 4,744,490 A | 5/1988 | Albright et al. |
| 4,762,235 A | 8/1988 | Howard et al. |
| 4,762,236 A | 8/1988 | Jackle, III et al. |
| 4,768,661 A | 9/1988 | Pfeifer |
| 4,775,058 A | 10/1988 | Yatsko |
| 4,776,472 A | 10/1988 | Rosen |
| 4,790,037 A | 12/1988 | Phillips |
| 4,809,856 A | 3/1989 | Muth |
| 4,811,999 A | 3/1989 | Remington et al. |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,861,121 A | 8/1989 | Gotz |
| 4,881,787 A | 11/1989 | King et al. |
| 4,883,169 A | 11/1989 | Flanagan, Jr. |
| 4,887,737 A | 12/1989 | Adenau |
| 4,899,668 A | 2/1990 | Valiulis |
| 4,901,853 A | 2/1990 | Maryatt |
| 4,901,869 A | 2/1990 | Hawkinson et al. |
| 4,907,707 A | 3/1990 | Crum |
| 4,915,460 A | 4/1990 | Nook et al. |
| 4,934,645 A | 6/1990 | Breslow |
| 4,944,414 A | 7/1990 | Albright |
| 5,012,936 A | 5/1991 | Crum |
| 5,027,957 A | 7/1991 | Skalski |
| 5,082,125 A | 1/1992 | Ninni |
| 5,088,607 A | 2/1992 | Risafi et al. |
| 5,110,192 A | 5/1992 | Lauterbach |
| 5,111,942 A | 5/1992 | Bernardin |
| 5,123,546 A | 6/1992 | Crum |
| 5,131,563 A | 7/1992 | Yablans |
| 5,138,299 A | 8/1992 | Patten et al. |
| 5,148,927 A | 9/1992 | Gebka |
| 5,161,702 A | 11/1992 | Skalski |
| 5,169,221 A | 12/1992 | Wheeler |
| 5,174,470 A | 12/1992 | North et al. |
| 5,178,258 A | 1/1993 | Smalley et al. |
| 5,183,166 A | 2/1993 | Belokin, Jr. et al. |
| 5,190,186 A | 3/1993 | Yablans et al. |
| 5,199,599 A | 4/1993 | Shade |
| 5,203,463 A | 4/1993 | Gold |
| 5,215,199 A | 6/1993 | Bejarano |
| 5,240,126 A | 8/1993 | Foster et al. |
| 5,253,782 A | 10/1993 | Gates et al. |
| 5,255,802 A | 10/1993 | Krinke et al. |
| 5,265,738 A | 11/1993 | Yablans et al. |
| 5,269,597 A | 12/1993 | Yenglin et al. |
| 5,307,941 A | 5/1994 | Siegal |
| 5,316,154 A | 5/1994 | Hajec, Jr. |
| 5,330,058 A | 7/1994 | Rice |
| 5,332,105 A | 7/1994 | Stanfield |
| 5,341,945 A | 8/1994 | Gibson |
| 5,351,839 A | 10/1994 | Beeler et al. |
| 5,366,099 A | 11/1994 | Schmid |
| 5,381,908 A | 1/1995 | Hepp |
| 5,385,266 A | 1/1995 | Pate |
| 5,390,802 A | 2/1995 | Pappagallo et al. |
| 5,392,025 A * | 2/1995 | Figh ...................... G08B 13/14 340/5.3 |
| 5,407,085 A | 4/1995 | Goldring et al. |
| 5,413,229 A | 5/1995 | Zuberbuhler et al. |
| 5,415,297 A | 5/1995 | Klein et al. |
| 5,450,969 A | 9/1995 | Johnson et al. |
| 5,456,370 A | 10/1995 | Goldring et al. |
| 5,458,248 A | 10/1995 | Alain |
| 5,464,105 A | 11/1995 | Mandeltort |
| 5,469,975 A | 11/1995 | Fajnsztajn |
| 5,469,976 A | 11/1995 | Burchell |
| 5,485,928 A | 1/1996 | Felton |
| 5,505,315 A | 4/1996 | Carroll |
| 5,531,159 A | 7/1996 | Stubblefield |
| 5,542,552 A | 8/1996 | Yablans et al. |
| 5,562,217 A | 10/1996 | Salveson et al. |
| 5,605,237 A | 2/1997 | Richardson et al. |
| 5,609,268 A | 3/1997 | Shaw |
| 5,613,621 A | 3/1997 | Gervasi et al. |
| D378,888 S | 4/1997 | Bertilsson |
| 5,615,780 A | 4/1997 | Nimetz et al. |
| 5,634,564 A | 6/1997 | Spamer et al. |
| 5,638,963 A | 6/1997 | Finnelly et al. |
| 5,647,507 A | 7/1997 | Kasper |
| 5,649,641 A | 7/1997 | Campoli |
| 5,665,304 A | 9/1997 | Heinen et al. |
| 5,670,778 A | 9/1997 | Smith |
| 5,673,801 A | 10/1997 | Markson |
| D386,363 S | 11/1997 | Dardashti |
| 5,685,664 A | 11/1997 | Parham et al. |
| 5,685,864 A | 11/1997 | Shanley et al. |
| 5,690,038 A | 11/1997 | Merit et al. |
| 5,730,320 A | 3/1998 | David |
| 5,738,019 A | 4/1998 | Parker |
| 5,740,944 A | 4/1998 | Crawford |
| 5,743,428 A | 4/1998 | Rankin, VI |
| 5,746,328 A | 5/1998 | Beeler et al. |
| 5,753,897 A | 5/1998 | Kasper |
| 5,765,390 A | 6/1998 | Johnson et al. |
| 5,786,341 A | 7/1998 | Prockop et al. |
| 5,788,090 A | 8/1998 | Kajiwara |
| 5,797,487 A | 8/1998 | Young |
| 5,803,276 A | 9/1998 | Vogler |
| 5,826,731 A | 10/1998 | Dardashti |
| 5,829,631 A | 11/1998 | Kasper |
| 5,839,588 A | 11/1998 | Hawkinson |
| 5,848,593 A | 12/1998 | McGrady et al. |
| 5,853,235 A | 12/1998 | Barnes |
| 5,855,281 A | 1/1999 | Rabas |
| 5,855,283 A | 1/1999 | Johnson |
| 5,857,588 A | 1/1999 | Kasper |
| 5,873,473 A | 2/1999 | Pater |
| 5,873,489 A | 2/1999 | Ide et al. |
| 5,878,895 A | 3/1999 | Springs |
| 5,905,653 A | 5/1999 | Higham et al. |
| 5,906,283 A | 5/1999 | Kump et al. |
| 5,918,954 A | 7/1999 | Papadakis et al. |
| 5,938,306 A | 8/1999 | Lambright et al. |
| 5,971,204 A | 10/1999 | Apps |
| 5,987,818 A | 11/1999 | Dabideen |
| 5,992,653 A | 11/1999 | Anderson et al. |
| 6,006,678 A | 12/1999 | Merit et al. |
| 6,012,604 A | 1/2000 | Takahashi et al. |
| 6,041,720 A | 3/2000 | Hardy |
| 6,068,135 A | 5/2000 | Holztrager |
| 6,076,670 A | 6/2000 | Yeranossian |
| 6,082,557 A | 7/2000 | Leahy |
| 6,082,558 A | 7/2000 | Battaglia |
| 6,089,385 A | 7/2000 | Nozawa |
| 6,112,938 A | 9/2000 | Apps |
| 6,129,218 A | 10/2000 | Henry et al. |
| 6,142,317 A | 11/2000 | Merl |

(56) References Cited

U.S. PATENT DOCUMENTS

| | | | |
|---|---|---|---|
| 6,164,491 A | 12/2000 | Bustos et al. |
| 6,173,845 B1 | 1/2001 | Higgins et al. |
| 6,176,558 B1 | 1/2001 | Hlade et al. |
| 6,193,085 B1 | 2/2001 | Nook et al. |
| 6,196,416 B1 | 3/2001 | Seagle |
| 6,209,733 B1 | 4/2001 | Higgins et al. |
| 6,227,385 B1 | 5/2001 | Nickerson |
| 6,234,325 B1 | 5/2001 | Higgins et al. |
| 6,234,326 B1 | 5/2001 | Higgins et al. |
| 6,234,328 B1 | 5/2001 | Mason |
| D445,615 S | 7/2001 | Burke |
| 6,253,954 B1 | 7/2001 | Yasaka |
| 6,311,852 B1 | 11/2001 | Ireland |
| 6,351,964 B1 | 3/2002 | Brancheau et al. |
| 6,357,606 B1 | 3/2002 | Henry |
| 6,378,727 B1 | 4/2002 | Dupuis et al. |
| 6,382,431 B1 | 5/2002 | Burke |
| 6,389,991 B1 | 5/2002 | Morrisson |
| 6,390,307 B1 | 5/2002 | Stelter |
| 6,390,310 B1 | 5/2002 | Insalaco |
| 6,401,942 B1 | 6/2002 | Eckert |
| 6,405,880 B1 | 6/2002 | Webb |
| 6,409,026 B2 | 6/2002 | Watanabe |
| 6,409,027 B1 | 6/2002 | Chang et al. |
| 6,409,028 B2 | 6/2002 | Nickerson |
| 6,428,123 B1 | 8/2002 | Lucht et al. |
| 6,435,353 B2 | 8/2002 | Ryan, Jr. et al. |
| 6,464,089 B1 | 10/2002 | Rankin, VI |
| 6,467,857 B2 | 10/2002 | Hakemann |
| 6,484,891 B2 | 11/2002 | Burke |
| 6,497,326 B1 | 12/2002 | Osawa |
| 6,513,677 B1 | 2/2003 | Sorensen et al. |
| 6,523,664 B2 | 2/2003 | Shaw et al. |
| 6,523,703 B1 | 2/2003 | Robertson |
| 6,527,127 B2 | 3/2003 | Dumontet |
| 6,533,131 B2 | 3/2003 | Bada |
| 6,538,879 B2 | 3/2003 | Jiang |
| D472,411 S | 4/2003 | Burke |
| 6,557,385 B1 | 5/2003 | Shih |
| 6,578,735 B1 | 6/2003 | Mothwurf |
| 6,581,798 B2 | 6/2003 | Liff et al. |
| 6,598,754 B2 | 7/2003 | Weiler |
| 6,622,874 B1 | 9/2003 | Hawkinson |
| 6,631,835 B2 | 10/2003 | Fang |
| 6,651,828 B2 | 11/2003 | Dimattio et al. |
| 6,655,536 B2 | 12/2003 | Jo et al. |
| 6,666,533 B1 | 12/2003 | Stavros |
| D485,699 S | 1/2004 | Mueller et al. |
| 6,735,497 B2 | 5/2004 | Wallace et al. |
| 6,745,906 B1 | 6/2004 | Nagel |
| 6,749,071 B2 | 6/2004 | Caterinacci |
| 6,769,552 B1 | 8/2004 | Thalenfeld |
| 6,772,888 B2 | 8/2004 | Burke |
| 6,786,341 B2 | 9/2004 | Stinnett et al. |
| 6,811,236 B1 | 11/2004 | Spong et al. |
| 6,820,754 B2 | 11/2004 | Ondrasik |
| 6,824,009 B2 | 11/2004 | Hardy |
| 6,830,157 B2 | 12/2004 | Robertson et al. |
| 6,851,770 B2 | 2/2005 | Canedy et al. |
| 6,854,814 B1 | 2/2005 | Gardner et al. |
| 6,866,156 B2 | 3/2005 | Nagel et al. |
| 6,866,352 B2 | 3/2005 | Fujii et al. |
| 6,867,685 B1 * | 3/2005 | Stillwagon ............... E05B 5/003 |
| | | 292/341.16 |
| 6,886,699 B2 | 5/2005 | Johnson et al. |
| 6,889,854 B2 | 5/2005 | Burke |
| 6,923,330 B1 | 8/2005 | Nagel |
| 6,929,179 B2 | 8/2005 | Fulcher et al. |
| 6,948,900 B1 | 9/2005 | Neuman |
| 6,955,269 B2 | 10/2005 | Menz |
| 6,964,235 B2 | 11/2005 | Hardy |
| 6,974,041 B2 | 12/2005 | Salemi |
| 7,016,861 B2 | 3/2006 | Mothwurf |
| 7,028,852 B2 | 4/2006 | Johnson et al. |
| 7,093,546 B2 | 8/2006 | Hardy |
| 7,097,047 B2 | 8/2006 | Lee et al. |
| 7,100,792 B2 | 9/2006 | Hunter et al. |
| 7,111,914 B2 | 9/2006 | Avendano |
| 7,114,606 B2 | 10/2006 | Shaw et al. |
| 7,150,365 B2 | 12/2006 | Hardy et al. |
| 7,152,536 B2 | 12/2006 | Hardy |
| 7,195,123 B2 | 3/2007 | Roslof et al. |
| 7,198,340 B1 | 4/2007 | Ertz |
| 7,201,281 B1 | 4/2007 | Welker |
| 7,216,770 B2 | 5/2007 | Mueller et al. |
| 7,258,247 B2 | 8/2007 | Marquez |
| 7,299,934 B2 | 11/2007 | Hardy et al. |
| 7,357,469 B2 | 4/2008 | Ertz |
| 7,389,886 B2 | 6/2008 | Hardy et al. |
| 7,395,938 B2 | 7/2008 | Merit et al. |
| 7,424,957 B1 | 9/2008 | Luberto |
| 7,451,881 B2 | 11/2008 | Hardy et al. |
| 7,458,473 B1 | 12/2008 | Mason |
| 7,497,342 B2 | 3/2009 | Hardy |
| 7,500,571 B2 | 3/2009 | Hawkinson |
| 7,533,784 B2 | 5/2009 | Vlastakis et al. |
| 7,536,752 B2 | 5/2009 | Laursen |
| 7,614,350 B2 | 11/2009 | Tuttle et al. |
| 7,621,409 B2 | 11/2009 | Hardy et al. |
| 7,641,057 B2 | 1/2010 | Mueller et al. |
| 7,641,072 B1 | 1/2010 | Vlastakis et al. |
| 7,661,545 B2 | 2/2010 | Hardy et al. |
| 7,681,744 B2 | 3/2010 | Johnson |
| 7,686,185 B2 | 3/2010 | Zychinski |
| 7,703,614 B2 | 4/2010 | Schneider et al. |
| 7,775,613 B2 | 8/2010 | Williams |
| 7,784,623 B2 | 8/2010 | Mueller et al. |
| 7,815,060 B2 | 10/2010 | Iellimo |
| 7,823,734 B2 | 11/2010 | Hardy |
| 7,828,158 B2 | 11/2010 | Colelli et al. |
| 7,891,503 B2 | 2/2011 | Hardy |
| 7,896,172 B1 | 3/2011 | Hester |
| 7,934,607 B2 | 5/2011 | Henderson et al. |
| 7,934,609 B2 | 5/2011 | Alves et al. |
| 7,980,417 B2 | 7/2011 | Riley |
| 8,016,139 B2 | 9/2011 | Hanners et al. |
| 8,047,385 B2 | 11/2011 | Hardy |
| 8,113,360 B2 | 2/2012 | Olson |
| 8,177,076 B2 | 5/2012 | Rataiczak, III et al. |
| 8,215,520 B2 | 7/2012 | Miller et al. |
| 8,234,752 B2 | 8/2012 | Anderson |
| 8,312,999 B2 | 11/2012 | Hardy |
| 8,322,544 B2 | 12/2012 | Hardy |
| 8,342,340 B2 | 1/2013 | Rataiczak, III et al. |
| 8,353,425 B2 | 1/2013 | Lockwood et al. |
| 8,376,154 B2 | 2/2013 | Sun |
| 8,386,075 B2 | 2/2013 | Lockwood et al. |
| 8,426,651 B2 | 4/2013 | Choi et al. |
| 8,485,391 B2 | 7/2013 | Vlastakis et al. |
| 8,657,126 B1 | 2/2014 | Loftin et al. |
| 8,662,325 B2 | 3/2014 | Davis et al. |
| 8,684,227 B2 | 4/2014 | Richardson et al. |
| 8,739,984 B2 | 6/2014 | Hardy |
| 8,844,431 B2 | 9/2014 | Davis et al. |
| 8,978,904 B2 | 3/2015 | Hardy |
| 9,289,078 B2 | 3/2016 | Hardy |
| 9,375,100 B2 | 6/2016 | Dipaolo et al. |
| 2001/0010302 A1 | 8/2001 | Nickerson |
| 2001/0010541 A1 | 8/2001 | Fernandez et al. |
| 2001/0017284 A1 | 8/2001 | Watanabe |
| 2001/0020606 A1 | 9/2001 | Battaglia et al. |
| 2002/0027115 A1 | 3/2002 | Gay et al. |
| 2002/0036178 A1 | 3/2002 | Tombu |
| 2002/0084280 A1 | 7/2002 | Haven et al. |
| 2002/0108916 A1 | 8/2002 | Nickerson |
| 2002/0148794 A1 | 10/2002 | Marihugh |
| 2002/0170866 A1 | 11/2002 | Johnson et al. |
| 2003/0000956 A1 | 1/2003 | Maldonado |
| 2003/0010732 A1 | 1/2003 | Burke |
| 2003/0029824 A1 | 2/2003 | Weiler |
| 2003/0057167 A1 | 3/2003 | Johnson et al. |
| 2003/0061973 A1 | 4/2003 | Bustos |
| 2003/0062999 A1 | 4/2003 | Saleh et al. |
| 2003/0066811 A1 | 4/2003 | Dimattio et al. |

(56) References Cited

U.S. PATENT DOCUMENTS

| | | |
|---|---|---|
| 2003/0085187 A1 | 5/2003 | Johnson et al. |
| 2003/0089731 A1 | 5/2003 | Mayer et al. |
| 2003/0106867 A1 | 6/2003 | Caterinacci |
| 2003/0141265 A1 | 7/2003 | Jo et al. |
| 2003/0150829 A1 | 8/2003 | Linden et al. |
| 2003/0209955 A1 | 11/2003 | Canedy et al. |
| 2003/0217980 A1 | 11/2003 | Johnson et al. |
| 2004/0040975 A1 | 3/2004 | Hunter et al. |
| 2004/0060944 A1 | 4/2004 | Gervasi |
| 2004/0104239 A1 | 6/2004 | Black et al. |
| 2004/0118795 A1 | 6/2004 | Burke |
| 2004/0140276 A1 | 7/2004 | Waldron |
| 2004/0140278 A1 | 7/2004 | Mueller et al. |
| 2004/0140279 A1 | 7/2004 | Mueller et al. |
| 2004/0178156 A1 | 9/2004 | Knorring et al. |
| 2004/0201471 A1 | 10/2004 | Primm et al. |
| 2004/0232092 A1 | 11/2004 | Cash |
| 2004/0233284 A1 | 11/2004 | Lesesky et al. |
| 2004/0245197 A1 | 12/2004 | McElvaney |
| 2005/0029283 A1 | 2/2005 | Pedigo |
| 2005/0035858 A1 | 2/2005 | Liu |
| 2005/0040123 A1 | 2/2005 | Ali |
| 2005/0056602 A1 | 3/2005 | Hardy |
| 2005/0073389 A1 | 4/2005 | Chandley |
| 2005/0077259 A1 | 4/2005 | Menz |
| 2005/0092702 A1 | 5/2005 | Nagel |
| 2005/0098515 A1 | 5/2005 | Close |
| 2005/0139560 A1* | 6/2005 | Whiteside ............... A47F 5/005 211/119.003 |
| 2005/0161420 A1 | 7/2005 | Hardy et al. |
| 2005/0166806 A1 | 8/2005 | Hardy |
| 2005/0168345 A1 | 8/2005 | Swafford et al. |
| 2005/0189369 A1 | 9/2005 | Vlastakis et al. |
| 2005/0194396 A1 | 9/2005 | Marquez |
| 2005/0199565 A1 | 9/2005 | Richter et al. |
| 2005/0218094 A1 | 10/2005 | Howerton et al. |
| 2005/0279722 A1 | 12/2005 | Ali |
| 2005/0286700 A1 | 12/2005 | Hardy |
| 2006/0049122 A1 | 3/2006 | Mueller et al. |
| 2006/0086680 A1 | 4/2006 | Burke |
| 2006/0131231 A1 | 6/2006 | You et al. |
| 2006/0163272 A1 | 7/2006 | Gamble |
| 2006/0186064 A1 | 8/2006 | Merit et al. |
| 2006/0186066 A1 | 8/2006 | Johnson et al. |
| 2006/0237381 A1 | 10/2006 | Lockwood et al. |
| 2006/0240398 A1 | 10/2006 | Hardy et al. |
| 2007/0068885 A1 | 3/2007 | Busto et al. |
| 2007/0080123 A1 | 4/2007 | Mason |
| 2007/0108146 A1 | 5/2007 | Nawrocki |
| 2007/0138114 A1 | 6/2007 | Dumontet |
| 2007/0175839 A1 | 8/2007 | Schneider et al. |
| 2007/0193971 A1 | 8/2007 | Hardy et al. |
| 2007/0194037 A1 | 8/2007 | Close |
| 2007/0278164 A1 | 12/2007 | Lang et al. |
| 2007/0283615 A1 | 12/2007 | Vlastakis et al. |
| 2008/0006647 A1 | 1/2008 | Hunter et al. |
| 2008/0011765 A1 | 1/2008 | Marquez |
| 2008/0061015 A1 | 3/2008 | Hardy et al. |
| 2008/0135507 A1 | 6/2008 | Hardy et al. |
| 2008/0142458 A1 | 6/2008 | Medcalf |
| 2008/0156752 A1 | 7/2008 | Bryson et al. |
| 2008/0245811 A1 | 10/2008 | Colelli et al. |
| 2008/0283477 A1 | 11/2008 | Wamsley et al. |
| 2008/0302741 A1 | 12/2008 | Pail |
| 2008/0314847 A1 | 12/2008 | Colelli |
| 2009/0020548 A1 | 1/2009 | VanDruff |
| 2009/0084812 A1 | 4/2009 | Kirschner |
| 2009/0101606 A1 | 4/2009 | Olson |
| 2009/0184130 A1 | 7/2009 | Miller et al. |
| 2009/0321373 A1 | 12/2009 | Hardy |
| 2010/0072152 A1 | 3/2010 | Kim |
| 2010/0107670 A1 | 5/2010 | Kottke et al. |
| 2010/0108624 A1 | 5/2010 | Sparkowski |
| 2010/0108625 A1 | 5/2010 | Meers et al. |
| 2010/0133214 A1 | 6/2010 | Evans |
| 2010/0176075 A1 | 7/2010 | Nagel et al. |
| 2010/0200526 A1 | 8/2010 | Barkdoll |
| 2010/0206829 A1 | 8/2010 | Clements et al. |
| 2010/0252519 A1 | 10/2010 | Hanners et al. |
| 2010/0258513 A1 | 10/2010 | Meyer et al. |
| 2010/0276383 A1 | 11/2010 | Hardy |
| 2010/0280655 A1 | 11/2010 | Wilson et al. |
| 2011/0174750 A1 | 7/2011 | Poulokefalos |
| 2011/0220597 A1 | 9/2011 | Sherretts et al. |
| 2011/0304316 A1 | 12/2011 | Hachmann et al. |
| 2012/0048817 A1 | 3/2012 | Green et al. |
| 2012/0228242 A1 | 9/2012 | Vogler et al. |
| 2013/0037562 A1 | 2/2013 | Close |
| 2014/0034592 A1 | 2/2014 | Hardy |
| 2014/0305891 A1 | 10/2014 | Vogler et al. |
| 2014/0360953 A1 | 12/2014 | Pichel |
| 2015/0090675 A1 | 4/2015 | Vosshernrich |

FOREIGN PATENT DOCUMENTS

| | | |
|---|---|---|
| DE | 697994 C | 10/1940 |
| DE | 969003 C | 4/1958 |
| DE | 1819158 U | 10/1960 |
| DE | 2002720 A1 | 7/1971 |
| DE | 7311113 U | 8/1973 |
| DE | 2232398 A1 | 1/1974 |
| DE | 2825724 C3 | 5/1981 |
| DE | 8308485 U1 | 9/1983 |
| DE | 3211880 A1 | 10/1983 |
| DE | 8426651 U1 | 2/1985 |
| DE | 8520125 | 1/1986 |
| DE | 19529926 C2 | 7/1997 |
| DE | 29902688 U1 | 7/1999 |
| DE | 20 2004 007373 U1 | 9/2005 |
| DE | 10259397 B4 | 3/2006 |
| EP | 0004921 A1 | 10/1979 |
| EP | 0018003 A2 | 10/1980 |
| EP | 0176209 A2 | 4/1986 |
| EP | 0224107 A2 | 6/1987 |
| EP | 270016 A2 | 6/1988 |
| EP | 337340 A3 | 5/1990 |
| EP | 398500 A1 | 11/1990 |
| EP | 0408400 A1 | 1/1991 |
| EP | 0587059 A2 | 3/1994 |
| EP | 454586 B1 | 7/1995 |
| EP | 986980 A1 | 3/2000 |
| EP | 779047 B1 | 4/2000 |
| EP | 1174060 A1 | 1/2002 |
| EP | 1256296 A2 | 11/2002 |
| EP | 1395152 A1 | 3/2004 |
| EP | 979628 B1 | 4/2004 |
| EP | 1462034 B1 | 11/2004 |
| EP | 1510156 A2 | 3/2005 |
| EP | 1806076 A2 | 7/2007 |
| EP | 1857021 A2 | 11/2007 |
| EP | 2598001 A1 | 6/2013 |
| FR | 2385365 B1 | 6/1982 |
| FR | 2526338 A1 | 11/1983 |
| FR | 2617385 A1 | 1/1989 |
| FR | 2859364 A1 | 3/2005 |
| GB | 740311 A | 11/1955 |
| GB | 881700 A | 11/1961 |
| GB | 1082150 A | 9/1967 |
| GB | 1088654 A | 10/1967 |
| GB | 2027339 B | 8/1982 |
| GB | D2037553 | 7/1994 |
| GB | 2281289 A | 3/1995 |
| GB | 2290077 A | 12/1995 |
| GB | 2297241 A | 7/1996 |
| GB | 2283407 B | 10/1997 |
| GB | 2392667 A | 3/2004 |
| GB | 2392667 B | 11/2004 |
| GB | 2386116 B | 12/2005 |
| JP | 54168195 | 11/1979 |
| JP | 56-71857 U | 6/1981 |
| JP | 59218113 | 8/1984 |
| JP | 62060521 A | 3/1987 |
| JP | 6329463 | 2/1988 |
| JP | 02191413 | 7/1990 |

(56) References Cited

FOREIGN PATENT DOCUMENTS

| | | |
|---|---|---|
| JP | 6-38735 | 5/1994 |
| JP | 61-71592 A | 6/1994 |
| JP | 6202945 | 7/1994 |
| JP | 09-135755 A | 5/1997 |
| JP | H10137082 | 5/1998 |
| JP | 10-159415 A | 6/1998 |
| JP | 10-211063 A | 8/1998 |
| JP | 10-151047 | 9/1998 |
| JP | 11-346879 A | 12/1999 |
| JP | H11342054 A | 12/1999 |
| JP | 2000157378 A | 6/2000 |
| JP | 2000350642 A | 12/2000 |
| JP | 2001104117 A | 4/2001 |
| JP | 2002-306289 A | 10/2002 |
| JP | 2002-315660 A | 10/2002 |
| JP | 2003-204846 A | 7/2003 |
| JP | 2003210286 A | 7/2003 |
| JP | 2007-527281 A | 9/2007 |
| KR | 1986-2391 | 9/1986 |
| KR | 2000-002286 | 2/2000 |
| KR | 0223463 | 5/2001 |
| NL | 106617 A | 11/1963 |
| RU | 2192770 C1 | 11/2002 |
| SE | 394537 B | 6/1977 |
| SU | 1600615 A3 | 10/1990 |
| WO | 91/15141 A1 | 10/1991 |
| WO | 0030503 | 6/2000 |
| WO | 0071004 A1 | 11/2000 |
| WO | 02/091885 A1 | 11/2002 |
| WO | 03005862 A2 | 1/2003 |
| WO | 03/013316 | 2/2003 |
| WO | 03/032775 | 4/2003 |
| WO | 2004/028311 A1 | 4/2004 |
| WO | 2006019947 A2 | 2/2006 |
| WO | 2012016193 A1 | 2/2012 |

OTHER PUBLICATIONS

*RTC Industries, Inc.* v. *Fasteners for Retail, Inc.,* Complaint, Document 1, Case 1:10-cv-02653 Filed Apr. 29, 2010.
*RTC Industries, Inc.* v. *Marketing Impact Limited,* Complaint, Case 1:10-cv-06365 Document # 1 Filed Oct. 5, 2010 p. 1 of 7, Page ID #: 1.
*RTC Industrices, Inc.* v. *Displays Plus, Inc.,* Complaint Case: 1:10-cv-06122 Document #:1 Filed: Sep. 24, 2010 p. 1 of 8, Page ID #: 1.
Correspondence received with AU Application No. 2010266303 on Jun. 5, 2012.
Dec. 12, 2015—(EP) Office Action—App 15179567.1.
Feb. 2, 2015—(AU) Office Action—App No. 2010266303—Eng Tran.
Nov. 27, 2015—(US) Non-Final Office Action—U.S. Appl. No. 13/858,574.
*RTC Industries, Inc.,* v. *Fasteners for Retail, Inc., and SuperValu, Inc. d/b/a Cub Foods,* Answer of Defendant Fasteners for Retail, Inc., Civil Action No. 05 C 6940, Document 20, filed Jan. 18, 2006.
*RTC Industries, Inc.,* v. *Fasteners for Retail, Inc., and SuperValu, Inc. d/b/a Cub Foods,* Stipulation of Dismissal, Civil Action No. 05 C 6940, Apr. 2006.
*RTC Industries, Inc.,* v. *Henschei-Steinau, Inc.,* Complaint, Case: 1:10-cv-07460 Document #:1 Filed Nov. 19, 2010.
Vue 3040 Sanden; Apr. 2005.
*RTC Industries, Inc.,* v. *HMG Worldwide Corporation,* Complaint, Civil Action No. DOC 3300, dated May 31, 2000.
*RTC Industries, Inc.,* v. *William Merit & Associates, Inc.,* Index of Exhibits, Civil Action No. 04 C 1254, dated Jun. 18, 2004.
*RTC Industries, Inc.,* v. *William Merit & Associates, Inc.,* Notice of RTC Industries, Inc.'s Motion for Leave to File its Sur-Reply to William Merit's Motion for Partial Summary Judgment, Civil Action No. 04 C 1254, dated Jul. 6, 2004.
*RTC Industries, Inc.,* v. *William Merit & Associates, Inc.,* RTC Industries, Inc.'s Memorandum in Opposition to William Merit & Associates' Motion for Partial Summary Judgment, Civil Action No. 04 C 1254, dated Jun. 18, 2004.
*RTC Industries, Inc.* v. *Fasteners for Retail Inc.,* Plaintiff RTC Industries Inc.'s Complaint, Civil Action No. 03C 3137, dated May 12, 2003.
*RTC Industries, Inc.* v. *Fasteners for Retail, Inc. and CVS Pharmacy, Inc.,* Defendants' Opposition to Plaintifrs Motion to Modify and Temporarily Quash Five Subpoenas for Violation of Federal Rule of Civil Procedure 45, Case No. 03C3137, dated Dec. 10, 2003.
*RTC Industries, Inc.* v. *Fasteners for Retail, Inc. and CVS Pharmacy, Inc.,* to Vulcan Spring & Mfg. Co., Subpoena in a Civil Case, Case No. 03C 3137 N.D. Illinois, dated Oct. 28, 2003.
*RTC Industries, Inc.* v. *HMG Worldwide Corporation,* Amended Complaint, dated Jan. 19, 2001.
*RTC Industries, Inc.* v. *HMG Worldwide Corporation,* Notice of Motion, Civil Action No. 00 Civ. 3300 (JHL), dated Feb. 22, 2001.
*RTC Industries, Inc.* v. *HMG Worldwide Corporation,* RTC's Reply to HMG Worldwide Corporation's Amended counterclaims, Civil Action No. 00 CV 3300, dated Mar. 7, 2001.
*RTC Industries, Inc.* v. *Semasys, Inc., and Uni-Sun, Inc.,* Complaint, Civil Action No. 04C 4081, dated Jun. 17, 2004.
*RTC Industries, Inc.* v. *William Merit & Associates, Inc.* RTC's Response to Defendant's Evidentiary Objections to RTC Industries, Inc.'s Memorandum in Opposition to William Merit & Associates' Motion for Partial Summary Judgment, Civil Action No. 04 C 1254, dated Jul. 6, 2004.
*RTC Industries, Inc.* v. *William Merit & Associates, Inc.,* Complaint, Civil Action No. 04C 1254, dated Feb. 18, 2004.
*RTC Industries, Inc.* v. *William Merit & Associates, Inc.,* Declaration of William Merit in Support of Defendant's Motion for Partial Summary Judgment that Claims 1-8 of U.S. Pat. No. 4,830,201 are Not Infringed, Civil Action No. 04 C 1254, dated Apr. 29, 2004.
*RTC Industries, Inc.* v. *William Merit & Associates, Inc.,* Defendant's Notice of Motion for Leave to File Memorandum in Support of Motion for Partial Summary Judgment in Excess of Page Limit, Civil Action No. 04 C 1254, dated Apr. 29, 2004.
*RTC Industries, Inc.* v. *William Merit & Associates, Inc.,* Defendant's Notice of Motion for Partial Summary Judgment of Non-Infringement that Claims 1-8 of U.S. Pat. No. 4,830,201 are Not Infringed, Civil Action No. 04C 1254, dated Apr. 29, 2004.
*RTC Industries, Inc.* v. *William Merit & Associates, Inc.,* Evidentiary Objections to RTC Industries, Inc.'s Memorandum in Opposition to William Merit & Associates' Motion for Partial Summary Judgment, Civil Action No. 04 C 1254, dated Jul. 2, 2004.
*RTC Industries, Inc.* v. *William Merit & Associates, Inc.,* Exhibits and Declarations in Support of William Merit & Associates, Inc.'s Reply to RTC Industries, Inc.'s Memorandum in Opposition to William Merit & Associates' Motion for Partial Summary Judgment, Civil Action No. 04 C 1254, dated Jul. 2, 2004.
*RTC Industries, Inc.* v. *William Merit & Associates, Inc.,* Memorandum Opinion, Civil Action No. 04 C 1254, dated Jul. 15, 2004.
*RTC Industries, Inc.* v. *William Merit & Associates, Inc.,* Notice of Filing of Additional Exhibit (The Chesley Patent) to RTC Industries, Inc.'s Memorandum in Opposition to William Merit & Associates' Motion for Partial Summary Judgment, Civil Action No. 04 C 1254, dated Jun. 22, 2004.
*RTC Industries, Inc.* v. *William Merit & Associates, Inc.,* William Merit & Associates Inc.'s Reply to RTC Industries, Inc.'s Memorandum in Opposition to William Merit & Associates' Motion for Partial Summary Judgment, dated Jul. 2, 2004.
*RTC Industries, Inc.* v. *William Merit & Associates, Inc.,* RTC Industries, Inc.'s Responses to Defendant William Merit & Associates, Inc.'s First Set of Requests for Admission to Plaintiff RTC Industries, Inc., Civil Action No. 04 C 1254,dated Jun. 1, 2004.
*RTC Industries, Inc.,* v. *William Merit & Associates, Inc.,* RTC Industries, Inc.'s Response to William Merit & Associates Statement under Local Rule 56.1 of Material Facts to Which There is No

(56) References Cited

OTHER PUBLICATIONS

Genuine Issue and Statement of Additional Facts that Require the Denial of Summary Judgment, Civil Action No. 04 C 1254, dated Jun. 18, 2004.
*RTC Industries, Inc.,* v. *William Merit & Associates, Inc.,* RTC Industries, Inc.'s Sur-Reply to William Merit's Motion for Partial Summary Judgment, Civil Action No. 04 C 1254, dated Jul. 6, 2004.
*RTC Industries, Inc.,* v. *William Merit & Associates, Inc.,* William Merit & Associates' Reply to RTC Industries, Inc.'s Response to William Merit & Associates' Statement under Local Rule 56.1 of Material Facts to Which There is No Genuine Issue and Statement of Additional Facts that Require the Denial of Summary Judgment, Civil Action No. 04 C 1254, dated Jul. 2, 2004.
*RTC Industries, Inc.,* v. *William Merit & Associates,* William Merit & Associates, Inc.'s Statement Under Local Rule 56.1 of Material Facts to Which There is No Genuine Issue, Civil Action No. 04 C 1254, dated Apr. 29, 2004.
*RTC Ind* v. *William Merit & Assoc.,* United States District Court Northern District of Illinois (Chicago), Case #:1 :04-cv-01254, dated Feb. 18, 2004.
*RTC* vs. *Fasteners for Retail,* Case No. 05C 6940, Document No. 26, filed Apr. 25, 2006.
May 10, 2013—(EP) Supplementary European Search Report—App 07758290.
*VIDPRO International Inc.* v. *RTC Industries, Inc.,* U.S. District Court Northern District of Texas (Dallas), Case #:3:95-cv-01055-G, Original Complaint, dated Jun. 2, 1995.
<http://ers.rtc.com/SRSFiles/SRS_Flyer_ProfitPusher.pdf;> 2006.
<http://web.archive.org/web/20070516135906/http://www.triononline.com/productlines/wonderBar.php;> May 2007.
<http://www.displaypeople.com/pdf/BOX_TO_SHELF_SELL_SHEET_Jan_19_V3.pdf.>, Jan. 17, 2013.
<http://www.ffr-dsi.com/sell-sheets/Power%20Zone%20Trak-Set%20Self-facing%20System.pdf.>, Jan. 17, 2013.
<http://www.HL-display.sk/eng/Catalogue2005/Optimal-eng.pdf;> 2005.
<http://www.lpportal.com/feature-articles/item/15-product-protection%E2%80%94beyond-eas.html;> Jan. 17, 2013.
<http://www.posexpert.pl/public/files/PDF/Zarz%C4%85dzanie%20p%C3%B3%C5%82k%C4%85%20(ang.).pdf; 2006.
<http://www.postuning.de/fileadmin/PDF-Downloads/Prospekte/EN_ePusher.pdf:> Feb. 2005.
<http://www.postuning.de/fileadmin/PDF-Downloads/Prospekte/EN_Tabak.pdf;> 2006.
<http://www.storereadysolutions.com/srs.nsf/t_rinc/A56F52CF98E12B9386257449006D11DD!OpenDocument;> Jan. 17, 2013.
<http://www.triononline.com/pdf/ExpWTray.pdf.> Jan. 17, 2013.

<http://www.triononline.com/trionshelfworks/sw2.php;> Jan. 17, 2013.
FFR Yellow PagesÂ® 2003 Product Catalog, "Merchandising Ideas Made Easy for Every Retail Environment", Cover pp. 9-11, 48-49, 52-58, Back Cover.
http://www.posexpert.pl/public/files/PDF/Popychacze%20produkt%C3%B3w.pdf; Sep. 2006.
Feb. 20, 2008—(WO) International Search Report—App PCT/US2007/063730.
*RTC Ind. Inc.* v. *Fasteners for Retail,* Minute Order of Dec. 12, 2003 by Honorable Joan B. Gottschall, Case No. 1:03-cv-03137.
*RTC Ind.* v. *Display Specialties,* United States District Court Northern District of Illinois, Complaint of May 12, 2004, Case No. 1:04-cv-03370.
*RTC Ind.* v. *Fasteners for Retail, et al.,* United States District Court Northern District of Illinois (Chicago), Case #:1:03-cv-03137, Civil Docket, dated May 12, 2003.
*RTC Ind.* v. *Fasteners for Retail, et al.,* United States District Court Northern District of Illinois (Chicago), Case #:1:05-cv-06940, Complaint, dated Dec. 8, 2005.
*RTC Ind.* v. *HMG Worldwide Corp.,* United States District Court Northern District of Illinois (Chicago), Case #:1:00-cv-03300, Amended Complaint, dated Jan. 19, 2001.
*RTC Ind.* v. *Semasys Inc., et al.* United States District Court Northern District of Illinois (Chicago), Case #:1:04-cv-04081, Complaint, dated Jun. 17, 2004.
*RTC Industries, Inc.* v. *Display Specialties, Inc.,* Complaint, Civil Action No. 04C 3370, dated May 12, 2004.
*RTC Industries, Inc.* v. *Fasteners for Retail Inc., and CVS Corporation,* Notice of Motion to Modify and Temporarily Quash Five Subpoenas for Violation of Federal Rule of Civil Procedure 45, Civil Action No. 03C 3137, dated Dec. 18, 2003.
*RTC Industries, Inc.* v. *Fasteners for Retail Inc., and CVS Corporation,* Reply, Civil Action No. 03C 3137, dated Sep. 17, 2003.
*RTC Industries, Inc.* v. *Fasteners for Retail Inc., and CVS Corporation,* RTC Industries' Reply to Defendants' Opposition to RTC's Motion to Modify and Temporarily Quash Five Subpoenas for Violation of Federal Rule of Civil Procedure 45, Civil Action No. 03C 3137, dated Dec. 11, 2003.
*RTC Industries, Inc.* v. *Fasteners for Retail Inc., and CVS Pharmacy, Inc.,* to Rexam Beauty and Closures, Inc., Subpoena in a Civil Case, Case No. 03C 3137 N.D. Illinois, dated Nov. 11, 2003.
*RTC Industries, Inc.,* v. *Fasteners for Retail Inc., and CVS Corporation,* Amended Complaint, Civil Action No. 03C 3137, dated Aug. 6, 2003.
*RTC Industries, Inc.,* v. *Fasteners for Retail, Inc. and SuperValu, Inc. d/b/a Cub Foods,* Answer of Defendant Fasteners for Retail, Inc., Civil Action No. 05 C 6940, Document 20, filed Jan. 18, 2006.
Office Action dated May 20, 2014 for Japanese Patent Application No. 2012-518597, 3 pages.

\* cited by examiner

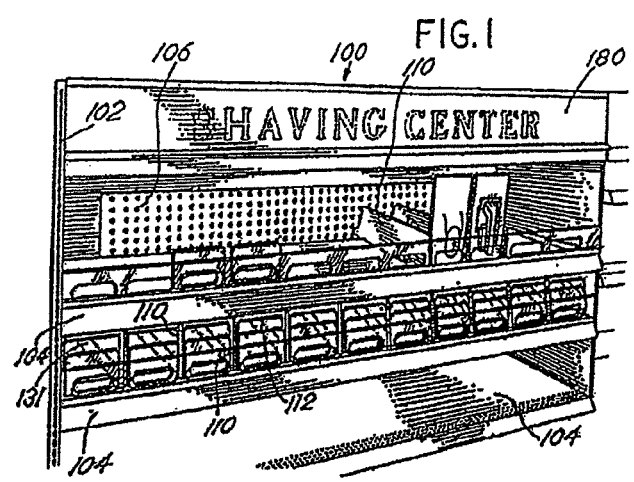
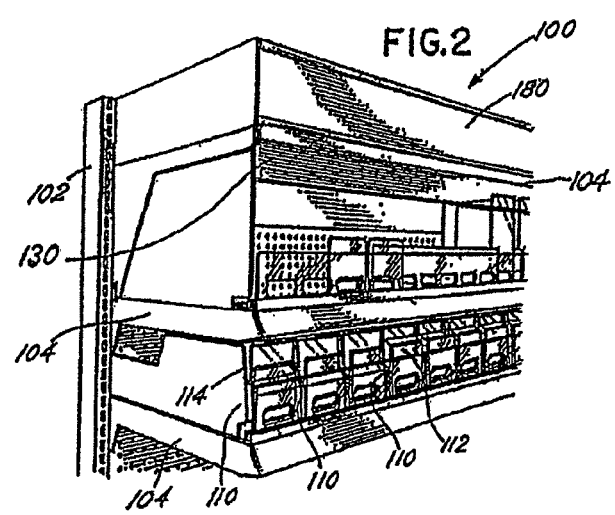

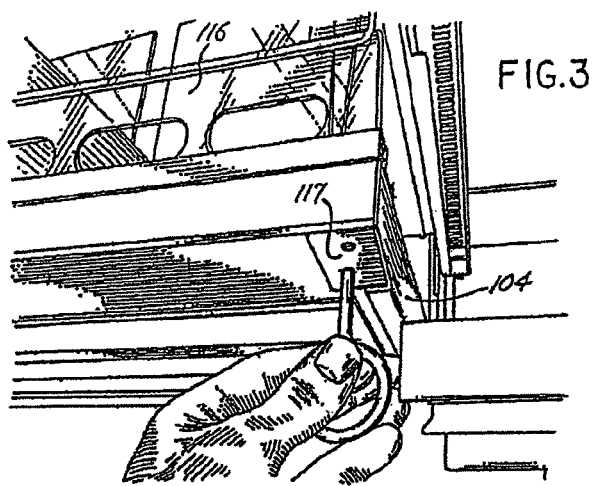
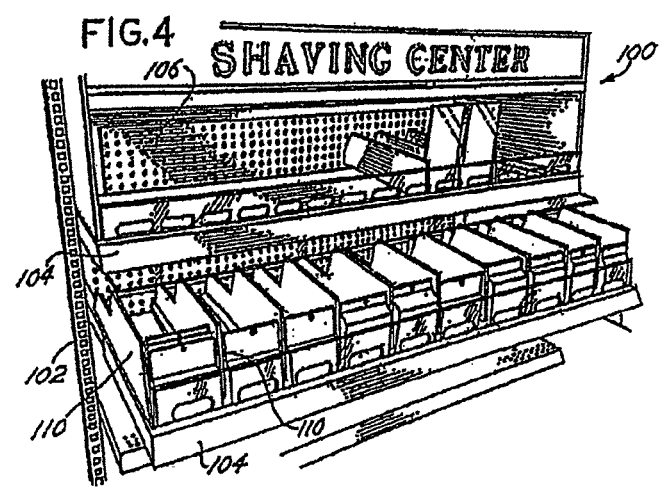

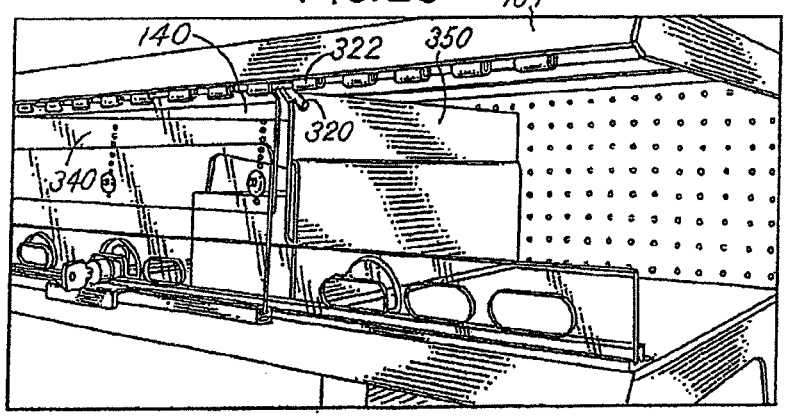
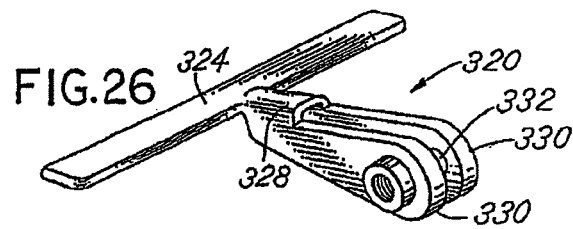
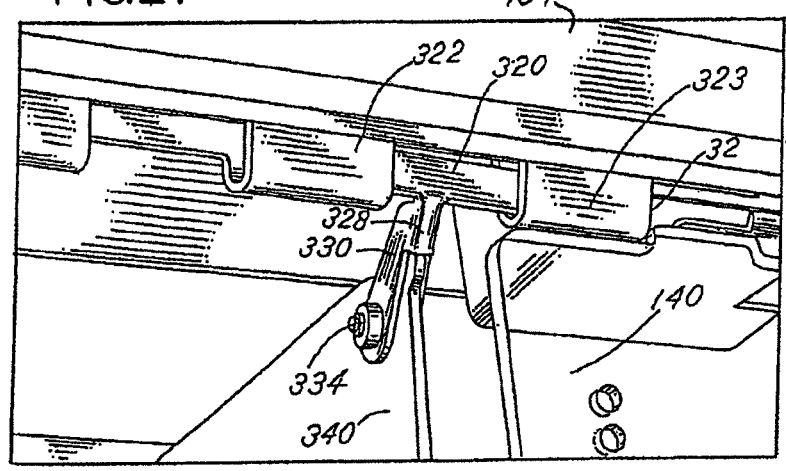

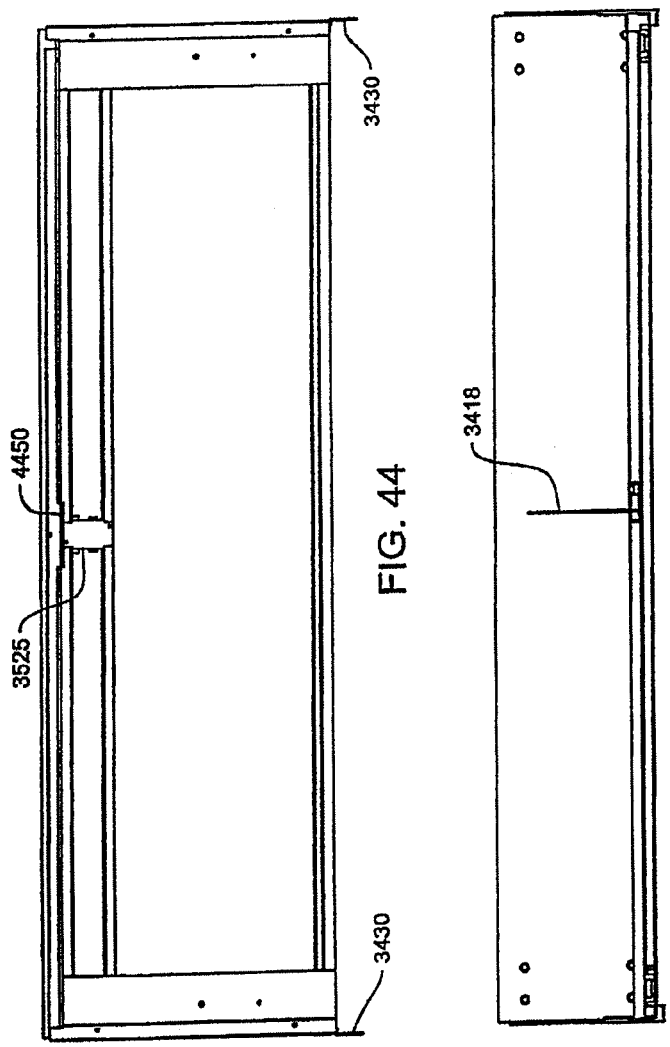

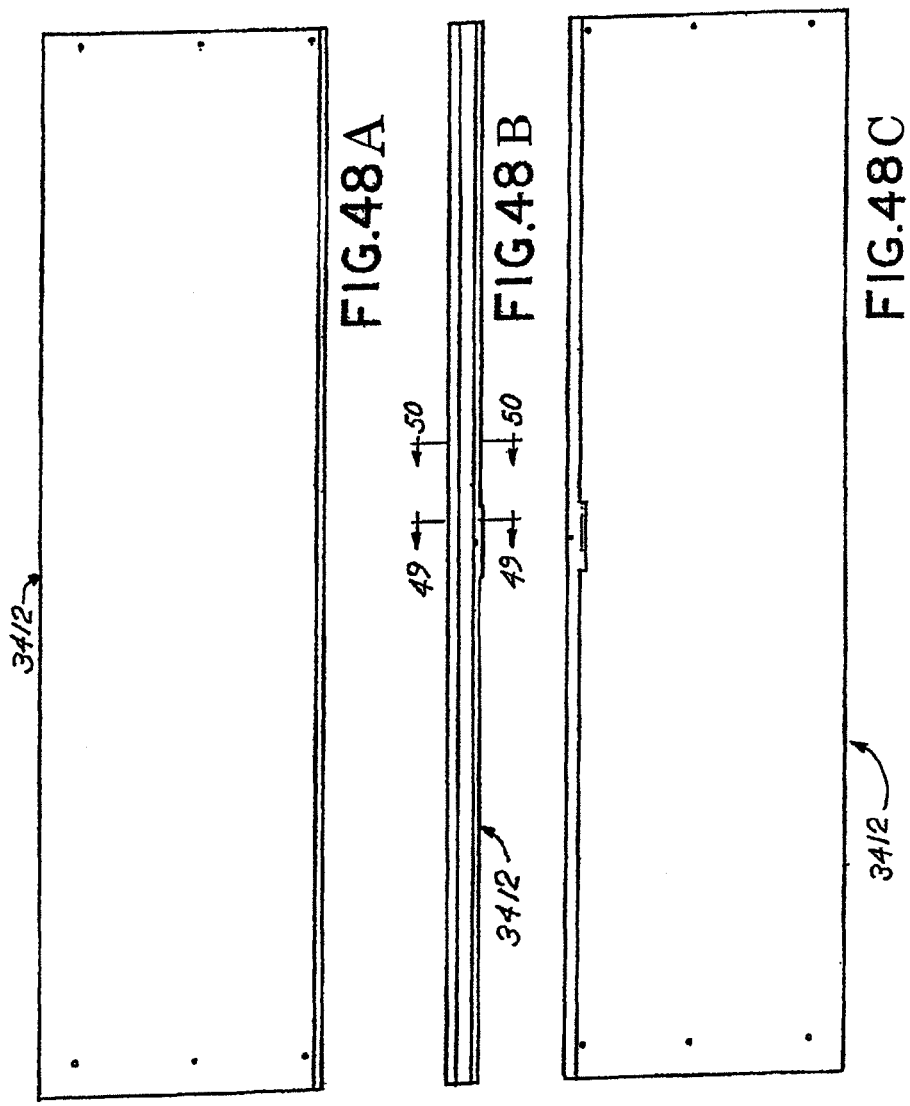

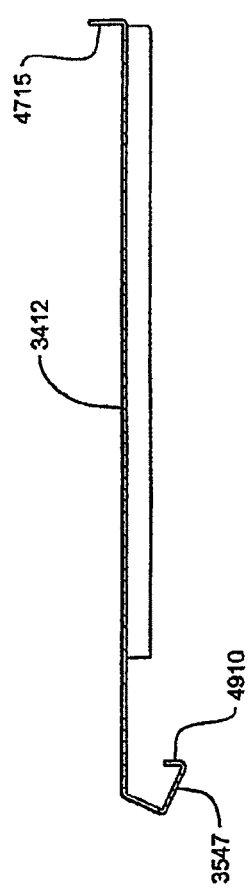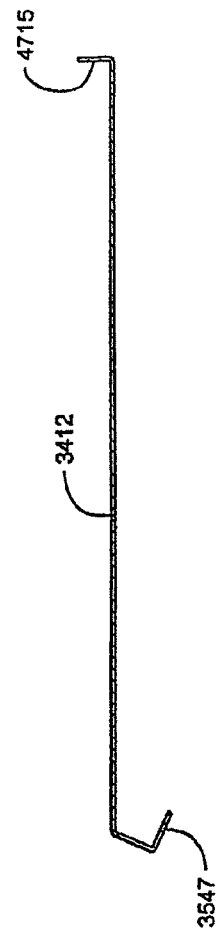

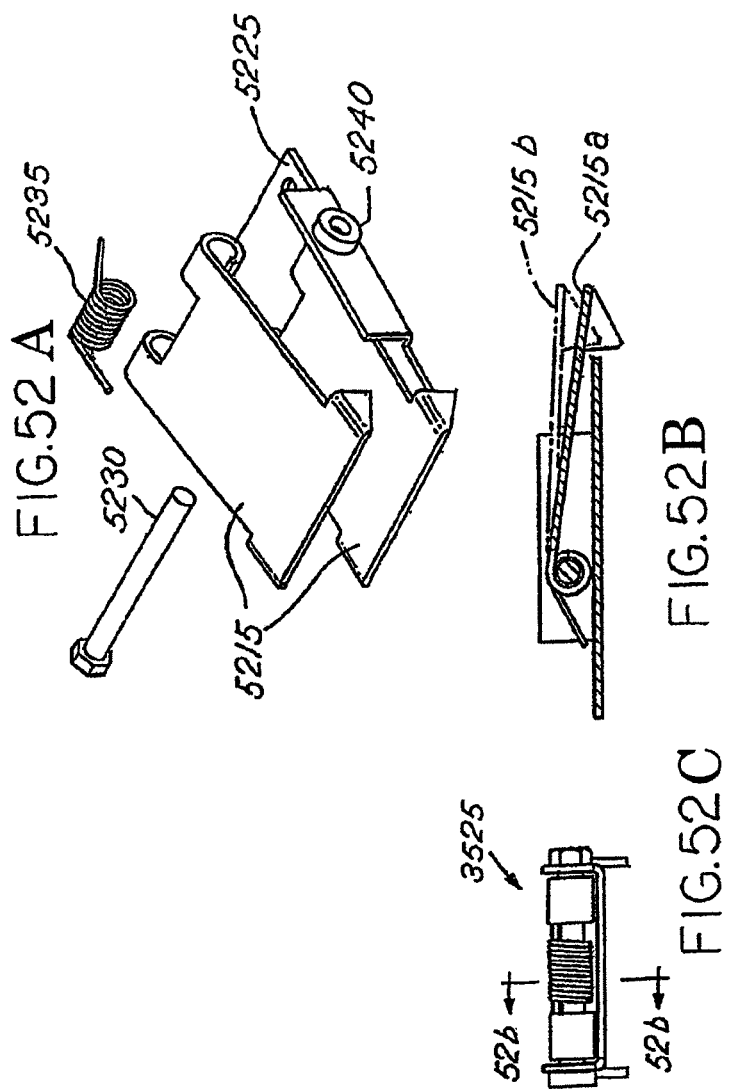

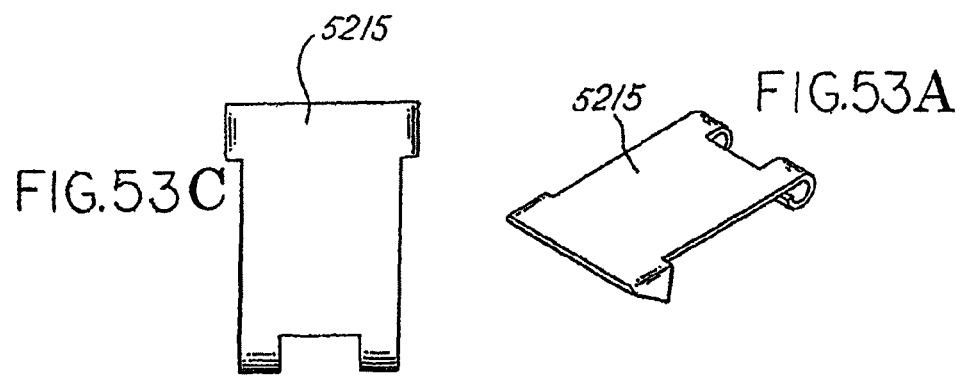
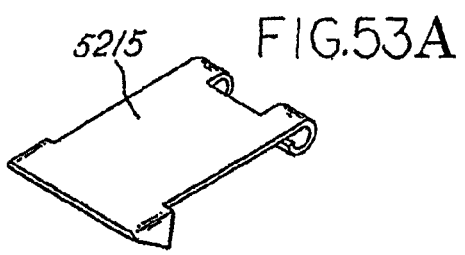
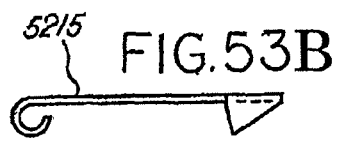
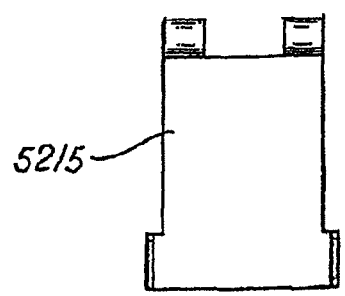

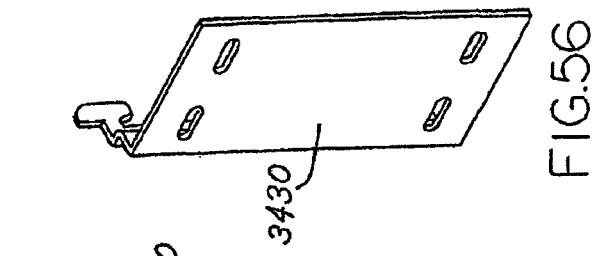
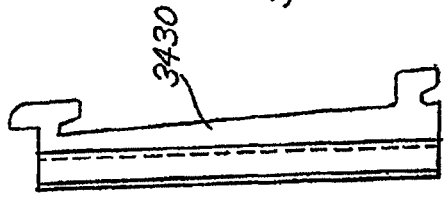
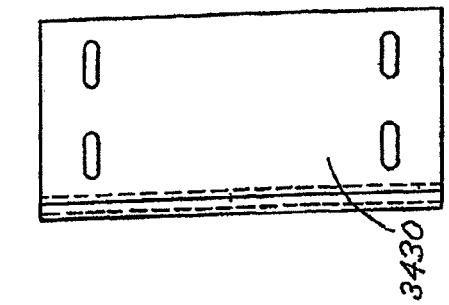
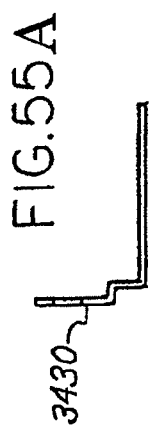
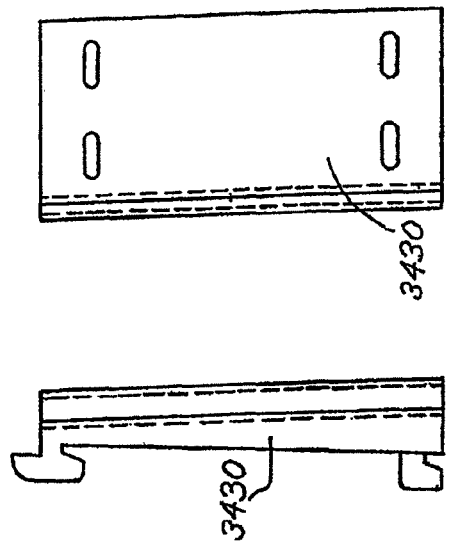

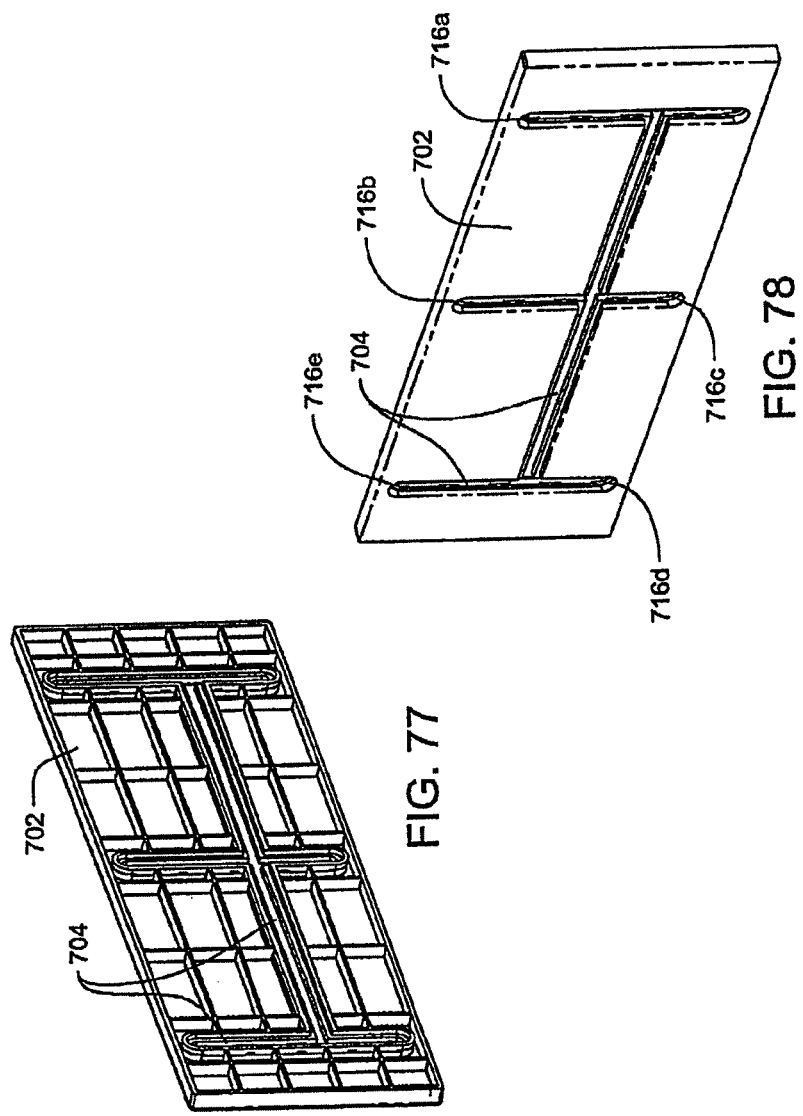

PRODUCT SECUREMENT AND MANAGEMENT SYSTEM

CROSS REFERENCE TO RELATED APPLICATIONS

This application is a continuation-in-part of U.S. application Ser. No. 13/858,574, filed on Apr. 8, 2013, which is a continuation of U.S. application Ser. No. 13/544,363 filed on Jul. 9, 2012, now U.S. Pat. No. 8,413,823, which is a continuation of U.S. application Ser. No. 13/230,362, filed on Sep. 12, 2011, now U.S. Pat. No. 8,235,227, which is a continuation-in-part of U.S. application Ser. No. 12/872,721, filed Aug. 31, 2010, now U.S. Pat. No. 8,047,385, which is a continuation-in-part of U.S. application Ser. No. 12/496,389, filed Jul. 1, 2009, now U.S. Pat. No. 8,113,601, which is a continuation-in-part of U.S. application Ser. No. 11/858,545, filed Sep. 20, 2007, now U.S. Pat. No. 7,621,409, which is a continuation-in-part of U.S. application Ser. No. 11/685,530, filed Mar. 13, 2007, now U.S. Pat. No. 7,451,881, which claims benefit to U.S. Provisional Application No. 60/782,000, filed Mar. 13, 2006, now expired, U.S. application Ser. No. 11/685,530 is also a continuation-in-part of U.S. application Ser. No. 11/612,210, filed Dec. 18, 2006, now U.S. Pat. No. 7,299,934, which is a continuation of U.S. application Ser. No. 11/140,023, filed May 27, 2005, now U.S. Pat. No. 7,150,365, which is a continuation-in-part of U.S. application Ser. No. 11/047,915 filed Feb. 1, 2005, now U.S. Pat. No. 7,661,545, which claims benefit to U.S. Provisional Application No. 60/541,804 filed Feb. 3, 2004, now expired. Each of these patent applications, application Ser. Nos. 13/544,363, 13/230,362, 12/872,721, 12/496,389, 11/858,545, 11/685,530, 60/782,000, 11/612,210, 11/140,023, 11/047,915, 60/541,804, are incorporated herein by reference in their entireties.

FIELD OF THE INVENTION

The present invention relates generally to shelf assemblies for use in merchandising product and more particularly to shelf assemblies that improve the securement and management of merchandised product.

BACKGROUND OF THE INVENTION

It is known that retail and wholesale stores, such as drug stores, grocery stores, discount stores, toy stores, and the like require and use a large amount of shelving both to store product and to display the product to consumers. In displaying product to consumers to promote and improve store sales, these stores situate or position the product toward the front of the shelf so that the product is visible and easily accessible to consumers. This desirable positioning has certain drawbacks. For instance, with this desirable "front-facing" of product, the stores are finding that relatively small products or packages of high value can be the target of thieves. Certain items can represent a high value to potential thieves who can either resell the items or use them for other illegitimate purposes, as in the case of certain pharmaceutical products. This theft is increasing and is now a significant cost to the retailer because thieves prefer to steal many products at once or in as short amount of time as possible. To do this, for example, thieves will "sweep" the shelf with their arm collecting the items into a purse, bag or coat very quickly and exit the store without drawing attention.

Theft can be the result of both customers and employees actions and has been difficult to eliminate. Attempts to deter and prevent theft have proven to be only partially effective. For instance, in-store cameras often do not observe the theft clearly enough to catch or prosecute the thief. In addition, in-store security personnel are rarely in the correct position to actually observe a thief in action. As a result, theft continues to be a significant problem and cost in the management of product inventory.

The present invention is directed at overcoming these and other known drawbacks and problems with existing shelving systems.

BRIEF SUMMARY OF THE INVENTION

The present invention overcomes the above-mentioned problems by addressing the securement and management of product in a retail setting. As will become evident below, the invention has the ability to inhibit "sweeping" of product by a thief and to limit the taking of large amounts of product from a shelf in a short period of time. Using one or more methods such as placing the shelves closer together, using product dividers that extend from the front edge of the shelf and between the shelves, using a merchandising system that controls the speed of a pusher, placing front walls having a specific height that results in a smaller opening to limit access to product, using an electronic control unit and an electronic lock-out mechanism which locks the merchandising shelf and multiple shelves when too many products are removed at one time, the present invention will inhibit sweeping of product and the removal of numerous products at a time. The present invention also has the ability to alert store or security personnel and security cameras of a potential theft situation, while minimizing the impact on access to product by legitimate shoppers.

In an embodiment, a merchandising system, comprises a base configured to support product; a housing configured to be engaged with the base, comprising a top wall, a first side wall, and a second side wall; a spring-urged pusher movably mounted on the base; a rotatable door assembly that includes a door configured to hold one product, wherein the door moves from a closed position to an open position; a locking assembly that comprises a locking bar mounted to the base, wherein the locking bar moves from an extended position to an unextended position, and when the locking bar is in the extended position, the locking bar locks the door assembly and the spring-urged pusher; and an electronic control unit that triggers a lock-out mechanism engaged to the locking bar to move the locking bar from the unextended position to the extended position. The electronic control unit may trigger the lock-out mechanism when a preset number of products are removed in a preset time limit.

In other features of an embodiment of the invention, the locking assembly may further comprise a locking latch that engages the locking bar when the locking bar is in the extended position. Additionally, the locking assembly may further comprise a locking gear that includes a free end and a gear teeth end with a door spring attached to the door and the free end of the locking gear. Additionally, when the locking bar is in the extended position, the locking latch may engage the gear teeth end of the locking gear which may prohibit the uncoiling of the door spring and the door moving to the open position. The locking assembly may also comprise a ratchet shaft that is located in a slot on the base, wherein the slot extends longitudinally along the length of the base. The ratchet shaft may also include at least one section that has a plurality of teeth extending along the longitudinal axis of the shaft and at least one section that is flat that extends along the longitudinal axis of the shaft. The locking mechanism may also include a pusher lock that is attached to the spring-urged pusher. Additionally, when the locking bar is in the extended position, the ratchet shaft rotates such that the plurality of teeth face upwards towards the pusher lock and a pointed end of the pusher lock engages one of the plurality of teeth to prohibit the movement of the pusher.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 depicts a front elevation view of an exemplary embodiment of a product securement and management system of the present invention.

FIG. 2 depicts a partial side elevation view of the exemplary securement and management system of FIG. 1.

FIG. 3 depicts a bottom view of an exemplary embodiment of a pullout shelf that may be used with the present invention.

FIG. 4 depicts front elevation view of an exemplary embodiment of the product securement and management system of the invention incorporating the pullout shelf.

FIG. 25 depicts an exemplary embodiment that includes the use of a clip that may be used to further secure a side wall to the shelf.

FIG. 26 depicts an isometric view of the clip of FIG. 25.

FIG. 27 depicts a close-up view of the mounted clip of FIG. 25.

FIGS. 42-45 illustrate views of an embodiment of a box shelf with various features omitted to provide additional details in accordance with one or more aspects of the present invention.

FIGS. 48a-48c illustrate various view of an embodiment of a support surface of a slideable shelf in accordance with one or more aspects of the present invention.

FIGS. 49 and 50 depict cross-sections of a portion of an embodiment of support surface of a slideable shelf in accordance with one or more aspects of the present invention.

FIGS. 52*a*-52*c* illustrate an isometric, partially exploded view of an embodiment of a hinge plate and construction in accordance with one or more aspects of the present invention.

FIGS. 53*a*-53*e* illustrate a number of views of an embodiment of a hinge plate in accordance with one or more aspects of the present invention.

FIGS. 55*a*-55*d* illustrate a number of views of an embodiment of a shelf support in accordance with one or more aspects of the present invention.

FIG. 56 illustrates an isometric view of a portion of a shelf support configured to engage vertical rails in accordance with one or more aspects of the present invention.

FIG. 77 is an isometric view of the adjustable wall of FIG. 74.

FIG. 78 is another isometric view of the adjustable wall of FIG. 74.

Figure 5:
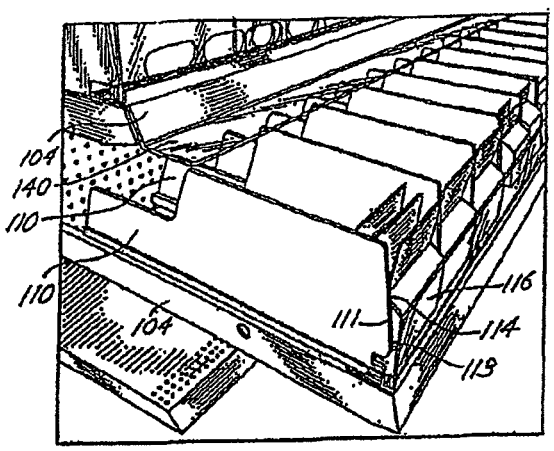
FIG. 5 depicts a side elevation view of an exemplary pullout shelf illustrating the product dividers and the restocking of product on the shelf.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

DETAILED DESCRIPTION OF THE INVENTION

The present invention relates to the securement, management, and distribution of products in settings such as a retail setting and includes numerous embodiments. One embodiment involves a shelf management and display system that resides either on a standard or existing "dealer" shelf typically found in a retail store or on a shelf designed with certain advantages in securing products and deterring theft. The embodiment may include uprights of a pre-existing shelving system or may be a stand alone unit. The display system includes front-facing systems, which force product to the front of a shelf. Such systems may use various methods, such as gravity, friction, magnetism, or spring-urged pushers or paddles to bring product to the front of a shelf near the aisle. Many examples of spring-urged systems that orient products toward the front of a shelf exist and include the systems described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, which are incorporated herein by reference.

Referring to FIGS. 1 and 2, in one embodiment of the present invention, a shelf management and display system 100 includes vertical uprights 102 and product shelves 104 removably mounted to the uprights. The shelves 104 may be mounted at various positions along the uprights 102 depending on the desired positioning and spacing of the shelves 104. Similarly, the shelves 104 may be moved or relocated to different positions along the uprights 102 as necessary. As shown in FIGS. 4 and 5, the shelves 104 may be pull-out shelves that pull away from the uprights 102 like drawers. As illustrated by FIG. 3, the shelf 104 may incorporate a locking device 117 which involves cooperating catches that contact each other in the locked position and substantially release this contact in the unlocked position and that when released will permit the shelf 104 to pull-out and away from the uprights. The shelves or uprights may involve other locking devices, such as magnets, latches, notches, binders, tension or the like. Once pulled away, the store personnel can restock the shelf with product and then slide the shelf 104 back to its original position and relock the shelf.

A back wall 106 may be mounted to the uprights 102 through known mounting techniques to aid in containing the products and to prevent access to the products from the back of the display system 100. A lock box 108 may be mounted to the uprights 102 also through known mounting techniques. The lock box 108 may be used for storing and locking additional product and shelving components for quick retrieval by the store personnel. The lock box 108 may be positioned at any position on the uprights 102, including the depicted positioning at or near the top of the display system 100. In an alternative embodiment, the lock box 108 may be secured to a shelf 104 as opposed to the uprights 102. With either mounting location, the additional product and shelving components are located at the display system 100 and can therefore be readily retrieved by store personnel.

An exemplary embodiment of the invention may include a series of walls or dividers 110 that are placed between product rows, lanes or facings, and at the ends of the facings, to deter product "sweeping" by a thief. These walls 110 are sometimes referred to as "product dividers." As used herein, the terms "vertical walls," "product dividers" and "dividers" are meant to include any wall (including vertical and non-vertical), divider, barrier, or separator that may be used between product rows, lanes or facings. The product dividers 110, when positioned in a spaced-apart manner on the display system 100, form product lanes 112 for locating and separating product to be merchandised.

The product dividers 110 or side walls also are positioned at the sides of the product facing to prevent access to the product from the side of the display system 100. In one embodiment, these dividers or side walls may include telescoping features that permit them to extend vertically or horizontally to provide additional product securement. Significantly, these dividers or side walls may be used in numerous applications as the size and extent of these can be adjusted to fit most shelves, shelving or display systems, or applications.

A pusher 126 can be used to urge product forward. This pusher can incorporate a coil spring to assist in urging product forward. The divider 110 in some embodiments can include a base or floor. In some embodiments this floor includes a pusher track 128.

Figure 6:
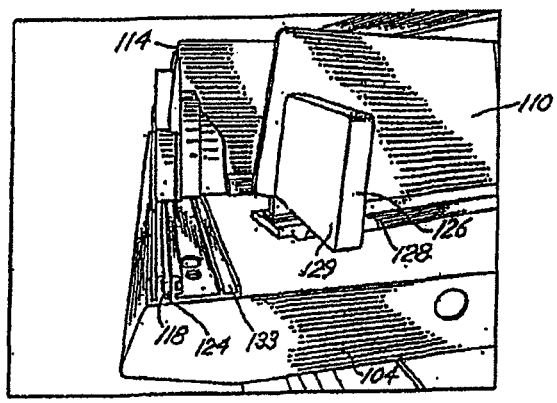
FIG. 6 depicts a side elevation view of an exemplary mounting of a front retaining wall and a secondary retaining wall to the shelf in addition to an exemplary pusher mechanism.

FIG. 6 shows the floor on one side of the divider wall. A second floor can be on the opposite side of the divider wall. With floors on both sides of the vertical divider wall, product can rest on these floors. In one such embodiment, a product can rest on one floor of one divider and a second floor of a second divider.

The product dividers 110 define a height, shape and configuration that deter the removal of product over the product dividers 110. The dividers 110 extend in a vertical or non-vertical manner between the shelves 104 and from the front of the shelf 104 to the back wall 106. The dividers 110 have a generally rectangular shape; however, other shapes and configurations of the dividers, such as non-rectangular, oval, repeating patterns or the like, may be used with the invention. Depending on the product to be merchandised and the desired degree of access to the products, the front edge 114 of the product dividers 110 may extend vertically between the shelves 104, or may extend non-vertically to make the products more accessible to the consumer and easier to remove from the shelf. In one embodiment, the divider 110 defines a front edge 111 that includes a front edge portion 113 protruding outward from the front edge 111, as shown in FIG. 5. The protruding portion of the front edge will assist in holding the retaining wall or tab 122 in position to prevent slidable movement of the retaining wall or tab 122, as described below.

The product dividers 110 may be mounted to the display system 100 using numerous techniques. As an example, the dividers 110 may be inserted into tracks formed in the shelf 104 or tracks formed in a base that attaches to the shelf 104. Similarly, the dividers 110 may be formed integral or as a unitary unit with a base that is mounted to the shelf. Also, the dividers 110 may be mounted to a rail, channel, or groove as understood by those skilled in the art. The dividers 110 should be sufficiently rigid to retain the product within the product lanes. Examples of dividers that may be used with invention are described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, which are incorporated herein by reference. One skilled in the art will appreciate that other dividers and techniques for mounting the dividers to the shelves are known and may be used with the teachings of the invention.

In one embodiment, the dividers 110 may have a step down or decline near its rear edge, or a decrease in wall height, to allow the wall 110 to be lifted and disengaged from the rail on which it is mounted. With this configuration, the dividers 110 may be moved laterally without interfering with the shelf above it. In one embodiment, the vertical wall or divider 110 has a step down beginning approximately ⅔ of the wall length from its front edge.

In an embodiment, it may be desired to provide enhanced security for items on only a portion of a shelf. These items may be located in the center of the shelf or on a side of the shelf. Security features such as those referenced herein can be added to only a portion of the shelf, while the remainder of the shelf contains fewer or none of the security features. Where high security items are placed in the center of a shelf, these items can be segregated from the remainder of the shelf through the use of walls. These walls can provide the side barriers for the high security portion of the shelf. These walls can be made of strong construction, such as metal, and can extend from the floor of a shelf to a distance fairly near the top of the shelf. These walls also can be attached to the shelf as well as the other security features to limit the possibility of the walls being bent, removed or otherwise thwarted and to assist in limiting access to the items being merchandised on the shelf.

Figure 30:
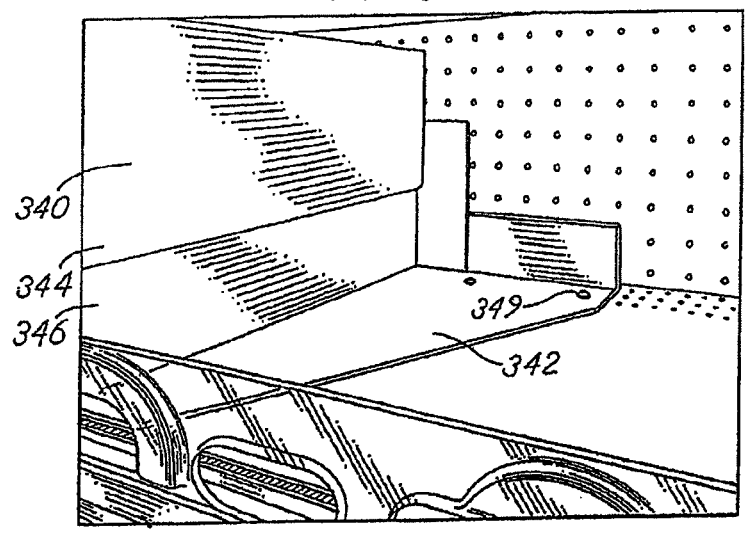
FIG. 30 depicts an exemplary embodiment that includes a side wall that may be used to provide further security for product on a shelf or a portion of a shelf.
Figure 31:
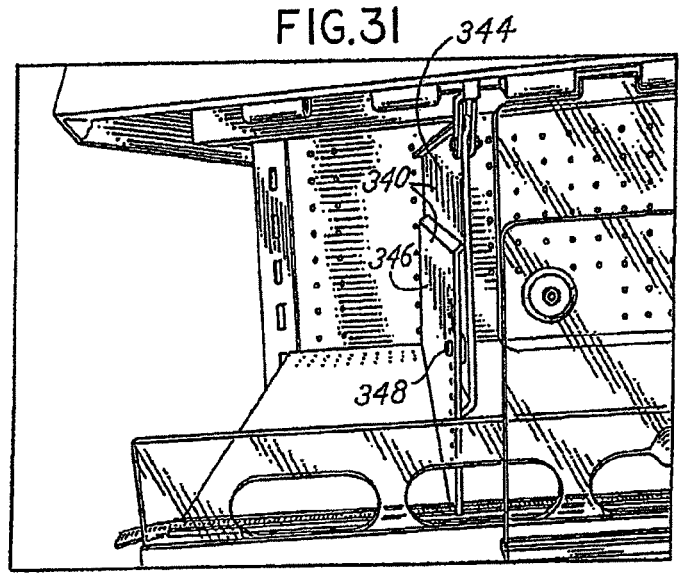
FIG. 31 depicts another view of the wall of FIG. 30.
Figure 32:
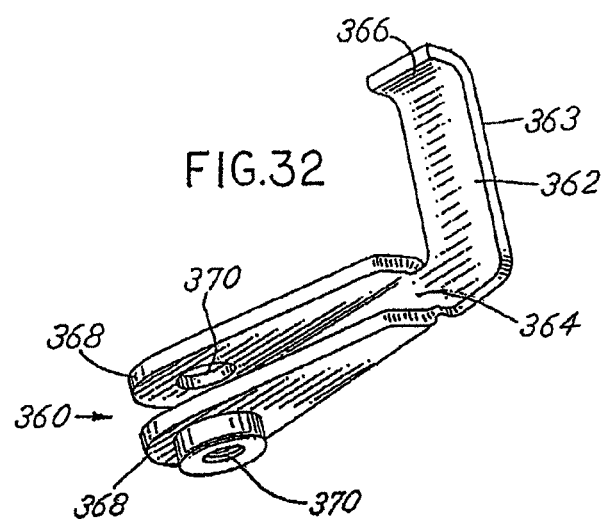
FIG. 32 depicts an isometric view of a clip that may be used to further secure a side wall to the shelf.
Figure 33:
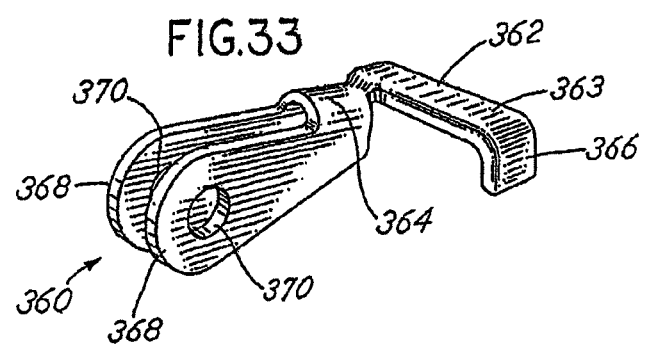
FIG. 33 depicts another view of the clip of FIG. 32.

Referring to FIGS. 25, 30 and 31, walls 340 and 350 are used to segregate a shelf into a higher security area and a lower security area. Walls 340 and 350 can be made from steel and can extend from at or near the floor of the shelf to an area at or near the ceiling of the shelf. The walls also can be adjustable. In an embodiment, the walls can be comprised of a top section 344 and a bottom section 346. As shown in FIG. 31, these two sections can overlap to provide a continuous barrier. The top section 344 of wall 340 and the bottom section 346 of wall 340 can include apertures that align the two walls. A fastener 348 such as a screw, bolt, pin, rod or other fastener can be used to join the two walls at a particular height. The walls also can comprise a floor 342 which includes apertures and can be connected to the floor of the shelf through a fastener 349 such as a screw, bolt, pin, rod or other fastener.

Referring to FIGS. 74-78, in an alternative embodiment, the walls 340 and 350 may be in the form of an adjustable wall 702 that is slidably movable and repositionable. The wall 702 defines one or more elongated channels or slots 704 that permit movement of the wall 702 and adjustment of the location of the wall 702 to a desired position. In an exemplary embodiment, the channels 704 may be vertically and horizontally oriented on the adjustable wall 702. The wall 702 may be moved and positioned, as desired, and secured to a lower wall portion 706 through the use of fasteners 708, such as screws, bolts, pins, rods or or the like. The lower wall portion 706 may include numerous holes 709 for receiving the fasteners 708 and may include a floor 710 which may include a plurality of holes 711 for mounting the floor 710 to the to the floor of the shelf as described above. For convenience in adjusting the wall 702 relative to the lower wall portion 706, a tool 714, such a hex key, wrench, screw driver, or the like, may be mounted to the lower wall portion 706 to be used by a user to make the desired adjustments of the location of the wall 702.

Figure 75:
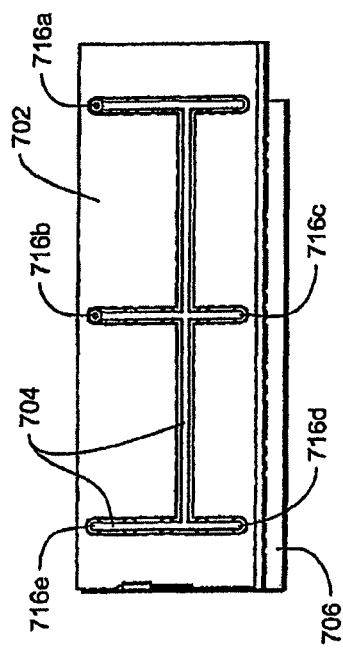
FIG. 75 is a side view of the adjustable wall of FIG. 74.
Figure 76:
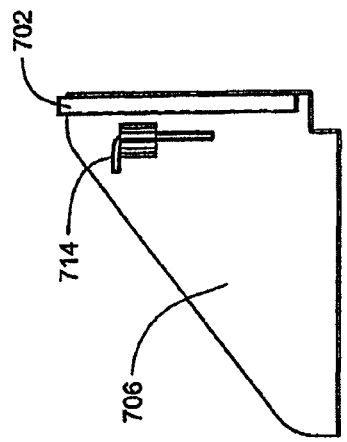
FIG. 76 is an end view of the adjustable wall of FIG. 74.
Figure 79:
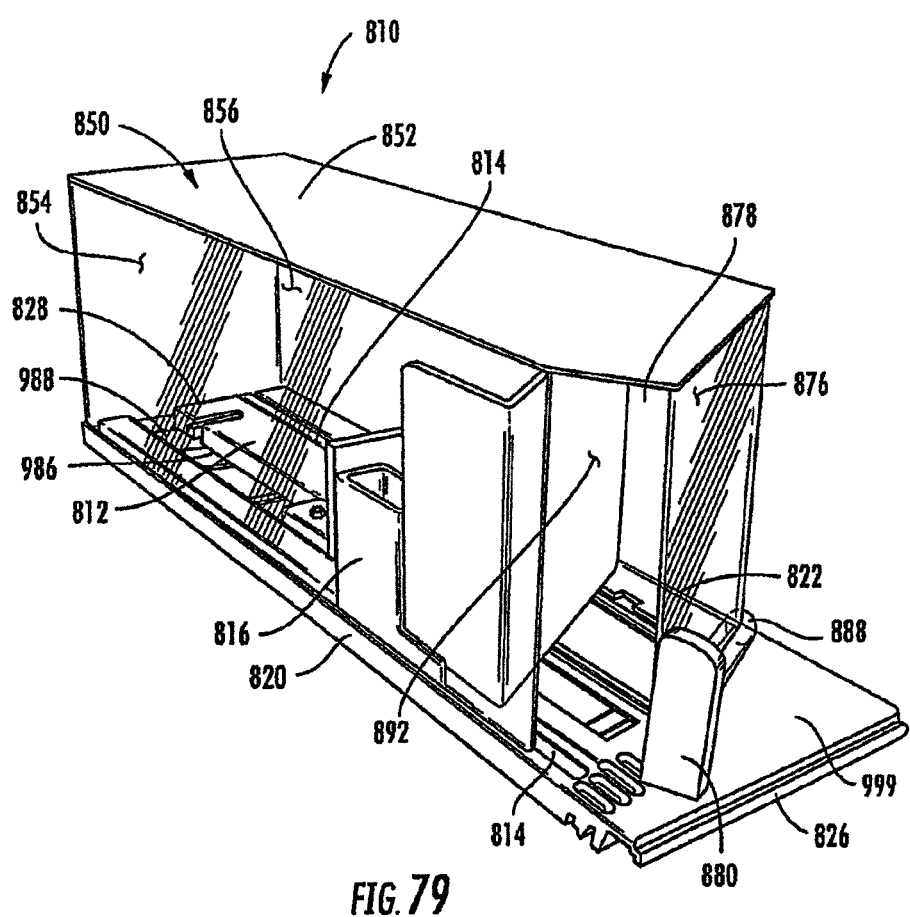
FIG. 79 is an isometric view of an exemplary merchandising system.
Figure 80:
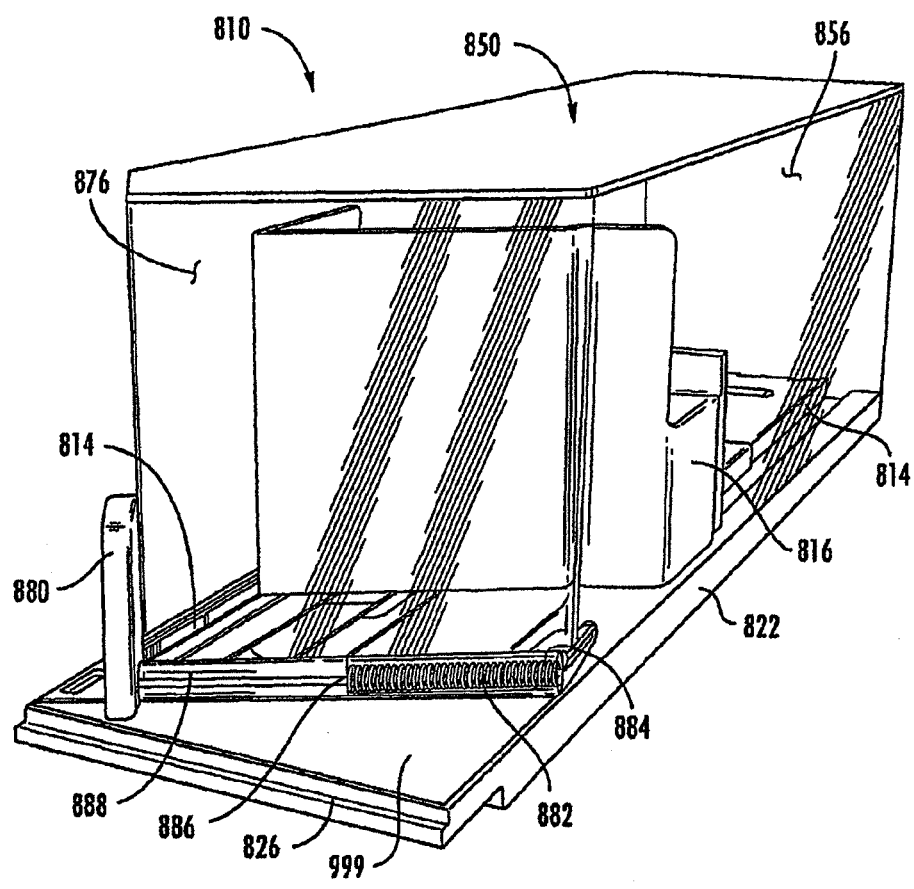
FIG. 80 is another isometric view of the merchandising system of FIG. 79.
Figure 81:
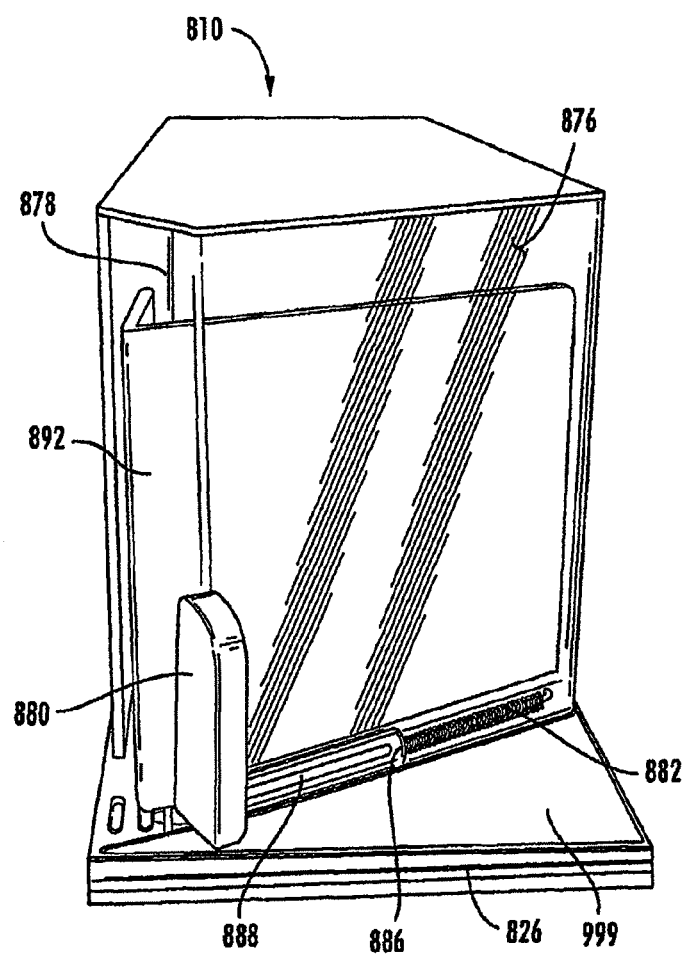
FIG. 81 front view of the merchandising system of FIG. 79.
Figure 82:
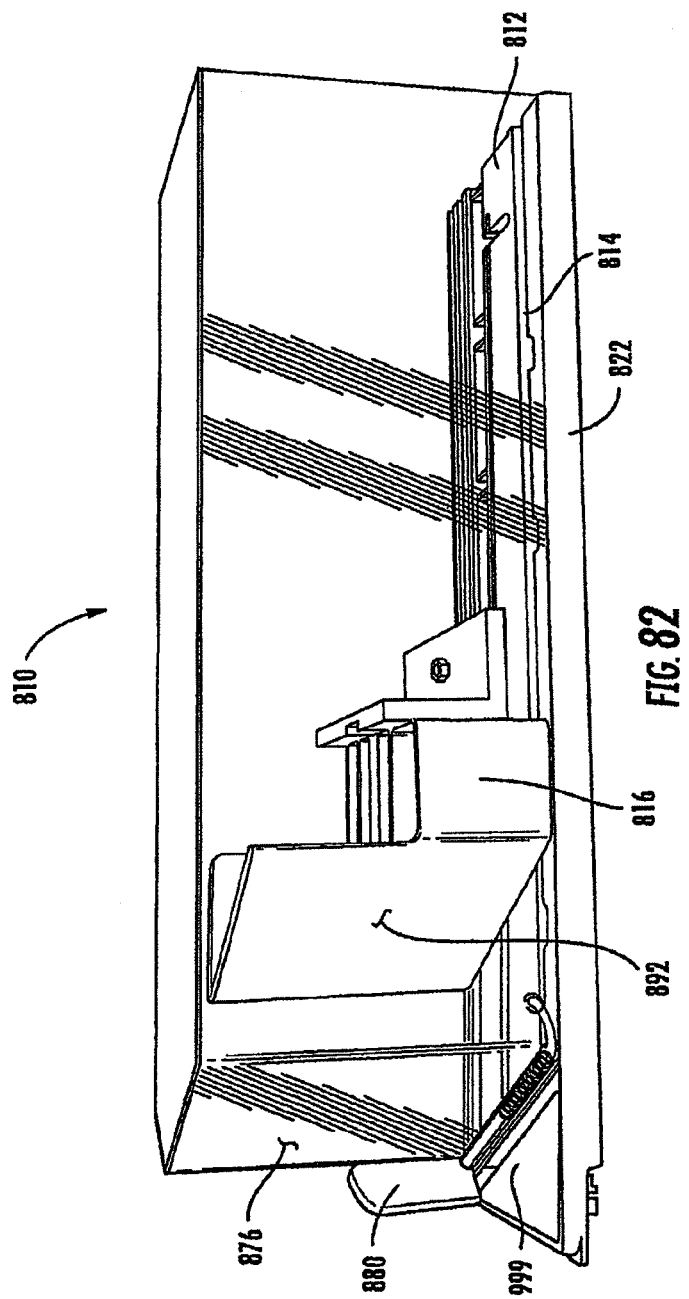
FIG. 82 is a side view of the merchandising system of FIG. 79.
Figure 83:
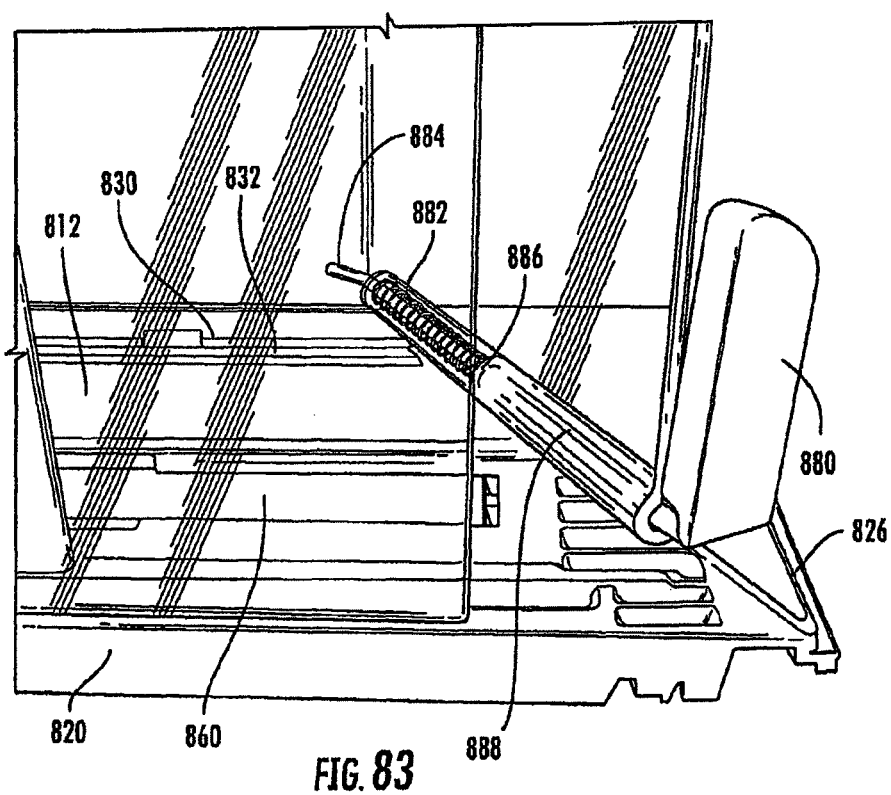
FIG. 83 is a partial side view of the merchandising system of FIG. 79.
Figure 84:
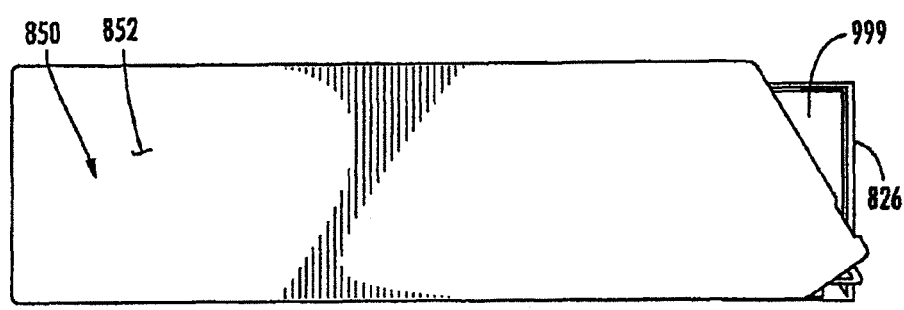
FIG. 84 is a top view of the merchandising system of FIG. 79.

As should be readily apparent, the elongated channels 704 provide for numerous mounting positions of the wall 702 relative to the lower wall portion 706. In an exemplary position, the wall 702 is fastened to the lower wall portion 706 such that the fasteners 708 are located at positions 716*a* and 716*b* in the elongated channel 704. In this position, as shown by FIG. 75, the wall 702 will be in an unextended position. In one of the numerous alternate positions, the wall 702 may be positioned and the fasteners 708 may be located at positions 716*c* and 716*d*. In this position, the wall 702 will be in an extended position such that the wall 702 extends upward relative to the lower wall portion 706 and away from the lower wall portion. In this position, the wall 702 may serve as an additional barrier to inhibit access to the shelf and thereby further secure the products on the shelf. As yet another example, the wall 702 may be positioned and the fasteners 708 may be located at positions 716*b* and 716*e*. In this position, the wall 702 will be in an extended position such that the wall 702 extends away from the lower wall portion and will be at the same height as the lower wall portion. It should be readily apparent that numerous other positions of the wall 702 relative to the shelf are possible depending on the desired level of security and the configuration of the shelf, and the tool 714 provides convenience and ease of adjustment of the wall 702. It should be understood that the elongated channel may define numerous other configurations that still permit movement and adjustment of the wall 702 relative to the lower portion. The system illustrated by FIGS. 74-78 may further be configured and mounted on either or both ends of the shelf, and if desired, to the front or rear of the shelf. Also, the wall may be made of any suitable material, such as metal or plastic.

Referring to FIGS. 25-27, 30-33 a clip or clip member 320 or 360 may be used to further secure the wall 340, 350 to the shelf 104 and in particular the walls that separate secure products from non-secure products. The clip 320, 360 also can be used to secure divider 110 to a shelf 104 (embodiment not shown). The clip 320, 360 may be used to strengthen the wall 340, 350 to prevent the bending or moving of the wall. With the use of the clip 320, 360, the wall 340, 350 may be made of a thinner, less costly material because the clip 320, 360 will prevent potential bending or twisting of the wall to access the product on the shelf. The walls 140, 150 also are known as side walls.

In an exemplary embodiment, the clip 320, 360 is configured at one end to engage a hinge rail 322, which is used to hinge the barrier 140, discussed below, to the shelf 104. The hinge rail 322 is mounted to a shelf. The clip 320, 360 mounts to the shelf through its interaction with hinge rail 322. The clip 320, 360 is further configured at an opposite end to engage the wall 340, 350. More particularly, the clip 320 includes a blade portion 324 that is configured to engage with the hinge rail 322 and at any of the multiple positions along the hinge rail 322, thus providing flexibility in the placement of the clip 320. The blade portion 324 may take on numerous shapes and configuration and may be connected to or joined with a clip body 328. The clip body 328 is further connected to or joined with opposing wall mounting members 330. The wall mounting members 330 are configured to be positioned on opposing sides of a wall 340 with the wall passing between the mounting members 330. The wall mounting members 330 further define aligned holes 332 for receiving a mounting fastener 334 that may be used to secure the mounting members 330 to the wall 340, as depicted by FIG. 27. The aligned holes 332 may be thru holes or threaded holes. As can be appreciated, any type of fastener or securement technique may be used to secure the clip 320 to the wall 340.

Where a wall 340 or 350 is placed at the side end of a shelf, a clip 360 can be used to further secure the wall 340, 350 to the shelf 104. At the edge of the shelf, the hinge rail ceases (not shown). Clip 360 includes a blade portion 362 that extends in only one direction from the clip body 364. The blade portion 362 is configured to engage the hinge rail 322. In an embodiment, the blade portion engages only a single hinge piece or knuckle of the hinge rail. For example, in FIG. 27, a single hinge piece or knuckle is designated by 323. The blade portion 362 includes a first blade portion 363 and a second portion 366 that can be at an angle to first portion 363. The second portion 366 can be configured to interact with the side 324 of knuckle 323. The blade 362 may take on numerous shapes and configuration and may be connected to or joined with a clip body 364. The clip body 364 is further connected to or joined with opposing wall mounting members 368. The wall mounting members 368 are configured to be positioned on opposing sides of a wall 350 with the wall passing between the mounting members 368. The wall mounting members 368 further define aligned holes 370 for receiving a mounting fastener (not shown) that may be used to secure the mounting members 368 to the wall 350. The aligned holes 370 may be thru holes or threaded holes. As can be appreciated, any type of fastener or securement technique may be used to secure the clip 360 to the wall 340 or 350.

A front retaining wall 116 may be positioned along the front edge of the shelf 104. The front retaining wall 116 can serve as a "fence" to restrain the product in the product lanes 112 and assist in preventing the product from falling off the front of the shelf 104. The retaining wall 116 stops the forward movement of product that is caused by the urging of the pushers, described below. As exemplified by FIG. 6, the retaining wall 116 may be mounted to a channel or rail 118 that extends along the front edge 119 of the shelf 104. The channel or rail 118 may be mounted to existing holes in a standard dealer shelf, or secured by any other known manner to the shelf 104. The retaining wall 116 may be mounted to or on the channel or rail 118. The front retaining wall 116 may be made of a clear plastic to permit visualization of the product on the shelf and provide a more aesthetically pleasing organization to the merchandised product. The front retaining wall 116 can also be created from opaque or semi-transparent material, or from wire, and can be adaptable to display graphics. The front retaining wall 116 can have a variety of configurations, such as rectangular, oblong, repeating patterns or the like.

Figure 7:
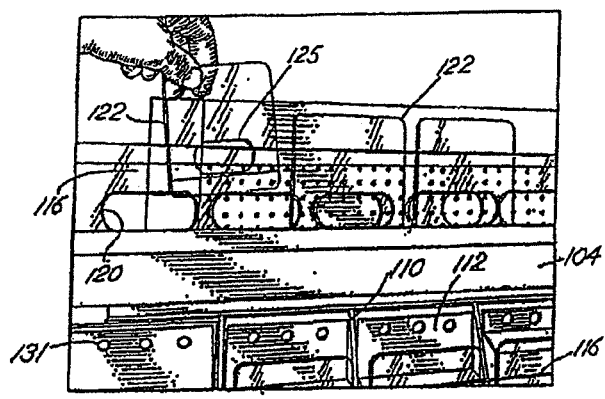
FIG. 7 depicts a front elevation view of an exemplary embodiment of a front retaining wall and a secondary retaining wall.

As more clearly shown in FIG. 7, the front retaining wall 116 may also include holes or openings 120 extending therethrough that are spaced along the wall 116. The holes 120 permit the consumer and store personnel to push the product back and away from the retaining wall 116 for ease of insertion and removal of the product.

As shown in FIGS. 1 and 2, the retaining wall 116 can have a height that permits the removal of a single product at a time or, depending on the desired level of security, a couple of products or a few products at a time. In other words, the height of the retaining wall 116 can permit limited access to and removal of product from the display system 100. Stated another way, the retaining wall 116 is not so tall as to prohibit any access to the product, but is sized to allow the consumer or store personnel to access and lift a limited number of product over the retaining wall 116 at one time. This limited removal of products is accomplished through the use of the retaining wall 116 and the close proximity of the shelf 104 positioned above the product. That is, in one embodiment, the shelf 104 located above the product will be positioned in close proximity to the top edge of the product, or the top edge of the product divider 110, whichever is taller. The shelf 104 located above the product, the product dividers 110, and the retaining wall 116 will form an opening or window 131 through which only a single, two, or possibly a few, product(s) can be removed at one time or in a single motion. This configuration also deters "sweeping" of product from the shelf 104. The size of the window 131 can be adjusted by adjusting the location of the shelf 104 above the product, the dividers 110, and/or the retaining wall 116, or through the use of a second retaining wall 122, barrier 130, and/or barrier 140, described below. This window 131 adjustment permits flexibility with the system and allows the store to set the window 131 size depending on the product size and how many products they want to permit consumers to remove at a time.

In an exemplary embodiment, if taller products are merchandised on the shelves 104, or if a smaller window 131 is desired, a second retaining wall 122 may be positioned behind or possibly in front of the retaining wall 116 to serve as a retainer for the product. As used herein, the second retaining wall 122 may be referred to as a "tab" and may include any retaining structure or "fence" that can be selectively configured or mounted to the shelves 104 to provide selective theft prevention of specific products, such as high theft items. Consequently, the second retaining wall or tab 122 may have many configurations, shapes and designs, and may be used in front of individual rows of product or groups of rows of product.

As shown in FIGS. 6 and 7, the second retaining wall or tab 122 may be mounted to or on a second channel or rail 124 that extends parallel with the channel or rail 118. The retaining wall or tab 122 may be slidable relative to the shelf 104 or rail 124, or may be fixed relative to the shelf 104 or rail 124. The tab 122 can be positioned between adjacent dividers 110 and held in position between the dividers 110. In other words, the tab 122 may not be permitted much slidable movement in or on the channel or rail 124 because the dividers 110 will hinder such slidable movement. In some embodiment, the dividers 110 contain a portion that serves as a stop to prevent the tab or first retaining wall from moving laterally. Such configuration further prevents theft of the product as potential thieves will not be permitted to simply slide the tab 122 to the side and remove numerous products at a time.

The second retaining wall or tab 122 will have a height that permits access to and removal of a limited number of product. If desired, the tab 122 may have a height that permits removal of only one product at a time. With the use of tabs 122, the display system 100 will have flexibility in that tabs 122 of varying height may be positioned in front of the product lanes 112 to accommodate various sized products. That is, if a row of product has a product height that is different than a product in an adjacent row, tabs 122 of varying height can be used to provide the proper level of security and access to the product.

In one embodiment, the tabs 122 may be sized to extend across one product lane 112 or in front of a single row of product. In an alternative embodiment, the tab 122 may be sized and shaped to extend across multiple product lanes 112. In this embodiment, the tabs 122 could include slots or channels to permit the tabs to "straddle" the dividers 110 and thereby extend across multiple product lanes. In addition, the dividers 110 could extend through the slots or channels and thereby inhibit slidable movement of the tabs 122.

The second retaining wall or tab 122 may also be used in place of the retaining wall 116. In other words, the front "fence" on a product facing may be the tabs 122 of varying height, length and width, or of the same dimensions. In this configuration, the channel or rail 118 may be used to mount dealer-shelf accessories, such as clip-in signage, price tag holders, and the like. The tab 122 also can be attached to the divider 110 or can be formed such that the tab 122 and divider 110 are an integral piece. A wall or partial wall structure such as tab 122 can exist at the front of the divider 110 and can extend to the left or right or to both the left and right of the divider. This wall or partial wall can be used with or without a front retaining wall 116.

In an exemplary embodiment, the tabs 122 may include holes or openings 125 through the tab 122, similar to the holes or openings 120 in the retaining wall 116, to permit the consumer and store personnel to push the product back and away from the retaining wall 116 and tab 122 for ease of insertion and removal of the product. In other words, the holes or openings 126 allow product to be replaced by a consumer who removes it and decides not to purchase the product. To this end, the holes or openings 120, 125 are constructed to allow finger access therethrough to push back the row of product. Once the products are pushed backward, the consumer or store personnel can replace the removed products back into the facing. It should be understood that tabs 122 also can be used that do not include the holes or openings 125.

In an examplary embodiment, the tab 122 may provide securement for an individual row of a product facing. That is, it may be desirable to provide additional theft deterrence for an individual row of product. In this configuration, the tab 122 having the desired dimensions may be positioned in front of a desired product row to provide additional securement for just that row of product. This embodiment will provide the stores with additional flexibility with their planograms and product facings in that individual tabs 122 of different dimensions may be placed at various locations across the facing to enhance the securement of particular products.

In an embodiment, retainer tabs 122 can be used on an individual facing basis for specific products. If a shelf is merchandised with product packages of variable height, the retainer wall 116 must be of a height that allows the shortest product package to be lifted over it. If a shelf 104, barrier 130, or barrier 140 is employed above the product, then the shelf 104 or barriers 130, 140 must be located at a height above the product to allow the placement of the tallest product below it. This may allow a thief easy access to the taller product by being able to easily lift the taller product in quantity over the relatively short retainer wall 116. It can be desirable, then, to increase the height of a front barrier only in front of the taller product. The second retaining wall or tab 122 can be of a taller height than the retaining wall 116 and can be generally taller than required for the small product packages. The retainer wall or tab 122 can therefore be constructed and used to limit access to the taller product and removal of several taller products at a time or in one motion, further securing product and deterring theft. Similarly, the retainer wall or tab 122 can be constructed and used to limit access to smaller but deeper products and to limit the removal of several smaller but deeper products at a time or in one motion. The retainer tab 122 thus allows flexible placement of product on a shelf by the retailer and manufacturer, no matter the size, shape, and configuration of the product.

The retaining wall 116 and tab 122 may be mounted, directly or indirectly, to the shelf 104 using numerous techniques. The retaining wall 116 and tab 122 may be slidably mounted to or receivable in the channels or rails 118, 124, which are secured to the front edge of the shelf through fasteners, adhesives, friction, tension, magnetism, or other restraining techniques and methods. The retaining wall 116 and tab 122 may also be directly mounted or connected to the shelf 104 also through the use of fasteners, adhesives, friction, tension, magnetism, or other restraining techniques and methods. The retaining wall 116 and tab 122 may be fixed to the shelf 104 or removably mounted to the shelf 104 to permit additional flexibility in the design and level of security of the system.

Pushers 126 may be placed behind product between the back wall 106 and the front edge of the shelf 104 to push the product forward so that it may be removed from the front of the shelf. The retaining wall 116 and tabs 122, if used, in some embodiments can stop the forward movement of product that is caused by the urging of the pushers. Known pushers may be used with the invention, including the pushers and pusher systems described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, all of which are incorporated herein by reference. The pushers 126 may be spring-urged pushers that move along a track 128 to push product toward the front edge of the shelf 104, as shown in FIG. 6. Track 128 can form a floor on one side of the divider. A second floor, with or without a track, can be located on the other side of the divider.

In an embodiment, the pushers 126 may have a pusher face or paddle 129 that may extend laterally to increase the pushing surface of the pusher to thereby pusher wider product more effectively. In other words, the pusher 126 may have an extendable pusher face to push either narrow product or wide product. The pusher face or paddle 129 may be extendable from a retracted position to one of several extended positions. The extended pusher face locates the product pushing surface behind the center or near the center of the wider product, thereby greatly enhancing the pushing leverage on the wider product. Numerous other types of pushers and pusher faces may be used with the invention, including the systems and pushers described in U.S. patent application Ser. No. 10/772,134 to Hardy, which is incorporated herein by reference.

The pushers 126 may be stand-alone units that are mountable to the shelf 104 using any known technique, including the channel mounting technique depicted in the figures. That is, in one embodiment, the pusher 126 may be mounted to a front rail or channel 133, as shown in FIG. 6, and may be slidably adjustable within or on that rail or channel. Alternatively, the pushers 126 may be used in conjunction with dividers 110 and may be operatively mounted to the dividers 110, as disclosed in the above referenced patents and application, or as known in the art.

In another embodiment, the pushers 126 may incorporate spring mechanisms, such as coil springs, that include an indicia strip. The indicia strip is provided on spring mechanism and contains data relating to the position of the pusher 126. A sensor assembly may scan the indicia strip and transmit data representative of the product and the position of the pusher on the display system to a store computer or some other suitable device, such as a portable computer or controller. The transmitted data can be used to determine inventory levels and can be done so in real time. With this embodiment, the amount of product removed from a particular location in the store can be determined. This information can be used to determine the effectiveness of product placement and promotional displays, particularly when a product can be obtained from various places within the retail store. And with respect to deterring theft, a deviation in the typical purchasing habits of the consumer can trigger an alarm. That is, the alarm can be used to alert security personnel to the fact that too much product has been removed from the shelf at one time and thus a potential theft has occurred. The location of the incident can also be used to alert a security camera so as to focus the camera in the direction of the potential theft, as discussed below. With this embodiment, numerous types of sensors and detection techniques may be used to monitor the relative position and movement of the pusher 126. For example, in an embodiment, the indicia strip may contain numerous types of patterns that can be optically readable or can be read using several different types of detection methods, such as passive variable capacitance, inductance, resistance, magnetics, or active signal detection. Numerous other types of sensors and detection techniques are possible with the invention for detecting unusual movement of the pusher 126 that may be indicative of a potential theft situation, including the systems and techniques described in U.S. patent application Ser. No. 10/772,010 to Swafford et al., which is incorporated herein by reference.

In other exemplary embodiments, the merchandised product may be urged toward the front of the shelf 104 through other techniques, including friction, gravity and/or magnetism. Each of these techniques may be used with the display system 100 and the teachings of the present invention. These techniques may be used with or without dividers 110, depending on the desired application. In one embodiment, the shelf is not completely horizontal but has an incline or decline from back to front.

In another embodiment, the merchandised product may be urged toward the front of the shelf 104 through vibration or quick movements that orient products in a particular direction on the shelf 104. Vibration can cause products to move forward on the shelf 104 and prevent them from moving backward so that the product is front facing. This vibration may be applied through mechanical, electrical or other structures or designs.

In one embodiment, directed vibration moves product toward the front of the shelf. The directed vibration causes product to move in particular directions or in one direction and not to move in other directions. Through this vibration, which is instituted through the shelf 104, upright 102, floor, wall, ceiling or other structure, or through a vibrative pulse or signal traveling through the air, the product moves in a particular direction, such as frontward.

In another embodiment of the vibration technique for urging product forward on the shelf 104, general undirected vibration is applied to the system. This vibration may be applied through the shelf 104, upright 102, floor, wall, ceiling, other structure or through vibration or a signal traveling through the air. Directors, such as small toggles, ridges, flanges, fingers, or the like, cause product to move in a particular direction depending on their configuration, shape, and orientation. These directors can channel the energy from unspecific vibration and force product in a particular direction, such as frontward. The directors can be placed on the shelf 104, divider 110, floors, walls or ceilings of the system and can be incorporated into the product itself.

In an embodiment of the vibration technique, product sits on a floor and friction moves product toward the front of the shelf. In one embodiment, the floor may be a flat surface panel operatively coupled to a motion providing device. In use, product is placed on the flat surface panel and a combination of gravity and friction hold the product in place on the flat surface panel. The motion providing device then slowly moves the flat surface panel toward the retaining wall 116 located at the front of the shelf 104. After a preset amount of time, or through product position sensing techniques, the motion providing device quickly, in a jerking motion, pulls the flat surface panel in the opposite direction or, in other words, toward the back of the shelf. By doing so, the quick motion of the flat surface panel breaks the bond of friction between the product and the flat surface panel causing the flat surface panel to slide relative to the product and the product to remain at its location. The motion providing device will then repeat the previously described process and begin to slowly move the flat surface panel toward the retaining wall 116. Examples of such vibration techniques for urging product forward on a shelf are disclosed in U.S. Patent application Ser. No. 60/541,859 to Hardy, which is incorporated herein by reference.

As indicated above, the dividers 110, retaining wall 116 and tabs 122 assist in preventing a thief from sweeping a number of products into his or her coat or bag or from taking several products in the same facing. To even further limit the access to the product, in another exemplary embodiment, a horizontal barrier 130 (FIG. 2) may be included above the product packages and secured to the front edge of the shelf 104 positioned above the product. The barrier 130 may be fixed to the front edge of the shelf 104 or may be fixed to uprights 102. The barrier 130 further deters unobstructed access to the product in the product facing by reducing the area, window or opening through which product could be removed from the shelf. The barrier 130 may be constructed separate from the shelf or may be integral with the shelf. The barrier 130 may span one row of product on a facing, or may span multiple rows of product, depending on the desired level of security. Alternatively, the barrier 130 may comprise another shelf 104 positioned just above the product. In this embodiment, the shelf 104 above the product is positioned in close proximity to the product. The barrier 130 restricts access from the front of the shelf 104 to only one or a few products positioned behind the front product in a facing row to permit the removal of only a few products from a shelf, or a product pusher, at one time or in one motion. The retaining walls 116 and tabs 122 may be used conjunctively with the barrier 130 to prevent product from being easily removed from the shelf 104. In other words, the present invention contemplates the use of one, two or multiple barriers or walls to prevent several products from being removed from the shelf at a time or in one motion. The barrier 130 may be made of various materials and may be secured to the front of the shelf 104 through any known technique.

Figure 13:
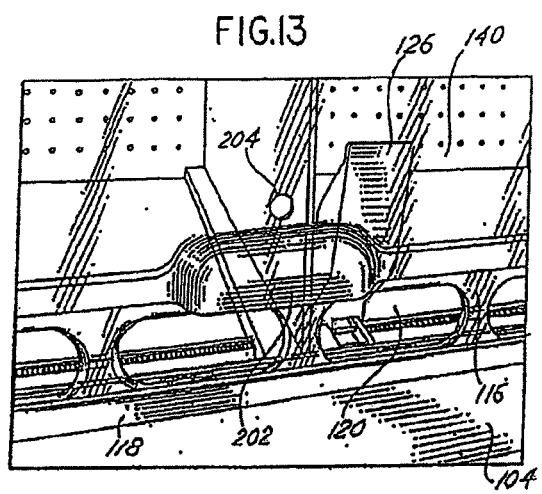
FIG. 13 depicts a close up view of an exemplary handle that may be used with the movable barrier or barrier extension of FIG. 11.

A further embodiment of the invention incorporates a barrier 140 that spans across one or two, some, all or the majority of the top of the product on a shelf 104. The barrier 140 functions similar to a door in that it may be hinged or movably mounted to the edge of the shelf 104, or the barrier 130, just above the product to be protected. As used herein, the term "barrier" is meant to include any structure that will prevent, inhibit or obstruct access to the product on the shelf 104. The barrier can embody numerous shapes and configurations. The barrier 140 may be mounted to the shelf 104 using existing mounting holes on the shelf. The barrier 140 also may be mounted on the front edge of a front rail from the shelf above it. The front edge of the shelf can have hooks or "j" shapes on its underside. The barrier 140 can have apertures which fit within the hooks or "j" shapes. The barrier 140 defines a bottom lip or edge that may meet or overlap the top edge of the retaining wall 116 or tab 122. Such meeting or overlap further closes off access to the product except with deliberate action. In an exemplary embodiment, as shown in FIG. 13, the barrier 140 may include a handle 202 to assist in moving the barrier 140 from a closed position to an open position, and vice versa. The handle may be molded with the barrier 140 along the edge of the barrier as exemplified by FIG. 13, or the handle may be a separate component attached, mounted, secured, or adhered to the barrier 140 using any known technique. One skilled in the art will appreciate that the invention is not limited by a particular shape or configuration of the handle and that the handle may define numerous shapes or configurations. Moreover, the barrier 140 may be configured with a reinforcing rim that extends along the edge of the barrier 140. The reinforcing rim provides additional structural integrity and rigidity to the barrier 140. The reinforcing rim may also be equipped or configured with a handle. If the barrier 140 is configured with a locking mechanism as described herein the reinforcing rim will assist in preventing a potential thief from bending or breaking the barrier 140 and thus giving the thief access to the product that is intended to be locked and secured on the shelf.

A hole or opening 204 may be located in the barrier 140 through which may be mounted a cable lock or similar locking mechanism, as discussed below.

In an alternative embodiment, the product display system includes inverted features. The aspects of the invention that are placed on a floor or a shelf and extend upward can be placed on a ceiling or extend downward, and vice versa. For example, the barrier 140 and retaining wall 116, the dividers 110, and tabs 122 may be inverted. It is contemplated that in some embodiments the retaining wall 116, the dividers 110, and/or tabs 122 may be configured above the barrier 140 which would extend upwardly from the shelf 104. The retaining wall 116, the dividers 110 and/or tabs 122 may be placed on the underside of the shelf above the product and extend downward. Pushers 126 and/or tracks 128 can be secured to the underside of a shelf such that the pushers extend downward and the pusher springs are located near or behind the portion of the pusher that is near the underside of the shelf.

In some embodiments, to access product behind the barrier 140, the barrier 140 must be moved or lifted, which requires a deliberate movement and the use of one hand to hold the barrier 140 in place. While the barrier 140 is lifted or moved, the product can be removed. A consumer or store personnel who uses one hand to hold the barrier 140 in place, will need to use the other hand to remove product from the display system 100. This embodiment is constructed to inhibit the ability of a consumer to access product with two hands at the same time. While product is accessible to the consumer or store personnel, the removal of large amounts of product in a short period of time is deterred. The barrier 140 can be created from a clear, opaque or semi-transparent material and may be hinged or slidable in a variety of common ways.

Figure 11:
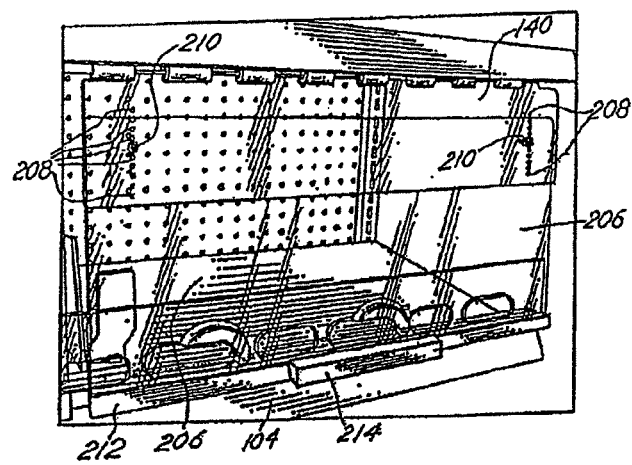
FIG. 11 depicts an exemplary embodiment of a movable barrier and barrier extension that may be used with the present invention.
Figure 12:
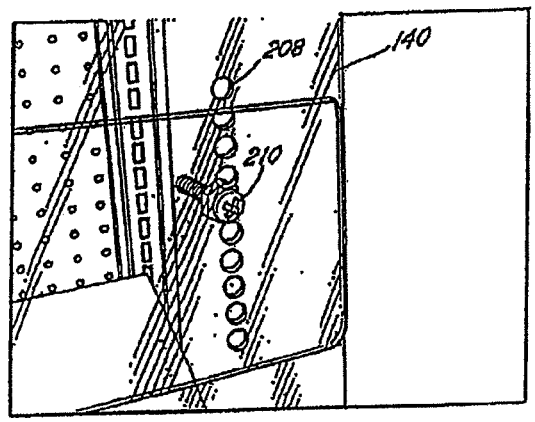
FIG. 12 depicts a close up view of the movable barrier and barrier extension of FIG. 11.

Referring to FIGS. 11 and 12, an adjustable and removable barrier extension 206 may be configured with the barrier 140. The barrier extension 206 may be used to provide additional product security by creating a larger barrier to prevent or limit access to the product on the shelf. The barrier extension 206 may be selectively mounted to the barrier 140 through the use of mounting holes 208 and fasteners 210. As shown in the figures, several mounting holes 208 can be located on either the barrier 140 or the barrier extension 206 or both. These mounting holes can be aligned vertically or non-vertically. The several mounting holes 208 permit the barrier extension 206 to be adjusted relative to the barrier 140 to permit the barrier extension 206 to extend a desired distance, depending on the application, the desired level of security, or the placement of the shelves. Other techniques for mounting or attaching the barrier extension 206 to the barrier 140 are possible with the invention, including techniques using other types of fasteners or adhesives.

The barrier extension 206 can define numerous shapes and configurations depending on the desired application and level of product securement. For example, the barrier extension 206 can be configured to extend across one row of product, one facing, or more than one row or facing. The barrier extension 206 may also be made of a clear, transparent, or semi-transparent material to permit or prevent the product on the shelf to be visible to a consumer or stock person. The barrier extension 206 may also include a handle similar to the handle 202 described above.

The barrier extension 206 may include a reinforcing rim 212 that provides additional structural integrity and rigidity to the barrier extension 206 to further provide additional product security. The reinforcing rim 212 may also be equipped or configured with a handle 214. If the barrier extension 206 is configured with a locking mechanism as described herein, or configured to be in a locked position, the reinforcing rim 212 will assist in preventing a potential thief from bending or breaking the barrier extension 206 and thus giving the thief access to the product that is intended to be locked and secured on the shelf.

Figure 10:
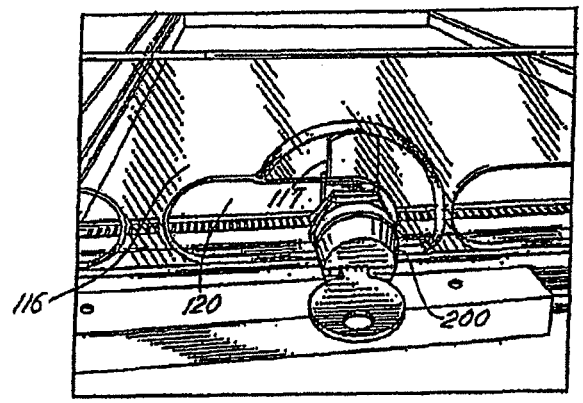
FIG. 10 depicts an exemplary lock mechanism that may be used with the present invention.
Figure 14:
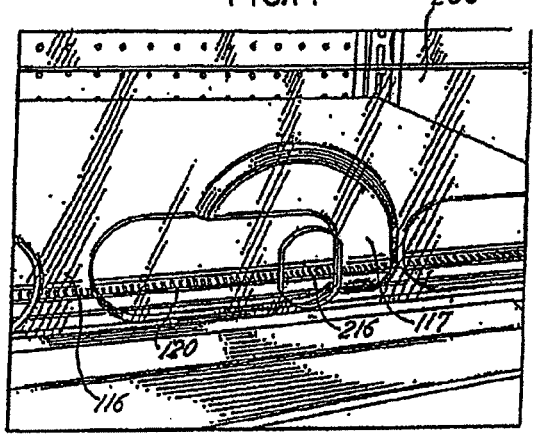
FIG. 14 depicts a close up view of the movable barrier and barrier extension of FIG. 11 defining an opening and mounting structure for receiving the lock mechanism of FIG. 10.

A locking mechanism may be further added to the barrier 140 to further hinder or prevent access to the product on the shelf. In an exemplary embodiment, as shown in FIG. 10, a cylinder lock 200 may be used to secure and lock the barrier 140 or barrier extension 206 in a closed position to prevent access to the product. The lock 200 may be mounted to the barrier 140 or barrier extension 206, through a opening or hole 216 (FIG. 14), and may be configured to mount through the openings 120 in the retaining wall 116.

In one embodiment, the lock 200 may engage an arcuate-shaped wall portion 117 configured in or formed with the retaining wall 116. The arcuate-shaped wall portion 117 will further secure the lock 200 to the retaining wall 116 by permitting the locking tab of the cylindrical lock 200 to more securely seat on, or be held in place relative to, the retaining wall 116. With the use of a lock, such as lock 200, a consumer or store personnel will need to use a key, special tool, or access card to open the lock prior to moving or lifting the barrier 140.

In one embodiment, the lock 200 may engage an arcuate-shaped wall portion 117 configured in or formed with the retaining wall 116. The arcuate-shaped wall portion 117 will further secure the lock 200 to the retaining wall 116 by permitting the locking tab of the cylindrical lock 200 to more securely seat on, or be held in place relative to, the retaining wall 116. With the use of a lock, such as lock 200, a consumer or store personnel will need to use a key, special tool, or access card to open the lock prior to moving or lifting the barrier 140.

Figure 18:
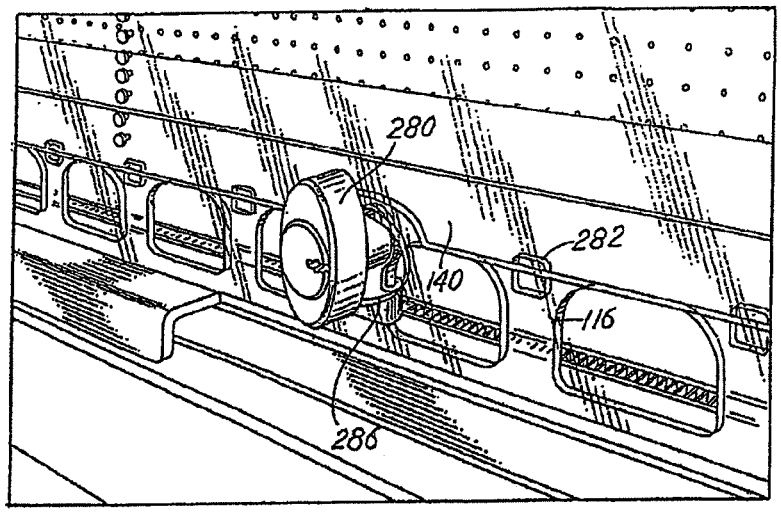
FIG. 18 depicts another exemplary lock mechanism that may be used with the present invention.
Figure 19:
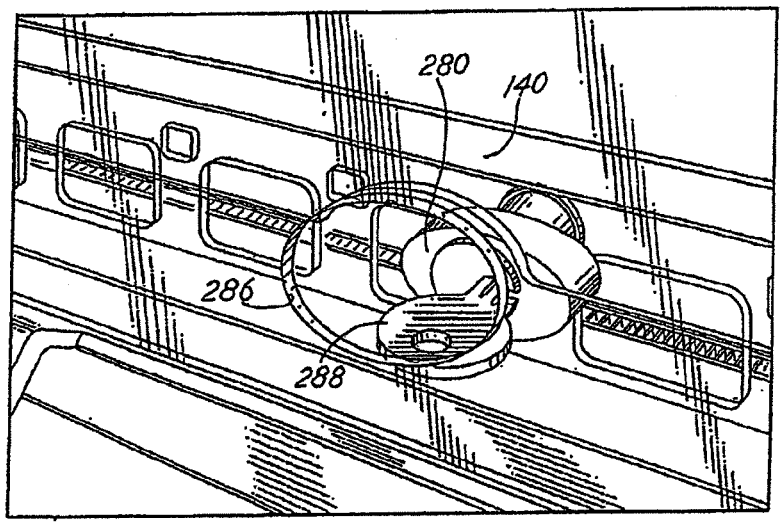
FIG. 19 depicts another view of the exemplary lock mechanism of FIG. 18.
Figure 20:
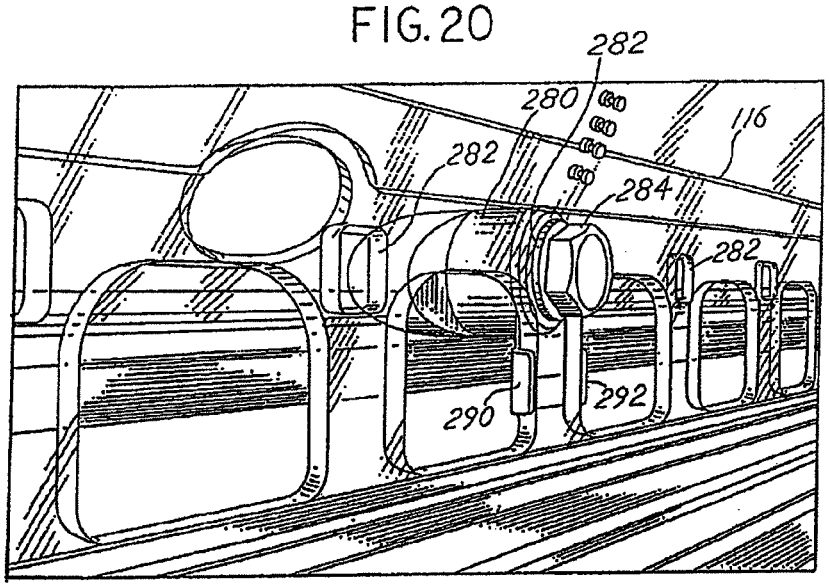
FIG. 20 depicts a back view of the exemplary lock mechanism of FIG. 18.

Referring to FIGS. 18-20, another exemplary lock mechanism is depicted. A lock 280 may be a key-locked rotating oval-shaped lock. The lock 280 is secured to the retaining wall 116 through a hole 282 formed in the retaining wall 116. More specifically, and referring to FIG. 20, the lock 280 includes an anchoring bolt that defines a bolt head 284. The bolt head 284 and washer, if used, will secure the lock 280 to the retaining wall 116. As can be seen in FIG. 20, numerous holes 282 may be positioned along the retaining wall 116 to provide flexibility in the location and placement of the lock 280, as well as providing for the use of numerous locks 280. The lock 280 also can include flanges 290, 292 that interact with retaining wall 116.

Referring to FIGS. 18 and 19, the barrier 140, or barrier extension 206 if used, defines an oval-shaped opening 286. Similar to the flexibility provided by the numerous holes 282, numerous openings 286 may be placed along the barrier 140 or barrier extension 206 to provide the same flexibility. As shown in FIG. 18, when the lock 280 is in a locked position, the opening 286 prevents the lock 280 from passing through the opening 286. As illustrated by FIG. 19, when the lock 280 is moved to an unlocked position through the use of a key 288, the oval-shaped lock 280 will to pass through the oval-shaped opening 286 thus permitting the opening of the barrier 140 or barrier extension 206. With the use of the lock 280 and its mounting to the retaining wall 116, as opposed to a lock mounted on the barrier 140 or barrier extension 206 and extending into the shelf, there will be no interference with product on the shelf, as may sometimes occur with the barrier-mounted locks. In addition, the lock 280 can, but need not, interact with the channels or rails 118, 124 and can leave these channels or rails substantially free to receive other objects such as a retaining wall or tab 122. As can be appreciated, the invention is not limited to the depicted oval-shape lock 280 and opening 286 as well as the illustrated placement of the lock and opening; rather, many various shaped keyed or keyless locks may be used with similarly shaped openings formed in the barrier or barrier extension and placed in numerous locations and still achieve the benefits of the invention.

Alternatively, FIGS. 21-24 depict an additional locking mechanism. A lock plate 302 can extend through an opening or slot 304 formed in the retaining wall 116 and through an opening 306 formed in the barrier 140 or barrier extension 206. The lock plate 302 is configured to receive the padlock 300. One or more of the openings or slots 304 may be formed in the retaining wall 116 at various positions along the retaining wall including the depicted positions between the holes or openings 120 in the retaining wall 116. The openings or slots 304 are configured to receive the lock plate 302 and to secure the lock plate 302 onto the retaining wall 116, as described below. While the openings or slots 304 are depicted as vertical slots, other shapes and configurations of the openings or slots 304 are possible with the invention. Padlock 300 may be used to secure and lock the barrier 140 or barrier extension 206 in a closed position to prevent access to the product. The padlock 300 may be any known keyed or keyless padlock and may be mounted to the barrier 140 or barrier extension 206 through the use of a movable lock plate 302.

As can be appreciated, depending on the desired level of security, one or more lock plates 302 may be used to secure and lock the barrier 140 or barrier extension 206 in a closed position to prevent access to the product. The lock plates 302 are movable in that they can be positioned within any of the openings or slots 304 along the retaining wall 116. Being movable also permits the barrier 140 or barrier extension 206 to be made in various widths to protect only those products on the shelf that must be protected. In addition, the lock plate 302 need not interact with the channels or rails 118, 124 and can leave these channels or rails substantially free to receive other objects such as a retaining wall or tab 122.

Figure 21:
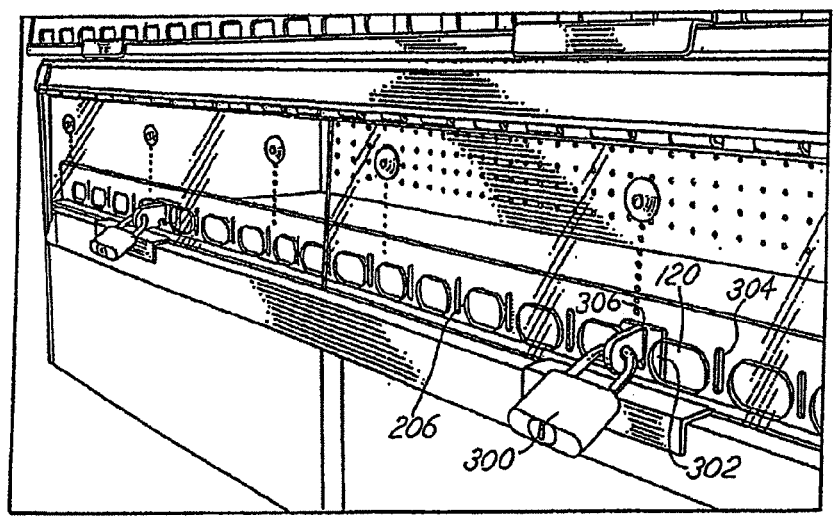
FIG. 21 depicts yet another exemplary lock mechanism that may be used with the present invention.
Figure 22:
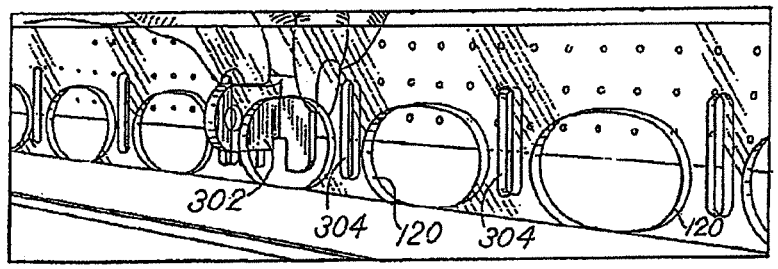
FIG. 22 depicts another view of the exemplary lock mechanism of FIG. 21.
Figure 23:
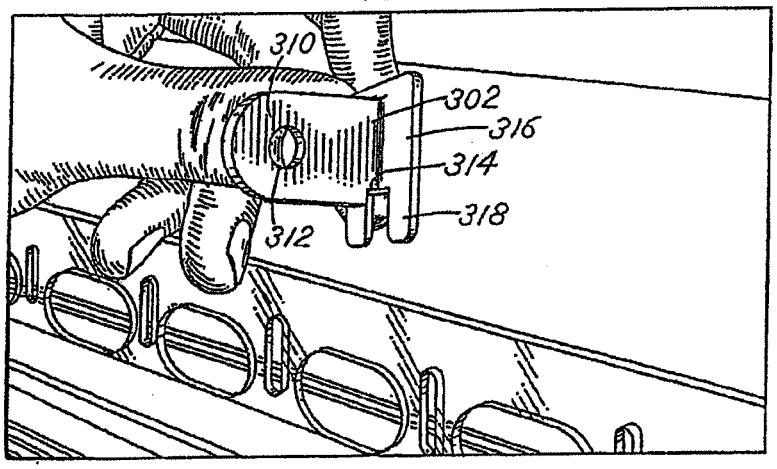
FIG. 23 depicts a close-up view of the lock plate of the exemplary lock mechanism of FIG. 21.
Figure 24:
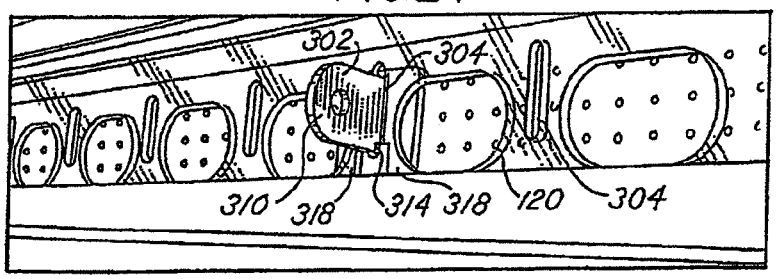
FIG. 24 depicts another view of the lock plate of FIG. 23.

In an exemplary embodiment, the lock plate 302 may be made of any suitable metal or plastic material and may define a nose 310 that will extend through the retaining wall 116 and barrier 140 or barrier extension 206, if used. The nose 310 further defines an opening or hole 312 for receiving the padlock 300, as illustrated by FIG. 21. The nose 310 also defines a notch or cut-away 314 that, when assembled, will seat on the bottom edge of the opening or slot 304, as shown in FIG. 24. Once in this position, the notch or cut-away 314 will prevent the lock plate 302 from being slid or pushed back out of the slot 304 and behind the retaining wall 116.

The nose 310 is connected to or formed with a back plate 316. The back plate 316 includes legs or retaining members 318 that, when assembled, will be positioned behind the retaining wall 116 and assist in holding the lock plate 302 on the retaining wall 116. The back plate 316 and retaining members 318 may take on numerous configurations that aid in holding the lock plate 302 to the retaining wall 116. The lock plate 302 may be configured to not only extend through the retaining wall 116 and barrier 140 or barrier extension 206, it may also extend through and be used with the tab 122.

One skilled in the art will appreciate that any known locking mechanism can be used with the invention, including a cable lock that may be mounted with the hole 204 (FIG. 13), and any known key, special tool, access card, electronic, magnetic or wireless means (for keyless locking mechanisms) can be used to open the locking mechanism.

Figure 8:
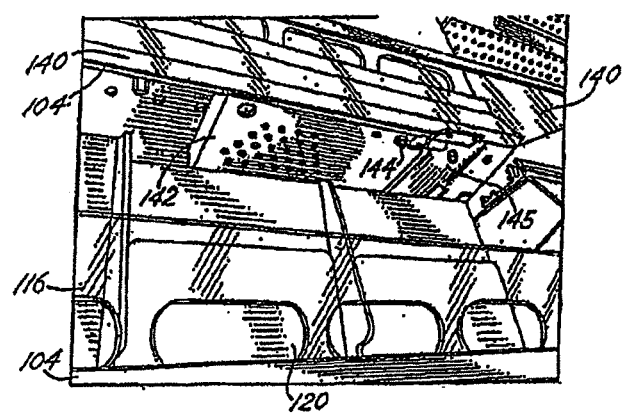
FIG. 8 depicts a front elevation view of an exemplary embodiment of a front retaining wall and a secondary retaining wall with product displayed on the shelf.

As depicted in FIG. 8, an exemplary embodiment of the invention incorporates a system that causes an alert to store or security personnel that a potential theft situation exists. In one embodiment, lifting or moving the barrier 140 activates a mechanical or electronic alert device 142, generally depicted in the figures, that provides a signal, such as an audible, inaudible, infrared, radio-frequency, cellular, ultrasonic or electronic signal (including digital and analog signals), or a combination of these signals. This alert signal may be a sound, tone or voice annunciation that alerts store or security personnel that the barrier 140 has been opened or has been opened for an unusually long period of time and potentially represents a theft situation. The alert device 142 also may send an electronic or other signal to play a voice message via the store paging system, to activate a local or remote strobe or annunciator light, or to send a signal to a receiver, such as a store computer, a pager, cellular device, or other portable device carried by store or security personnel. The alert device 142 may also activate a security video camera to monitor the particular area or vicinity, or activate a monitor that is placed in the area or vicinity which would show the camera image to the consumers and potential thief, or transmit the camera image to security or store management via a web connection, cellular telephone, personal data assistant, or any other signal receiving device. The alert device 142 also may activate an advertisement, informational announcement or other statement or display that is provided through voice, video or video and voice. This advertisement, announcement or statement can be directed to the particular product or product type associated with product behind the barrier that activates the alert device. The alert device can be located such that barriers of a width of no more than one product facing will activate the alert device when lifted.

As used herein, the term "alert device" is meant to include any device or component that may provide an alert, warning and/or signal concerning a condition, situation, and/or circumstance. The alert device 142 may be hard-wired to the store's security system or may be a wireless system. Wireless systems, if used, provide increased flexibility in installation and can be readily installed in existing shelves without the need to install wires for either power or communication. In addition, the use of a wireless system allows for the gradual installation of a system. For example, items of high value (and therefore suffering from an increased likelihood of being stolen) or items that tend to have significant variations in customer demand can be monitored first. With a wireless system, the alert signal may be sent to not only the store's security system or computer, but also any portable device or receiver, such as a controller, personal data assistant, pager or cellular telephone that may be carried by store personnel or security. Also with the wireless or wired system, the store's computer can process further the alert signal to determine whether a theft situation exists and can generate reports which can be analyzed to fine tune product placement, placement of cameras, alert devices, sensors, and so forth, as well as fine tune the delays and actions initiated by potential theft situations. As understood by those skilled in the art the store's computer can be configured with the network server and can be accessible remotely through the world-wide web or other network, and can be controlled remotely through the world-wide web or other network.

In an exemplary embodiment, the alert device 142 is positioned on the shelf 104, either underneath, as depicted in FIG. 8, or on top of the shelf Existing mounting holes on the standard dealer shelf may be used to secure the alert device to the shelf. The alert device 142 may be positioned near to or adjacent to the barrier 140. The alert device 142 may be operatively connected to the barrier 140 through numerous techniques. In one embodiment, the alert device 142 includes a switch 144, such as a push-button switch, that will activate when the barrier 140 is moved or opened. That is, as the barrier 140 moves and comes in contact with the switch 144, either directly or through the use of an activator plate 145, the switch 144 is activated. Alternatively, in a closed-barrier position, the switch 144 is pressed, as the barrier 140 moves to an open position the barrier 140 moves away from the switch 144, thereby releasing the switch 144 and thus activating the alert device 142.

The alert device 142 may be operatively connected or coupled to the barrier to detect movement of the barrier through other methods or techniques. For instance, a motion sensor or similar sensory devices, such as a light-emitting diode sensor assembly, may be used to detect movement of the barrier and communicate that information to the alert device 142. The sensor may be mounted in a variety of locations including on the barrier itself or next to the barrier to detect barrier movement. Alternatively, a magnetic switch may be incorporated to detect movement of the barrier.

The alert device 142 may include sensory components and time-delay features that will calculate how long the barrier 140 has been moved or opened. Upon reaching a predetermined time period, in other words, as the barrier 140 has been moved or opened for a certain duration, the alert device 142 will send a signal, such as the above-mentioned signals, to alert the store personnel, security and/or the consumer that the barrier 140 has been opened or moved for a long period of time, thereby indicating a potential theft situation. In an exemplary embodiment, upon the passing of the predetermined time period, the alert device 142 may send an audio alert signal, including a signal different from a previous audio alert signal, that would draw attention to the vicinity. The alert device 142 can therefore be designed to provide its alert for a fixed period of time before becoming silent.

In another embodiment of the alert device 142, the audio alert signal is adjustable to provide a variety of alert tones of varying frequencies, or to announce that the barrier 140 has been opened or moved for too long and that the consumer needs to close the barrier 140, or to send a silent alarm to the store and/or security personnel. Different signals or frequencies can be used as the length of time in which the barrier has been opened or moved increases. Numerous combinations of alert signals are possible with the alert device 142 depending on the desired level of security. The alert signal is adjustable and numerous combinations of signals may be used to provide the desired signal level and thus security level, yet avoid turning away legitimate consumers from selecting and purchasing the product. That is, for example, the alert device 142 can be programmed to provide an alert signal that will draw the attention of surrounding shoppers or store/security personnel, yet short enough to limit aggravation of the legitimate consumers or stock person.

Also, in another embodiment, a two-tiered response could be implemented. For example, if the barrier 140 is moved, a signal could be transmitted directly to the security camera, or via the store computer or both. In addition, an inaudible notification could be provided directly to security personnel. If the barrier 140 remains open or moved for a set period of time, more clearly indicating a potential theft, an additional audible alarm and flashing lights could also be activated, or any other alarm. Thus, the response could be configured to more carefully match the situation.

Figure 15:
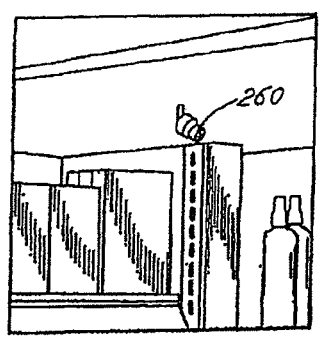
FIG. 15 depicts a partial front elevation view of the exemplary securement and management system of FIG. 1 including the use of a security camera.
Figure 16:
FIG. 16 depicts a partial front elevation view of the exemplary securement and management system of FIG. 1 including the use of a video monitor.

Referring to FIG. 15, in an exemplary embodiment, a security video camera 260 may be placed in the vicinity of product that are high risk theft items, or other product of concern. As shown in FIG. 16, a monitor 262 also may be placed in the vicinity of the high risk product. The monitor 262 may be used to show the security camera image to consumers and any potential thief. Thus, a consumer or potential thief that removes product from the shelf 104 of the display system 100 may realize that their actions are being watched by a camera and potentially recorded.

As can be appreciated, the position of the potential theft relative to the security camera 260 would be beneficial to provide an instruction to the security camera to focus on a particular position. This positional information could be generated by a number of methods, including providing a store computer with the security camera coordinate system for the security camera. The location of the alert device 142 relative to the security camera could be determined during setup and during a potential theft situation; the location of the alert device 142 could be used to direct the focus of the security camera. Alternatively, the security camera could be configured to focus in several positions, such as three points along an aisle, and the store computer could indicate which position was the most appropriate for the particular situation. One skilled in the art will appreciate that the described methods are illustrative because of the numerous methods of controlling the security camera that exist.

Figure 17:
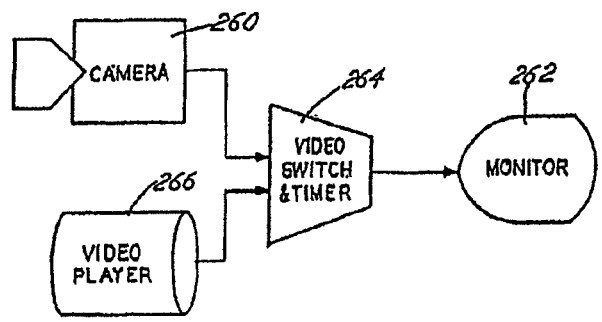
FIG. 17 depicts a diagram of an exemplary switching operation between a camera image and an image from a video player on the monitor of FIG. 16.

In addition to the value of such system in loss prevention, the monitor can show video in the form of advertising or consumer information. As illustrated by FIG. 17, the monitor 262 can switch between the advertising or consumer information and the camera image through the use of a video switch 264. This switching activity can occur on a periodic basis, such as every 30 seconds, or can occur when predetermined conditions are met, such as the lifting of the barrier 140, the removal of product, the movement of a pusher, or input from a proximity sensor that a consumer has entered or approaches the area. By playing the video segment, the device not only reduces loss, but becomes a source of revenue when advertisers are charged to place their message on the system.

A secondary video source for the monitor on which advertising, consumer information or other content is shown can be a video player 266 such as a video cassette recorder, compact disk-video player, solid state digital video player, direct video, audio feed or other video sources. With respect to the switch 264, the switching action between the camera image and advertising or other content can be effected by a hardware timer or a small microcontroller. In one embodiment, the secondary video source can contain a multitude of short video segments which are randomly or non-randomly selected by the timer or microcontroller. The camera 260 may be a small, stand-alone type, not connected to any part of an existing security system, or it may be any typical store security camera existing in the store's security network. The monitor 262 may be a small flat, color, LCD type monitor and can be placed at numerous locations on or near the shelf 104. For instance, the monitor may be placed in overhead signage above the merchandised product or it can be attached to the shelf 104 edge. In some applications, a larger monitor, such as a CRT-type, plasma, LCD or projection monitor can be used. A preferred solid-state digital video player may comprise the secondary video source. The source may be housed in the same enclosure as the monitor or may be located remotely from the monitor.

Referring back to FIGS. 4 and 5, in another exemplary embodiment, the shelf 104 on which the product rests may be a "pull-out" shelf. The "pull-out" shelf allows store associates or personnel access to the product to restock the shelf but prevents a thief from obtaining such access. The pull-out shelf allows easy access to all products on the shelf. This function, however, requires that the shelf not be movable by the consumer or thief and therefore the pull-out function must be protected by a key-lock, special tool, or other locking mechanism. In this embodiment, the product dividers 110 may be designed to be at least equal to the height of the tallest product package on the shelf. As the shelf 104 is pulled out, the product lane or dividers may cause the barrier 140 to rise. If the height of the dividers 110 is lower than the tallest product package, pushing the shelf back in may cause the barrier 140 to catch on the product packages and make it more difficult to return to its closed position. Additionally, pulling out the shelf 104 will raise the barrier 140 which may activate an annunciator or signal generator, as explained above.

Figure 9:
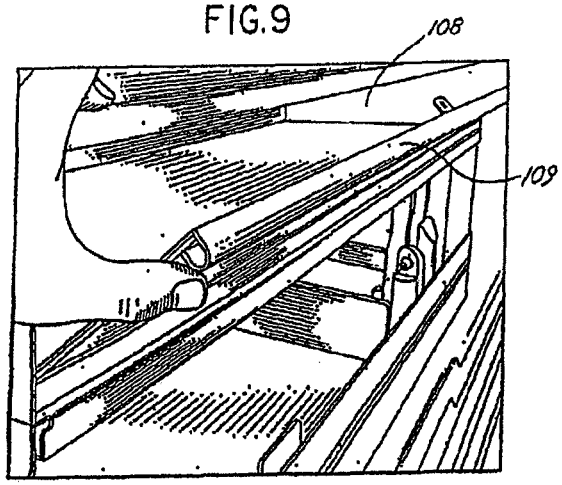
FIG. 9 depicts a bottom view of an exemplary alert device mounted to the exemplary securement and management system of FIG. 1.

Referring to FIG. 9, in an exemplary embodiment, a barrier placed on a top-most shelf 104 may include a lock-box 108 that may be used for storage of overstock product or additional display system 100 components. In an embodiment in which the top-most shelf 104 is a pull-out type, the shelf 104 will pull out while the horizontal barrier above it remains in place, allowing product to be easily accessed. As indicated above, the lock-box 108 may also be mounted to the vertical uprights 102, through known mounting techniques, and may be mounted at any location on the display system 100. The lock-box 108 may use any known locking mechanism that permits key or key-less entry to the lock-box 108. One skilled in the art will appreciate that other security components may be mounted to the lock-box 108 including the security camera, monitor, and alert device 142, to name a few.

In an embodiment, a stationary shroud 180 may placed toward the top of the product display system 100. The shroud 180 provides security and graphic placement, and product may be stored within it. The shroud 180 provides security in that it functions as a top wall or barrier preventing access to the product from a point above the product. The shroud 180 may mount on or to an existing shelf. The shroud 180 may be fixed or adjustable. With an adjustable shroud, the shroud can be positioned at numerous locations on the product display system. In addition, the shroud 180 can be a pull-out shroud functioning in manner similar to the exemplary pull-out shelf 104 described above. Moreover, the shroud 180 can also serve as a shelf to hold product. In other words, the product display system 100 could include multiple shrouds 180 that function as shelves to hold or display product. Also, the shroud can be configured to mount the barriers 130, 140, through numerous known mounting techniques. In an exemplary embodiment, the lock box 108 having a lockable door 109, as shown in FIG. 9, may be placed on the shroud 180 for additional product storage and graphic placement.

The product display system 100 of the invention offers various levels of securement and theft protection. Each level described herein can be used separately and various or all levels can be used in conjunction with each other. Each level can also be added to or adapted with existing shelf systems or be provided as a stand alone system. The divider or retaining walls 110 provide securement. The front retaining wall 116 or "fence" provides securement, with or without the retaining tabs 120. The barriers and access doors 130, 140 over the top of the retaining wall 116 provides securement. The close positioning of the shelf 104 over the product located on the shelf below provides securement. The audible or other signal that is generated by the alert device 142 when the barrier 140 has been open for a set period of time provides securement. The security camera and video and display devices provide securement. Each of these separable aspects of an embodiment of the invention can be used on its own in a retail setting, or can be used in conjunction with other aspects of the embodiment. Each separable aspect can be added to existing shelving or display systems to effectively retrofit and add one or more levels of security to such existing systems.

One embodiment of the invention features various levels of theft deterrent. One level assists in preventing sweeping of products. Pushers 126, dividers 110, and retaining walls 116 are coupled with a shelf 104 or barrier 130, or both, above the product to provide securement to the product. The pushers, dividers, retaining walls, shelf, and barrier allow approximately one, two or three packages to be removed through an opening at one time from a facing of the display system. Second retaining walls or tabs 122 may be used to provide individual securement for specific rows of product. The front wall 116 and tabs 122 may also include holes or openings that extend therethrough that would require the consumer to push on the product through the holes or openings in order to remove the product from the shelf.

A second level of securement incorporates all of the features of first level with the addition of a barrier 140 or access door. To access the product, the consumer must utilize two hands, one to lift or slide the barrier 140 and the other to remove the product, thus adding a second layer of deterrent to the system.

A third level of securement builds upon the features of the first and second levels with the addition of a theft-warning notification device, such as an alert device 142, or other signal transmission device. The alert notification or signal transmission is activated if the barrier 140 or access door is open a predetermined amount of time. This delay can be adjusted to any duration or eliminated. The notification provides an audible, inaudible, infrared, radio-frequency, electronic, or cellular signal that notifies consumers and/or store and security personnel that the barrier 140 has been open for a particular period of time. The signal transmission can send a signal to a store computer, store personnel or a security camera or monitor. The signal can alert the store computer or personnel that the barrier 140 or access door has been opened for a particular period of time and can activate the security camera and monitor to show the thief an image of himself or herself in front of the product. This image can be recorded. Additional alert notifications or signal transmissions can be activated as the amount of time the barrier or access door is open increases.

An additional level of deterrence of theft by consumers or store personnel is the use of a locking mechanism on the shelf 104 to limit unauthorized personnel from pulling out the shelf. The system can require the use of a key or an uncommonly or commonly shaped instrument to be inserted into a concealed access slot in the front or underside of the shelf. This method is designed to require someone with specific knowledge of the shelf operation to disengage the lock. In an embodiment, the barrier 140 or access door on the shelf 104 can be automatically raised for restocking purposes when the shelf is pulled out, then re-engaged once the shelf has been returned to the closed position. In this application, an audio alert may be incorporated that indicates that the shelf is being restocked with product.

In addition, in an embodiment, a stationary shroud 180 may be placed toward the top of the product display and management system. The shroud provides security by inhibiting access to the product from above the product. Also, a lock box can be placed anywhere on the system to store additional product that will be secured by a key lock or some other locking mechanism.

In one embodiment of the present invention, various aspects of the invention are added to portions of existing shelves. In some environments, there are only one, two or a few potential high-theft products among a display of many products. Aspects of the present invention can be added solely to the portion of a shelf management and display system with respect to those high-theft products. For example, a barrier 140 could be placed solely over those products. In addition, side walls could be placed to cover one or more of the sides of the products to further deter sweeping or other theft. A front barrier, a locking mechanism or other aspects of the invention described herein could be used solely with the high-theft products or other highly relevant products in a display and not used with other products in the same display. In one embodiment, a particular set of relevant products can be effectively segregated from the other products within the same display. This particular set of relevant products can be subject to additional security aspects described herein that are not used with the remaining products in the display.

Figure 28:
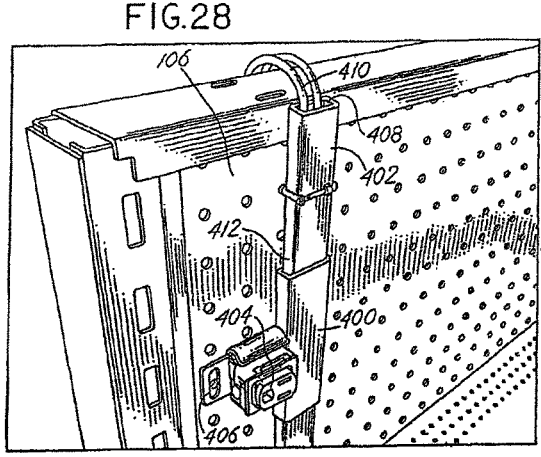
FIG. 28 depicts an exemplary electrical power bar that may be used with the invention.
Figure 29:
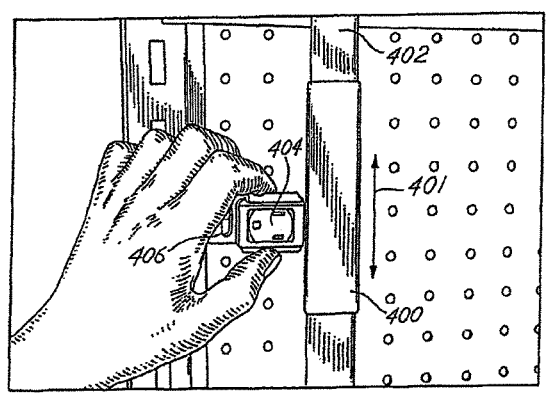
FIG. 29 depicts another view of the power bar of FIG. 28.

Referring to FIGS. 28-29, there is depicted an adjustable power bar 400 that may be selectively mounted to the back wall 106. The power bar 400 will provide electrical power to various components mounted to the shelves, including any video monitors, security cameras, lighting, illuminated signage, overhead header lights, radios, stereos, or any other components that may be mounted to a shelf or the product display and require electrical power. As illustrated by the Figures, the power bar 400 is selectively adjustable between several positions to accommodate shelf height changes or adjustments without causing obstruction with the mounting or adjustment of the shelf.

Conventionally, power outlets were mounted to the shelf and were not easily movable. In fact, significant force was required to unlock the power outlets from the track on which they were mounted to then move the power outlets. In other known applications, the power outlets were mounted to conductive tracks, similar to track-lighting tracks which included embedded power tracks. With those track-type systems, the power outlets needed to be placed at correct locations and snap-fit into position. Once installed, the power outlets were not slidable.

The power bar 400 of the invention solves these problems and other known problems by providing a power source for a product display that is easily mountable to the display, such as the back wall 106, and is easily adjustable to accommodate changes made to the positions of the shelves. The power bar 400 includes an elongated body 402 that may be attached to the back wall 106 of the display. As illustrated, the power bar 400 may be mounted in a vertical manner and the elongated body 402 may extend the entire height of the product display or alternatively less than the entire height of the product display. The power bar 400 may be slidably moved (as indicated by direction arrow 401) a sufficient distance to avoid interference with the product shelf that may be placed at approximately the same vertical height, or with the repositioning of the mounted product shelf. The power bar 400 includes one or more power outlets 404 that may be configured at numerous positions on the power bar 400. Once in the desired position, a fastener, not shown, may be positioned through an adjustment slot 406 to secure the power bar 400 to the back wall 106 at the desired height. The adjustment slot 406 is elongated to permit further adjustment of the power bar 400.

The elongated body 402 defines an elongated hollow cavity 408 through which may pass conducting wires 410 that are used to supply the power to the power bar outlets 404. The elongated body 402 may also include a recessed channel 412 formed in the body 402 and along each side of the body 402. The channel 412 may be used as a receptor for receiving and aligning the power bar 400 onto the body 402. The power bar 400 may fit on or within the channel 412 in a tongue-and-groove manner, or any other suitable mounting connection that permits slidable movement of one component relative to another. Once installed, the power bar 400 will slide relative to the body 402 in or on the channel 412.

In an alternative aspect, the power bar 400 may be replaced with an over-the-air power transfer system that will provide power to the various components mounted to, on, or in the area of the shelves, including any video monitors, screens, security cameras, lighting, illuminated signage, overhead header lights, conductive ink used on shelf data strips or price strips, LED lights, radios, stereos, pushers, dividers, ESL smart tags, audio boxes, or any other components that may be mounted to or placed on or near a shelf or the product display and that require power. Additionally, the over-the-air power transfer system may be used to power packaging for consumer packaged goods. As an example, the power may be supplied to lighting embodied in the packaging itself. The power may also be used by a consumer to power a sample product or something that requires power such as a hair dryer or similar consumer product. Moreover, the power may be used to power interactive, in-store digital displays such as large monitors or computer tablets mounted on the shelf edge or in nearby kiosks.

Figure 102:
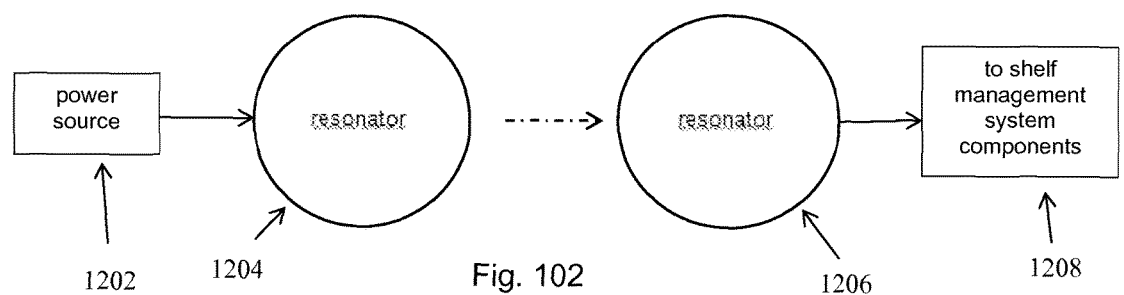
FIG. 102 is a diagram of an exemplary wireless over-the-air power system that may be used with the invention.

In one embodiment, the power source to the shelf may be a wireless energy transfer system that transfers power wirelessly across varying distances. For example, and in an exemplary aspect shown in FIG. 102, the wireless energy transfer may be achieved through the use of an electromagnetic resonator 1204 located remotely from the shelf and that receives energy from an external power supply 1202, such as an alternating current or direct current power source. The electromagnetic resonator then generates an oscillating field and transfers electromagnetic energy from this oscillating field to a second electromagnetic resonator 1206. The second electromagnetic resonator is positioned at a distance away from the first electromagnetic resonator. The second electromagnetic resonator may be positioned on the shelf at the location of the power bar 400, for example, or at other locations on, near, or in the area of the shelf. The second resonator is not wired to the first resonator. Rather, the transfer of energy is performed wirelessly. Once received by the second electromagnetic resonator, the electromagnetic energy is converted to useful energy, such as alternating current or direct current power, that is sent to the shelf management system components 1208. An exemplary wireless energy transfer system that may be used with the embodiments of the invention can be found in U.S. Pat. No. 8,400,024.

The converted energy by the second resonator at the shelf, for example, may be used as a power source for the display shelf itself and any shelf components on the display shelf. In an exemplary aspect, this may include, for example, any video monitors, security cameras, lighting, including illuminated signage, overhead header lights and LED lights, conductive ink used on shelf data strips or price strips, radios, pushers, dividers, barriers, RFID tags, ESL smart tags, electronic controls, or any other component used on the display shelf. With this embodiment, the display shelf itself and any components used on or in association with the display shelf, will no longer need to be wired directly to an external power source or be powered with batteries.

As mentioned, the transfer of wireless power may be over varying distances. The distance range of the energy transfer may be extended through the use of one or more resonant repeaters that enable the energy to transfer between them and eventually to the resonator used to supply power to the display shelf. Additionally, the use of electromagnetic resonators allows the power to transfer through or around an obstacle. Thus, there does not need to be a clear, unobstructed line of transfer in order for the power to be effectively transferred to the second location, such as a display shelf. Also, the power may wrap or move around an obstacle, for example a metallic obstacle, which might otherwise electronically interfere with the transfer signal.

In an alternative embodiment of an over-the-air power transfer system, electrical power may be provided to an electromagnetic resonator. The electrical power may be alternating current or direct current. An amplifier may be used to convert the DC power into an RF voltage waveform that is used to drive the resonator. The resonator generates a magnetic field that is received by a receiving electromagnetic resonator. The magnetic field excites the receiving resonator and causes energy to build up in the receiving resonator. The built up energy is then sent out as a power supply to power, for example, components within a store or on a store shelf, such as the components or systems described above. In an exemplary aspect, the transferred power may be used to individually power each component on the display shelf, or may be used to power all of the display shelf components at once.

In an alternative aspect, one or more electromagnetic resonators may be used that transfer power via an oscillatory resonant mode from a power source to a power receiver. The electromagnetic resonator may be a magnetic resonator or an electric resonator. The one or more resonators may be used to provide wireless energy transfer over a short-range, mid-range and wide range of distances and directions. The resonators may be used on or with the display shelf for charging, powering, or simultaneously powering and charging a variety of electronic devices, or devices that require electric power, on the display shelf.

In an exemplary application, a first source resonator could be connected to a wired electrical power source and could be installed on a wall, ceiling, floor or nearby structure within or in proximity to the store. One or more receiving resonators could be placed on the display shelf, or on one or more components used on the display shelf, and may be connected to the components to provide power to the components. In this application, as the components are moved on the shelf or within the store or as the shelf itself is moved within the store, the resonator would move with them to permit the components to constantly receive wireless power from the source resonator. In an exemplary embodiment, the power provided to and on the shelf may be in the form of a wireless power grid that can be used for any application described herein. This power grid may be a permanent grid on the shelf or a temporary grid movable to other locations within the store.

It should be understood that wireless energy transfer has a variety of other possible applications within a store. For example, the wireless energy from the resonators may be used to recharge batteries or battery packs used to power components used on the store shelf or within the store. By way of further example, the transferred energy may be used to power or recharge hand-held PDA's, cell phones, price scanners or other electronics used by store personnel to perform price checking or product inventory. The transferred energy may also be used to power store computers, mobile devices, remotes, sensors, motion detectors, on-shelf or in-store alarms, electric shopping carts, registers, check-out scanners, lights, heaters, fans, product displays, televisions, LCD displays, counter-top appliances and tools, and the like.

In an alternative aspect, the one or more electromagnetic resonators described herein, including the source resonator and the receiving resonator may be used to transfer power wirelessly from a power source to any of the shelf management system components described in this application. By way of example, the resonators may be used to wirelessly power the security shelf alarms and sensors described herein used to detect a potential theft situation. The resonators may also be used to wirelessly power the electronic locks, lock-out mechanisms and electronic control units described below. As stated, the resonators may also be used to wirelessly power the store security cameras, product tracking and shelf management systems, product pushers and shelf lights used to illuminate product on the shelf. There are still numerous other uses within a store of the disclosed resonators used to supply wireless power from one location to another location and those uses are considered within the scope of this disclosure.

FIGS. 34-59 illustrate an embodiment of a box-shelf that may be secured directly to an upright. Thus, as depicted, the box-shelf may be provided as a complete unit that provides theft-prevention benefits as discussed above while allowing for more straightforward installation in a retail location. As can be appreciated, in an embodiment the box-shelf may be configured to be self-contained so as to eliminate the need for a support shelf.

Figure 34:
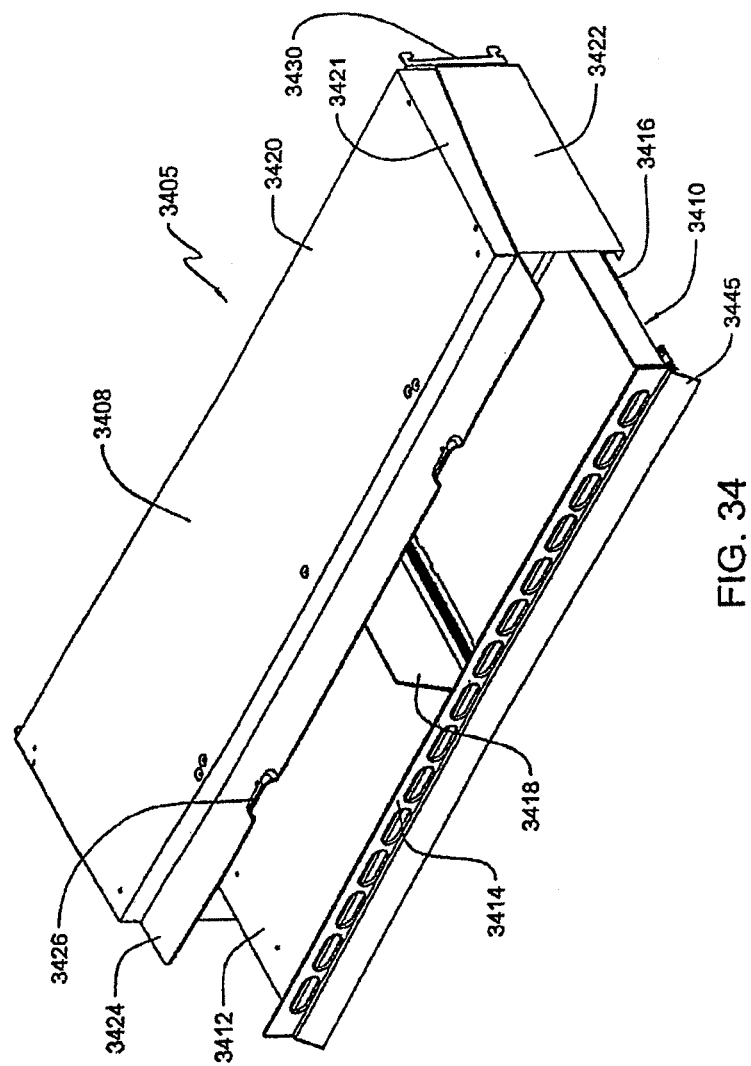
FIG. 34 illustrates an isometric view of an embodiment of a box shelf in accordance with one or more aspects of the present invention.
Figure 35:
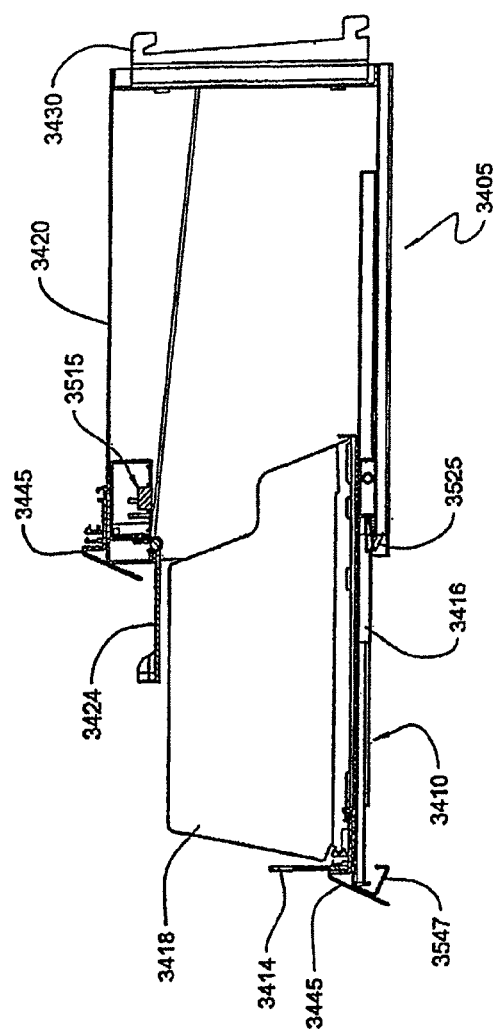
FIG. 35 illustrates a cross-sectional view of an embodiment a box shelf with a slideable shelf in a second position in accordance with one or more aspects of the present invention.
Figure 36:
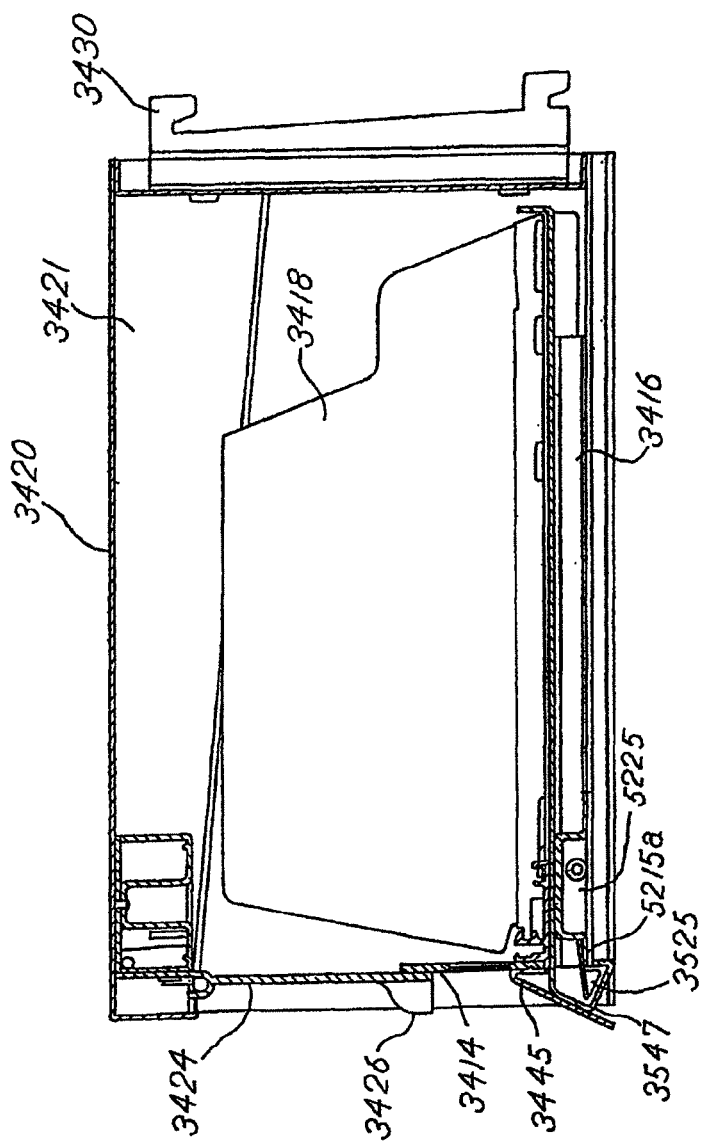
FIG. 36 illustrates a cross-sectional view of an embodiment a box shelf with a slideable shelf in a first position in accordance with one or more aspects of the present invention.

Looking first at FIGS. 34-36, a box-shelf 3405 includes a top 3420 and two sides 3422 that can be connected together to form part of a housing 3408. A recessed portion 3421 is provided so that in the event that the box-shelf 3405 is mounted under a shelf, the recessed portion 3421 will aid in ensuring there is no interference with the brackets that support the shelf or other structure that may extend downward (not shown). One or more shelf supports 3430 are mounted to the box shelf 3405 so as to enable the box shelf 3405 to be mounted to a vertical support (not shown) in a traditional manner.

A slidable shelf 3410 is mounted to one or more tracks 3416, which can be supported at least in part by the sides 3422. As depicted, the slidable shelf 3410 can include a support surface 3412 that supports a divider 3418 (which may be a pusher or a simple divider) and includes a rail 3445 mounted to the front of the shelf 3410. The rail in turn supports a retainer 3414.

As depicted, a door 3424 with one or more handles 3426 can be mounted to the top 3420 via hinge system 4010 and is coupled to a control unit 3515 that may be configured to produce an audible tone (immediately or after some predetermined delay) when the door is opened and may further be configured to provide a signal to a remote device so as to trigger video capture or security personal.

Slidable shelf 3410 translates via a track 3416 when locking feature 3525 is actuated. As can be appreciated, to translate the slidable shelf 3410, the door 3424 needs to be opened and in an embodiment, as depicted, the door may open up to 90 degrees. As can be appreciated, the rail 3445 can also be mounted on the top 3420 of the box shelf 3405.

It should be noted that details such as discussed above with respect to FIGS. 1-33 may also be incorporated into the embodiment depicted in FIGS. 34-59, where appropriate. Thus, where desirable and/or convenient, the above details may be incorporated.

Figure 37A:
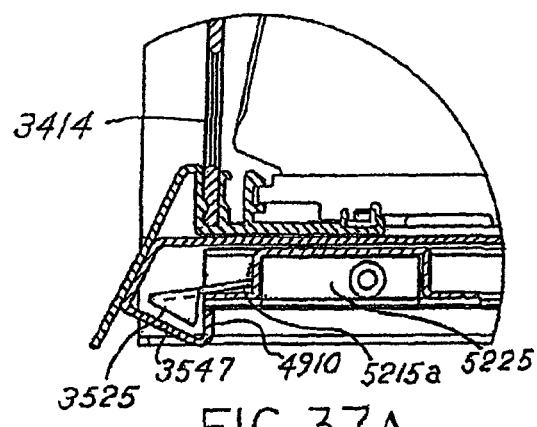
FIGS. 37a-37b depict cross-sections of an embodiment of a hinge plate engaging a blocking lip in accordance with one or more aspects of the present invention.
Figure 37B:
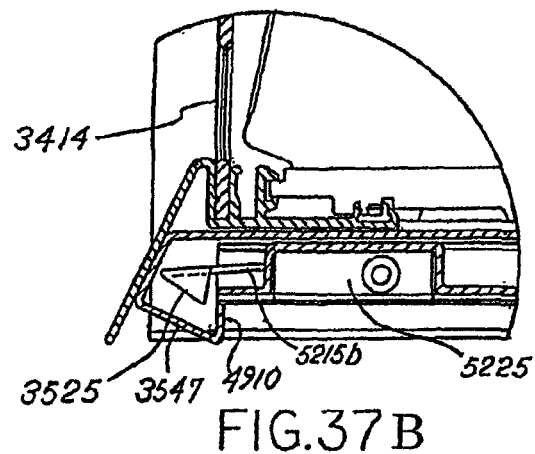

FIGS. 37a-37b show the locking feature 3525 in a locked or blocking position and an opening and non-blocking position. In an embodiment, an opening in the lip 3547 allows a key to be inserted so as to translate the locking feature 3525 from the locked to the open position. Thus, as can now be appreciated, the locking feature 3525 is shown in both the blocked and open position in a number of the Figures.

Figure 38:
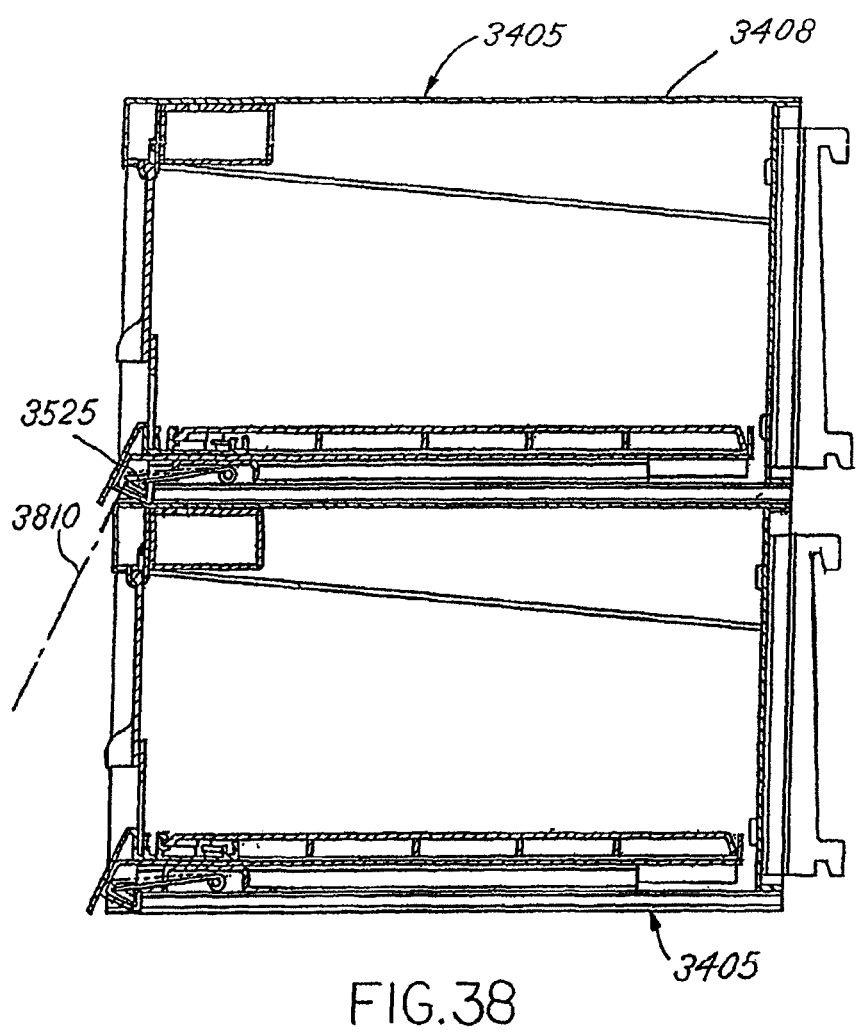
FIG. 38 depicts an embodiment of two box shelves stacked on top of each other in accordance with one or more aspects of the present invention.

As depicted in FIG. 38, one or more box shelves 34-5 may be mounted on top of each other. In such a configuration, a path 3810 can allow the insertion of a key (not shown) to actuate the locking feature 3525.

Figure 39:
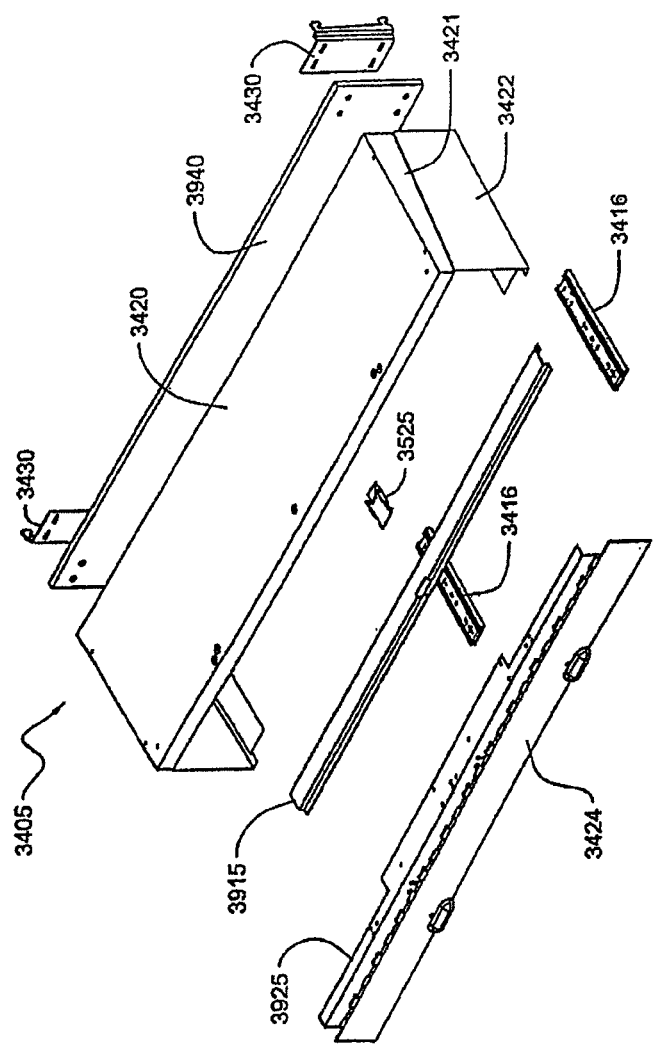
FIG. 39 illustrates a partial exploded view of an embodiment of a box shelf in accordance with one or more aspects of the present invention.
Figure 40:
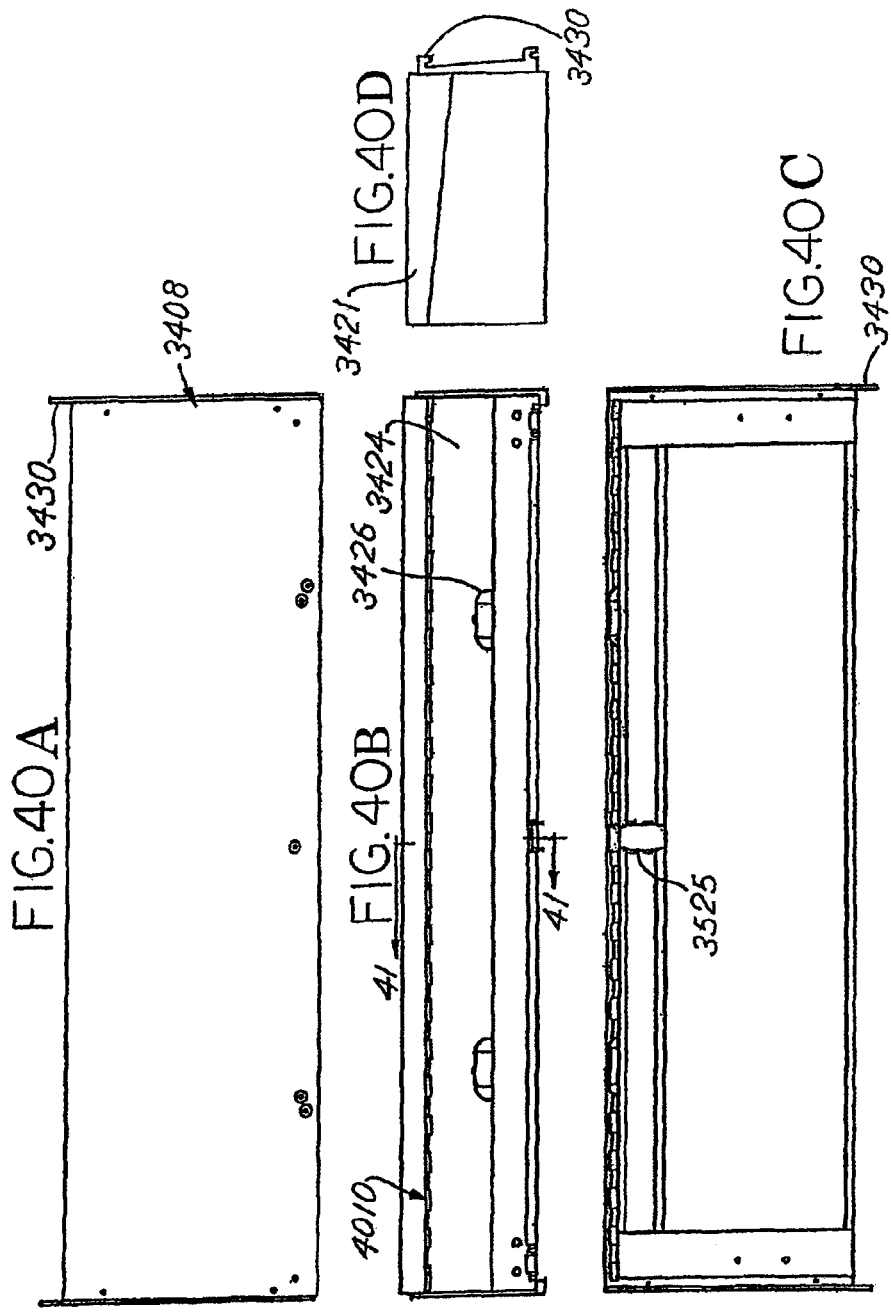
FIGS. 40a-40d illustrate various views of an embodiment a housing in accordance with one or more aspects of the present invention.
Figure 41:
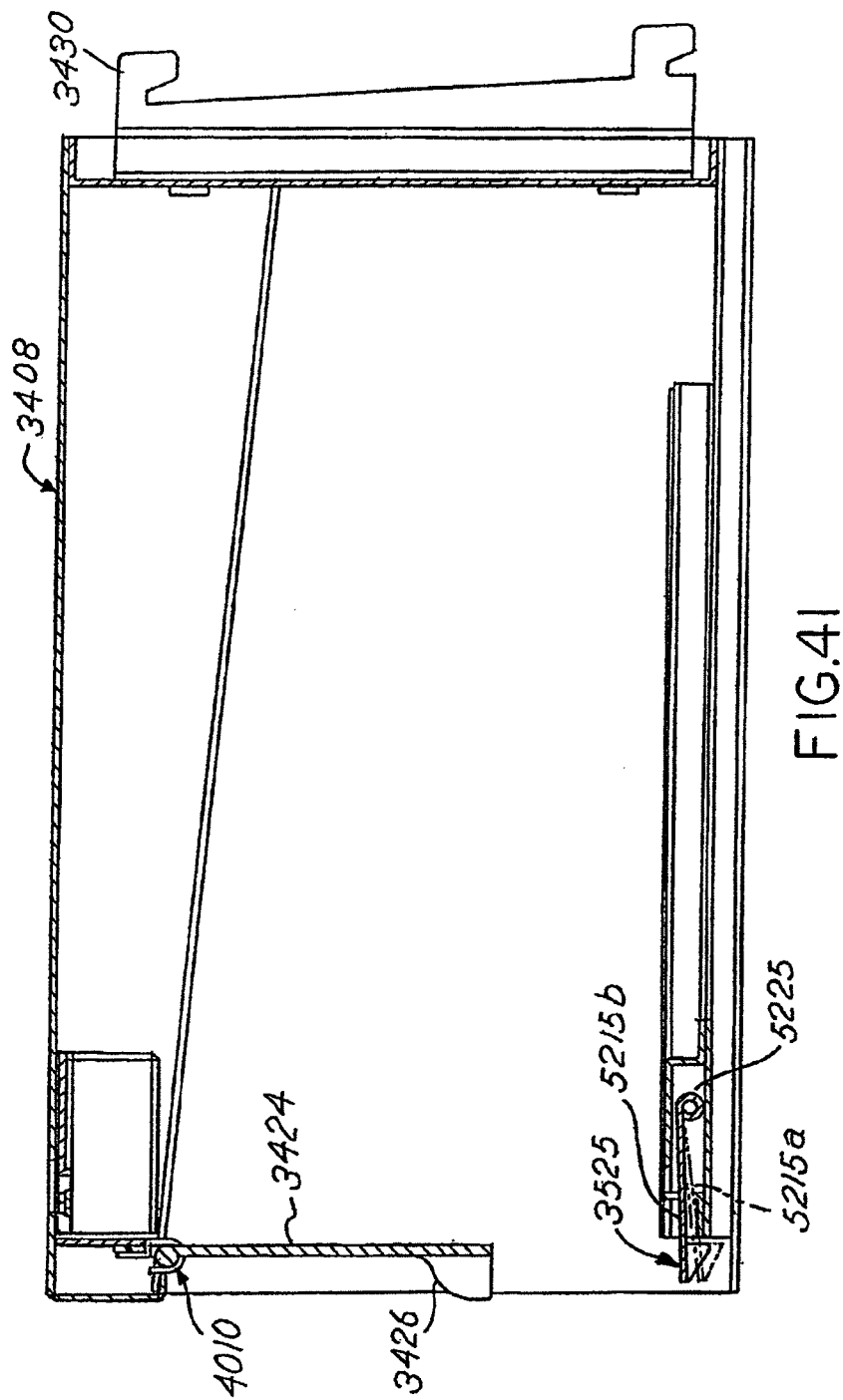
FIG. 41 illustrates a cross-sectional view of an embodiment of a housing and a door in accordance with one or more aspects of the present invention.
Figure 42:
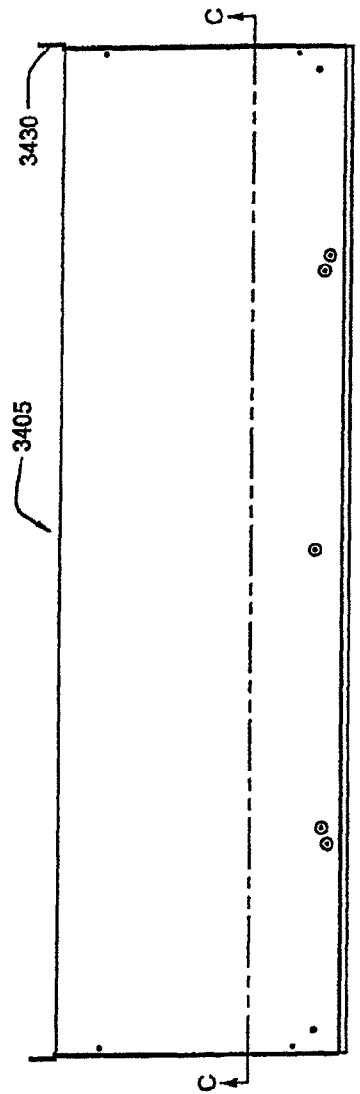
Figure 43:
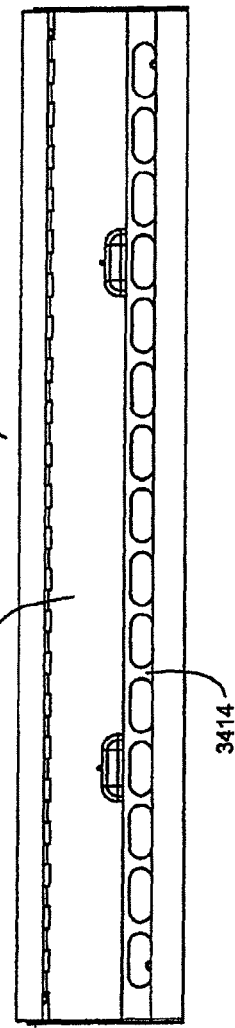

As can be appreciated from FIG. 39, the door 3424 can be pivotally mounted to support 3925. Furthermore, a hat channel 3915 can be provided for additional strength and rigidity of the box shelf 3405. The hat channel 3915 may also be used to support the locking feature 3525 and/or one or more tracks 3416. As depicted, two shelf supports 3430 (sometimes referred to as brackets) are mounted to a rear panel 3940 and include slots so as to allow the box shelf to be mounted to vertical supports in an adjustable manner even if the position of the vertical supports include some degree of tolerance stack-up. The shelf supports 3430 can be connected to one or more vertical rails (not shown) of a shelving structure.

FIGS. 40-47 illustrate additional details of the depicted embodiment of the box shelf. It should be noted that the box-shelf may be constructed out of known materials, such as powder coated 18 gauge steel or some other appropriate material. FIG. 48 illustrates an embodiment of the support surface 3412 and includes reference to cross-sections J-J and P-P. As can be appreciated from FIGS. 49-51, the lip 3547 can include a blocking lip 4910 in the center of the shelf (or in some other location aligned with the locking feature 3525) but the blocking lip may not be required in other locations, thus allowing (but not requiring) a reduction in the amount of material used to make the support surface 3412.

FIGS. 52-54 illustrate details one embodiment of the locking feature 3525. FIG. 52 shows the hinge plate 5215 both in a partially exploded view and in an installed position. As depicted, the hinge plate 5215 is mounted to hinge base plate 5225 by a fastener 5230 that couples to a nut 5240. A biasing element 5235 directs the hinge plate 5215 toward a first or locked position. Thus, hinge plate 5215a is a locked position and hinge plate 5215b is an open position. As can be appreciated, however, numerous other methods of mounting the hinge plate 5215 to the hinge base plate 5235 are possible.

Figure 46:
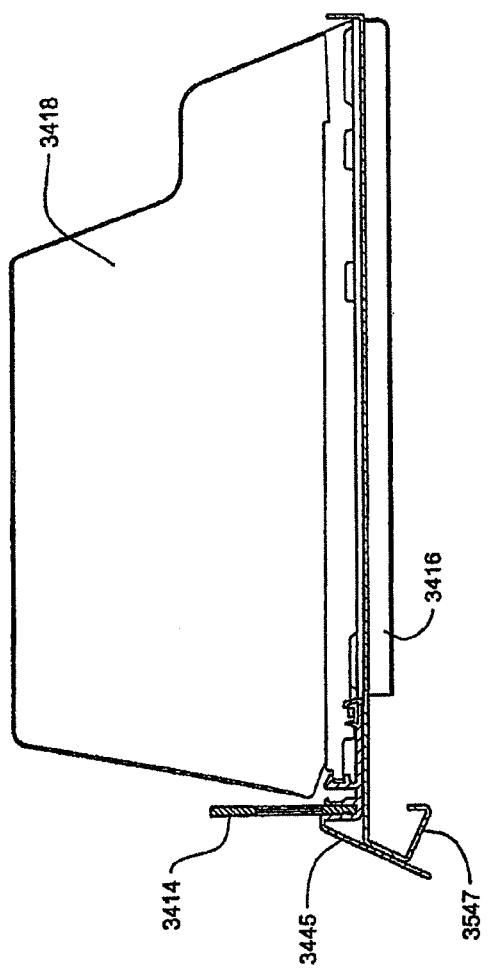
FIG. 46 illustrates a cross-section of a slideable shelf with a divider in accordance with one or more aspects of the present invention.
Figure 47:
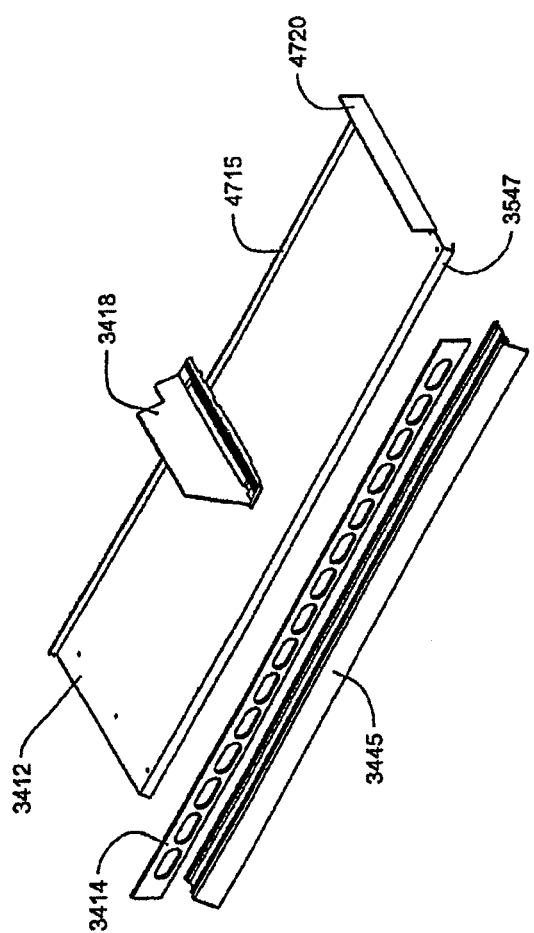
FIG. 47 illustrates a partially exploded view of a slideable shelf in accordance with one or more aspects of the present invention.
Figure 51:
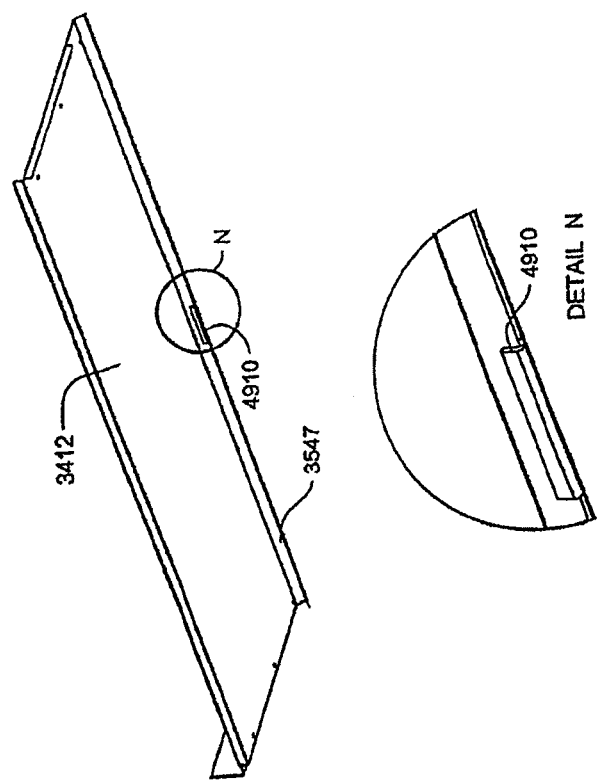
FIG. 51 illustrates an embodiment of a portion of a slideable shelf in accordance with one or more aspects of the present invention.
Figure 54A:
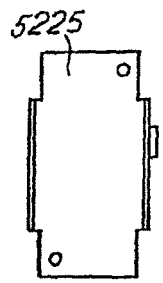
FIGS. 54*a*-54*f* illustrate a number of views of an embodiment of a hinge base configured to couple with the hinge plate of FIG. 53 in accordance with one or more aspects of the present invention.
Figure 54D:
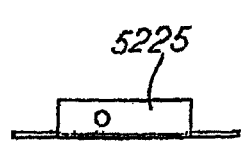
Figure 54C:
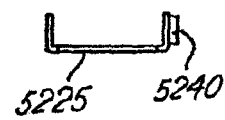
Figure 54B:
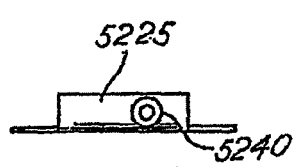
Figure 54E:
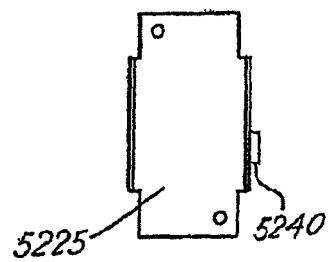
Figure 54F:
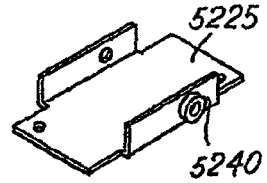
Figure 57:
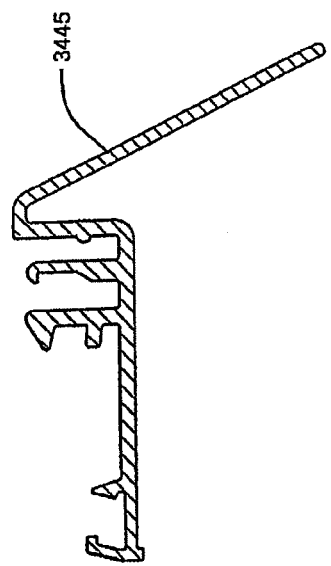
FIG. 57 illustrates a cross-section of an embodiment of a rail in accordance with one or more aspects of the present invention.
Figure 58:
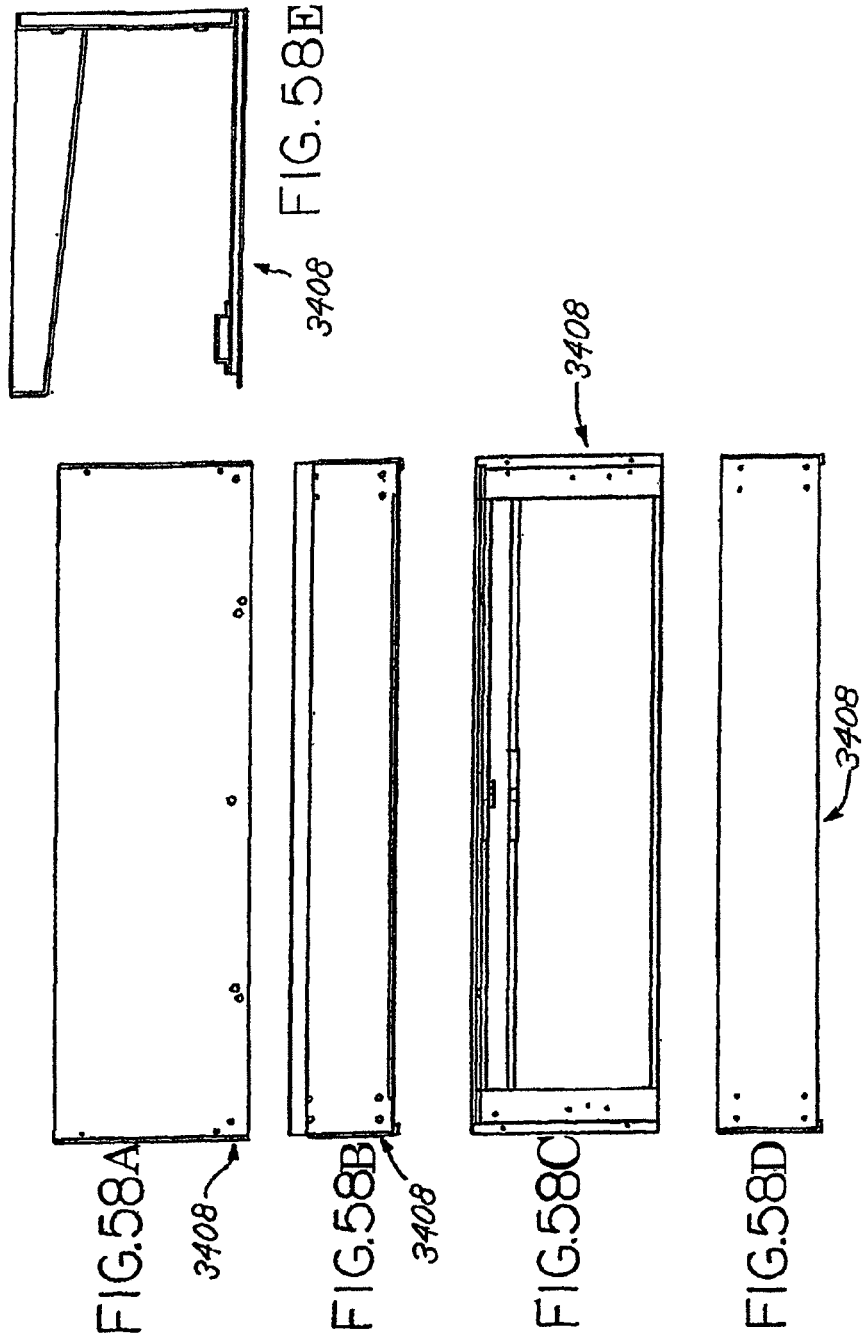
FIGS. 58*a*-58*e* illustrate various views of an embodiment of a housing of a box shelf in accordance with one or more aspects of the present invention.
Figure 59:
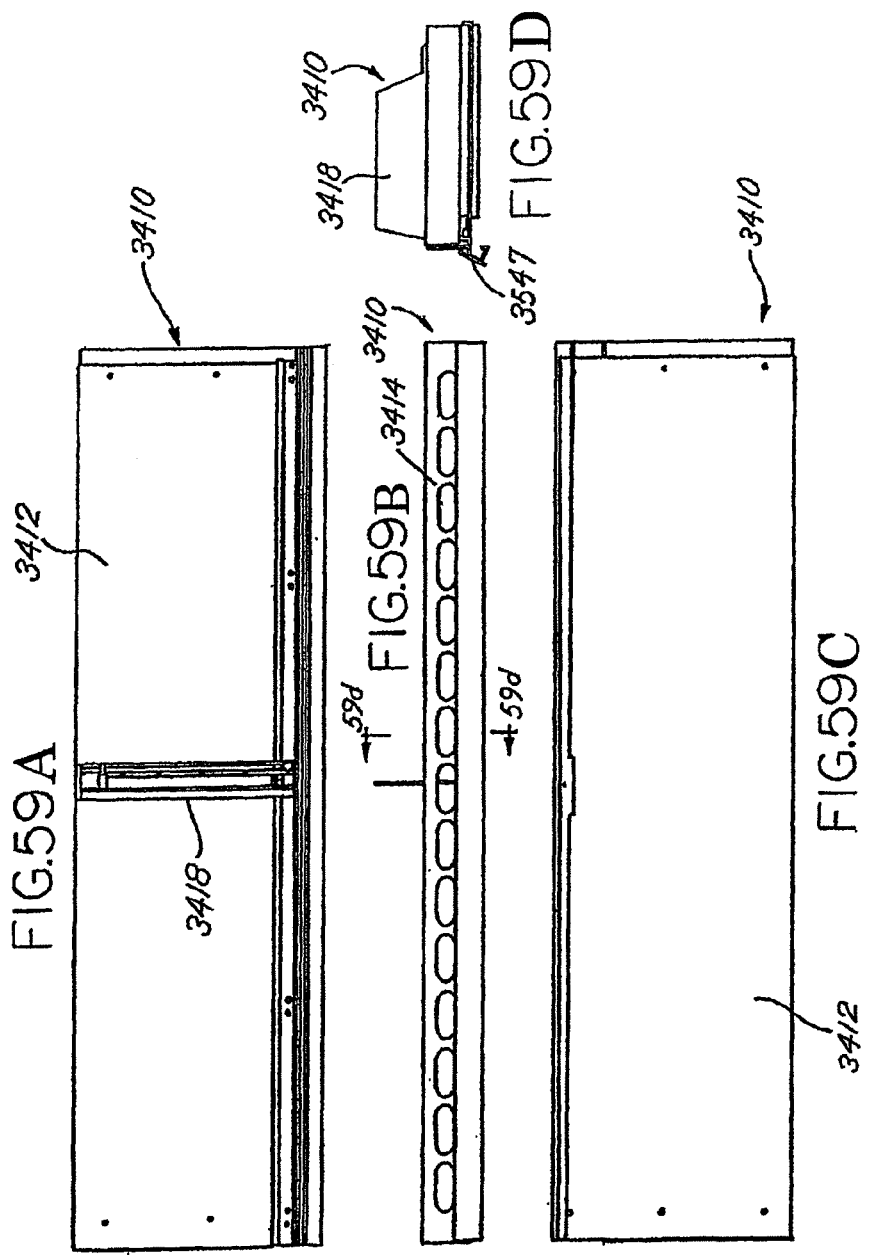
FIGS. 59*a*-59*d* illustrate various view of an embodiment of slideable shelf in accordance with one or more aspects of the present invention.

FIGS. 54-59 illustrate additional details regarding embodiments of the locking feature 3525, shelf support 3430 and other potential elements of the box shelf 3405. In addition, FIG. 59 depicts section H-H, from which FIG. 46 is taken. It should be noted that any dimensional references are merely exemplary and are not intended to reflect any limitations to the present invention unless otherwise noted.

FIGS. 60-73 illustrate another aspect of the invention, namely a low profile shelf system that improves the merchandising of product. The low profile shelf system improves product merchandising by creating more spacing between shelves to accommodate larger product. In some stores, there are large product sections wherein product management systems, such as those described above, are not the most ideal systems to use because there is not sufficient height (i.e., spacing) between shelves to add such a system. In these instances, the product is merchandised so tightly between shelves that adding a product management system, such as those described above, raises the product such that it may interfere with the shelf above. Occasionally, retailers are not willing to adjust the shelves to incorporate a product management system because such shelf adjustments typically must be done in fixed increments (e.g., one inch increments), and moving shelves by such increments can sometimes lead to the undesirable eliminating of a shelf, such as the top shelf.

Figure 60:
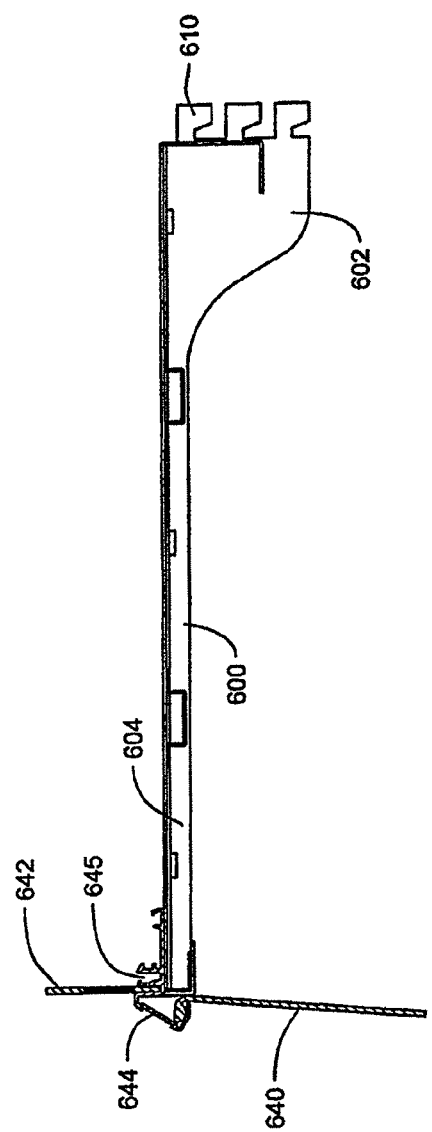
FIG. 60 is a side view of an exemplary low profile shelf support.

As depicted in FIGS. 60-73, the invention solves this problem by using low-profile shelf supports 600. Each low-profile shelf support 600 may define a back portion 602 and a front portion 604. The back portion 602 may include a fastening plate 606 attached thereto (FIG. 72), each fastening plate 606 having at least one hook formation 610 that can be inserted into a slotted upright (not shown). The fastening plate 606 may be fastened to the shelf support through the use of fasteners 623. Alternatively, the back portion 602 may form the at least one hook formation 610 (FIG. 60). As shown in FIG. 60, the back portion 602 of the shelf support 600 may have a thickness that is substantially greater than the thickness of the front portion, resulting in the front portion 604 having a significantly lower profile than the back portion of the shelf support 600. This reduced profile of the front portion results in greater clearance between product shelves to accommodate larger product and/or the installation of the product management systems described herein. In one embodiment, the thickness of the back portion 602 may be 75% greater than the thickness of the front portion 604. Other thicknesses of the front and back portions are possible to create the desired low profile shelf support configuration.

Figure 61:
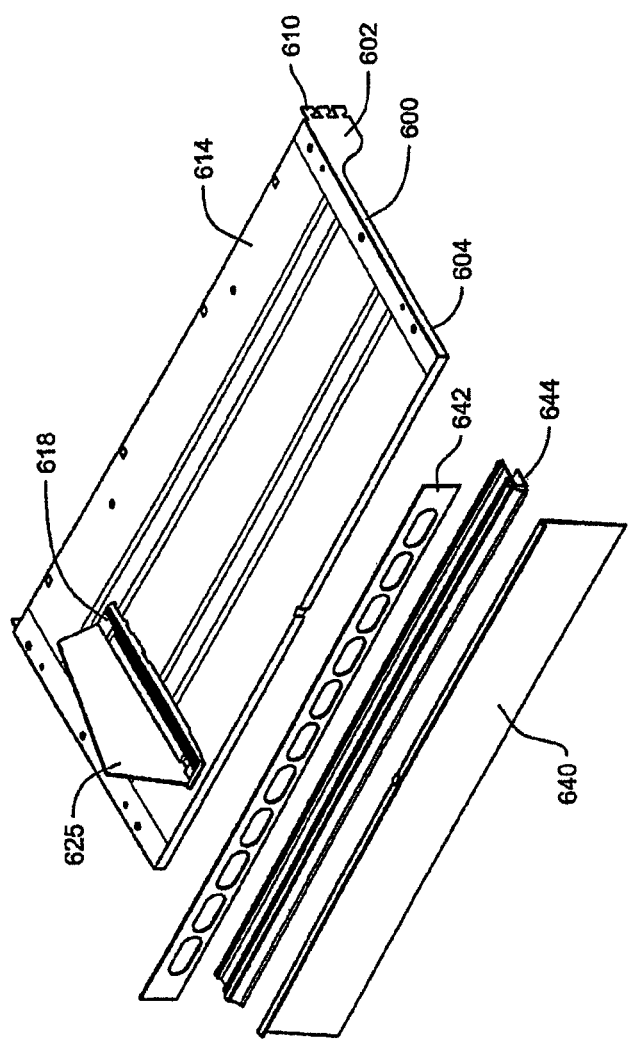
FIG. 61 is an exploded isometric view of a shelf system incorporating the low profile shelf support of FIG. 60.
Figure 62:
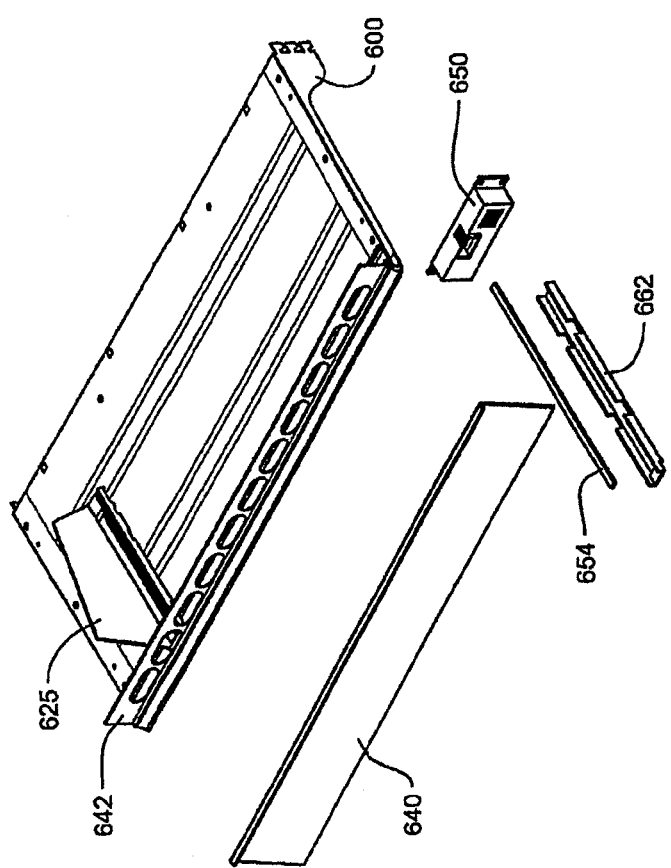
FIG. 62 is another exploded isometric view of a shelf system incorporating the low profile shelf support of FIG. 60.
Figure 73:
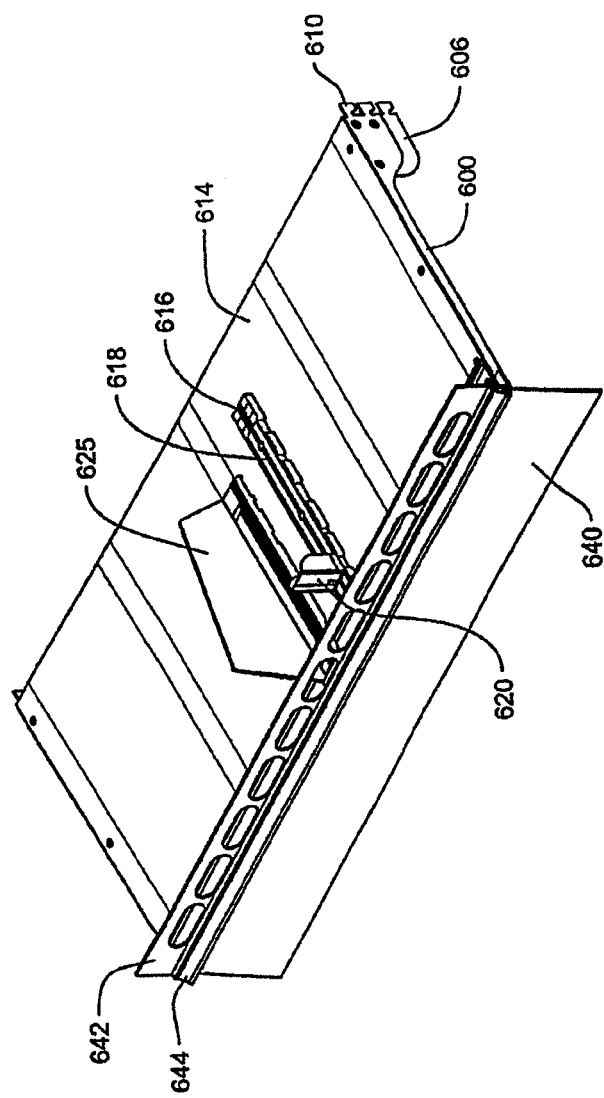
FIG. 73 is an isometric view of the shelf system of FIG. 72.
Figure 74:
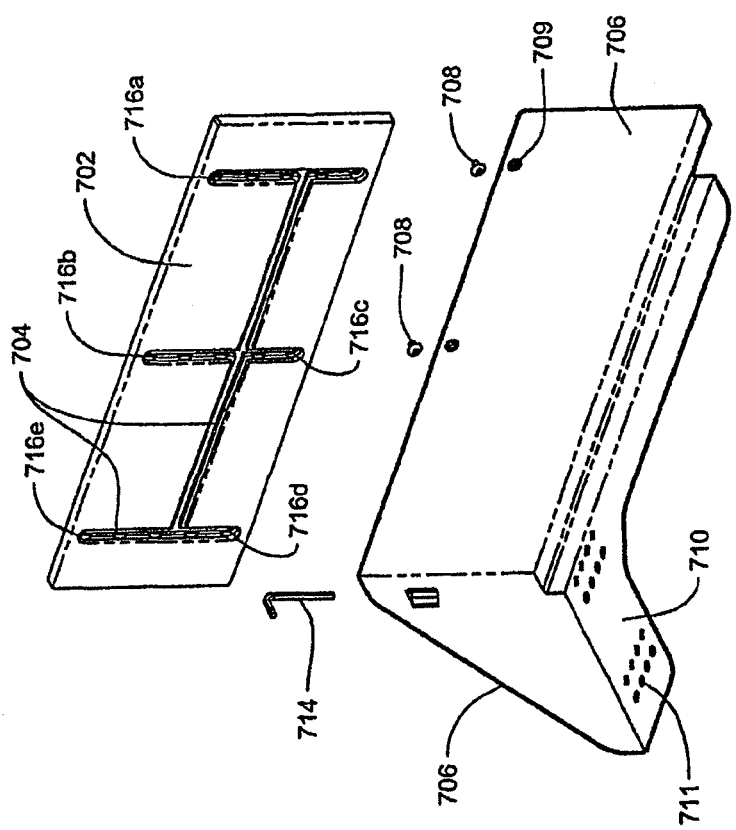
FIG. 74 is an isometric view of an adjustable wall that may be used to provide further security for product on a shelf or a portion of a shelf.

Referring to FIGS. 61 and 73, the shelf supports 600 may be positioned beneath and secured to a shelf 614. A pusher system 616 may be mounted to the shelf 614. The pusher system may include a pusher track 618 and a pusher 620. Any of the pusher systems described herein may be used with the low profile shelf supports 600. Additionally, a product divider 625 may be mounted to the shelf 614 or made part of the pusher system 616, as described herein.

Figure 63:
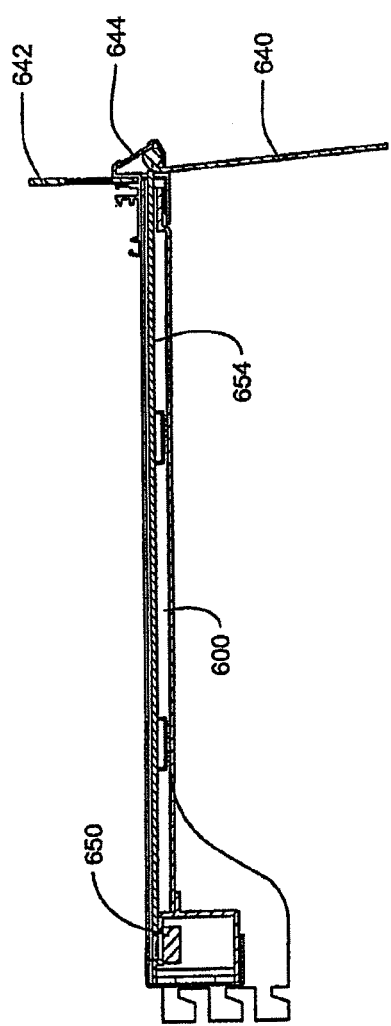
FIG. 63 is a side view of a shelf system incorporating the low profile shelf support of FIG. 60 and an alert device and moveable barrier.
Figure 64:
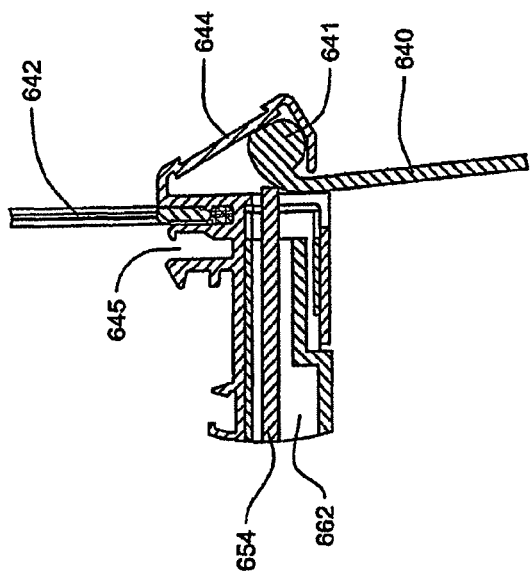
FIG. 64 is a partial enlarged view of the shelf system of FIG. 63 further illustrating the moveable barrier in contact with a linkage which is also in contact with the alert device.

Referring to FIGS. 60, 63 and 64, a pivotable barrier 640 and a front product retaining wall 642 may be mounted to a front rail 644, which may be mounted to the front of the shelf 614. The front rail 644 may include one or more channels 645 for receiving one or more retaining walls 642 or signage identifying the products being merchandised. The front rail 644 may also be configured to receive the pusher system 610 in either a slidable or non-slidable manner. The barrier 640 may be configured similar to the barriers described herein. Similarly, the retaining wall 642 may be configured similar to the retaining walls also described herein.

Figure 65:
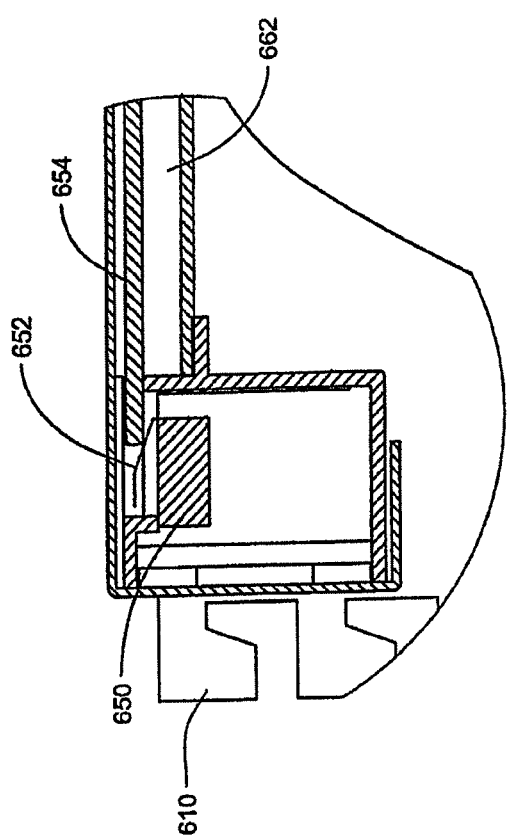
FIG. 65 is a partial enlarged view of the shelf system of FIG. 63 further illustrating the alert device in contact with a linkage which is also in contact with the moveable barrier.
Figure 66:
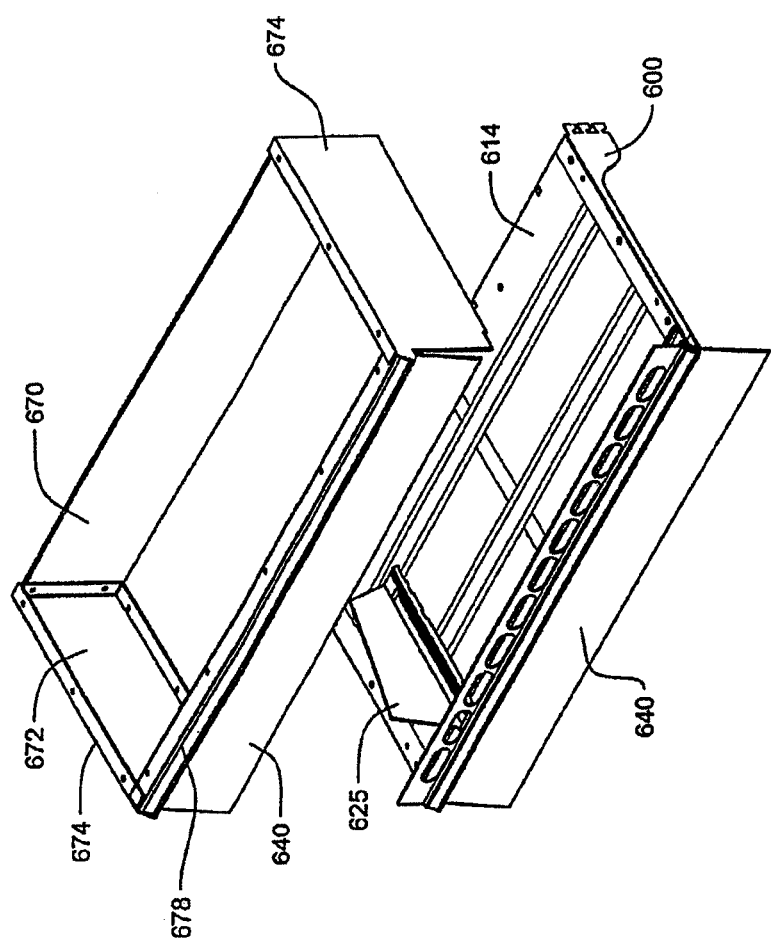
FIG. 66 is an isometric view of the shelf system of FIG. 61 with a box shelf mounted to the shelf.
Figure 67:
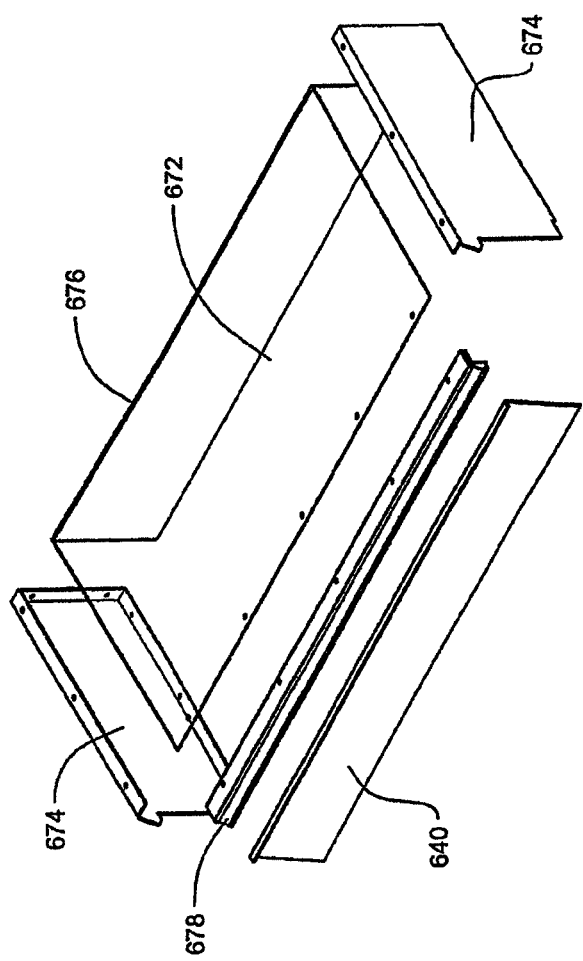
FIG. 67 is an isometric exploded view of the box shelf of FIG. 66.
Figure 68:
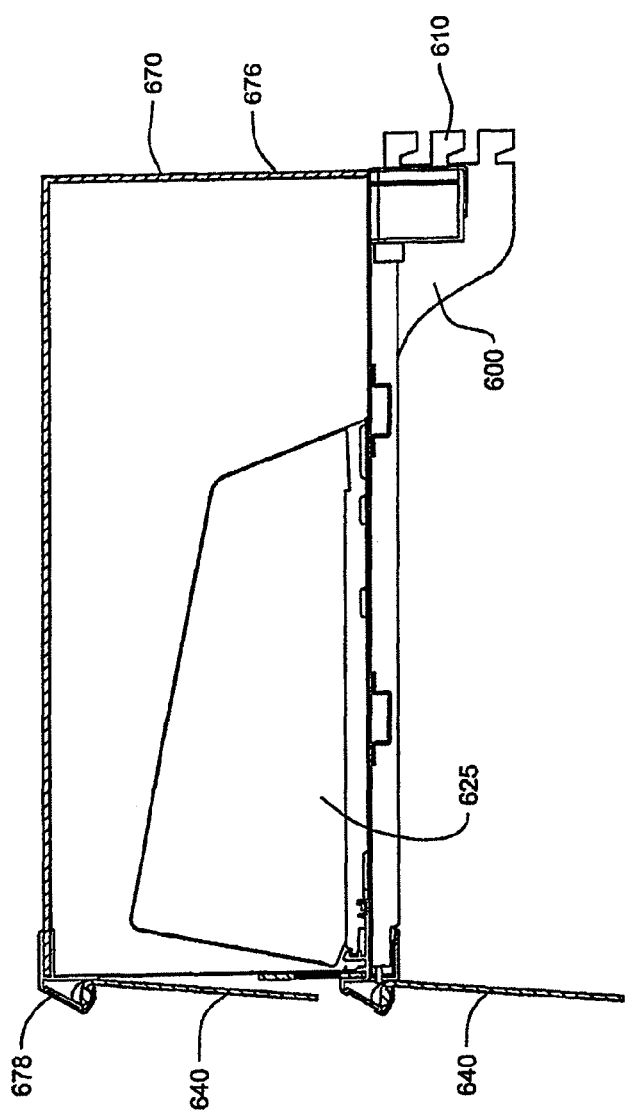
FIG. 68 is a side view of the shelf system of FIG. 66.

Referring to FIGS. 62-65, an alert device 650 may be mounted to the shelf 614 at or near the back portion 602. Similar to alert device 142, the alert device 650 may be used to detect when the pivotable barrier 640 is moved or opened and send an appropriate alert signal, as illustrated above. With this embodiment, the alert device 650 may include a switch 652 that is activated by a linkage 654 that operatively contacts the pivotable barrier 640 (FIG. 64). The linkage 654 may be a metal or plastic rod or flat stock of a suitable material. With this embodiment, the barrier 640 may include a cam-shaped end 641 mountable to the front rail 644, as shown in FIG. 64, the cam-shaped end 641 configured to contact and cause movement of the linkage 654 when the barrier 640 pivots. The linkage 654 in turn may contact the switch 652 of the alert device 650 (as shown in FIG. 65) to activate the alert device 650, which will send or emit the desired alert signal. A linkage cover 662 may be mounted over the linkage 654 to cover and protect the linkage 654.

Figure 69:
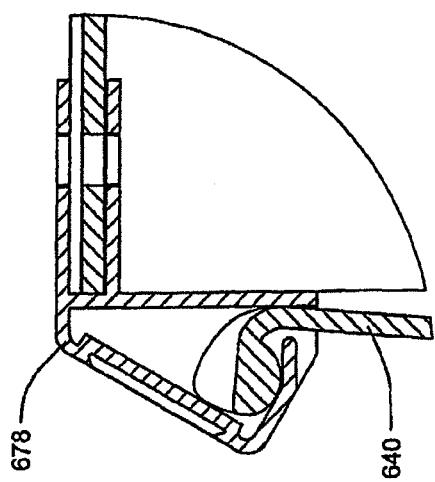
FIG. 69 is a partial enlarged view of the shelf system of FIG. 68.

Referring to FIGS. 66-69, a security box-shelf 670 may be secured to the low-profile shelf support 600 (or to the vertical uprights) and over the pusher system 610. The box-shelf 670 may be provided as a complete unit that provides theft-prevention benefits as discussed above and may be configured to be self-contained so as to eliminate the need for a support shelf. The box-shelf 670 may include a top 672 that may be made of clear material to permit products to be seen in the box-shelf 670. The box-shelf 670 may also include two sides 674 and a back wall 676 that may be joined together to form the box-shelf 670. A front security rail 678 may be mounted to the top 672 (as shown in FIG. 69). The security rail 678 may also be configured to receive a pivotable barrier 640. The barrier 640 may be similar to the barriers described above and may be opened to permit access to the products merchandised within the box-shelf 670. An alert device may also be operatively coupled to the barrier 640.

Figure 70:
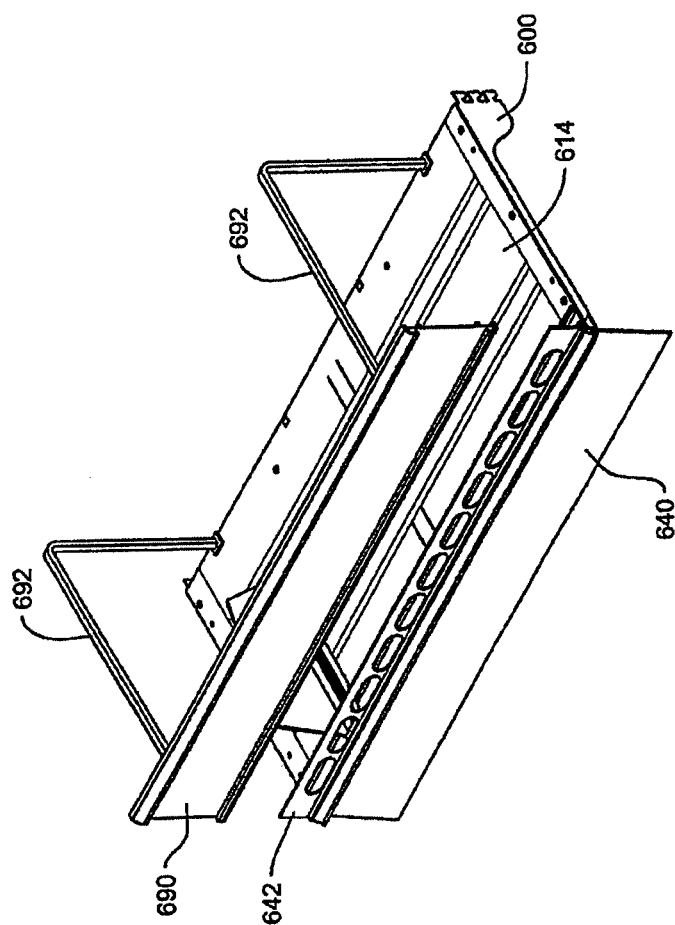
FIG. 70 is an isometric view of the shelf system of FIG. 61 with signage mounted to the shelf.
Figure 71:
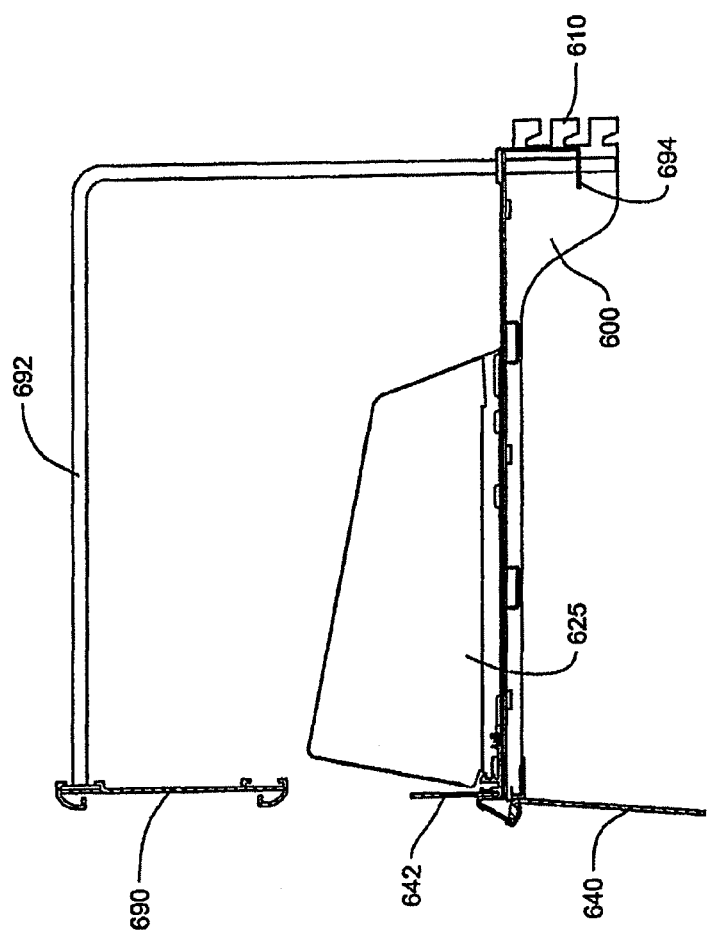
FIG. 71 is a side view of the shelf system of FIG. 70.

Referring to FIGS. 70-71, optional signage 690 may be mounted to the shelf 614 that is supported by the low profile shelf supports 600. One or more signage supports 692 may be used to support the signage 690. The supports may be mounted to one or more horizontal mounting brackets 694 for added stability of the signage 690.

Figure 72:
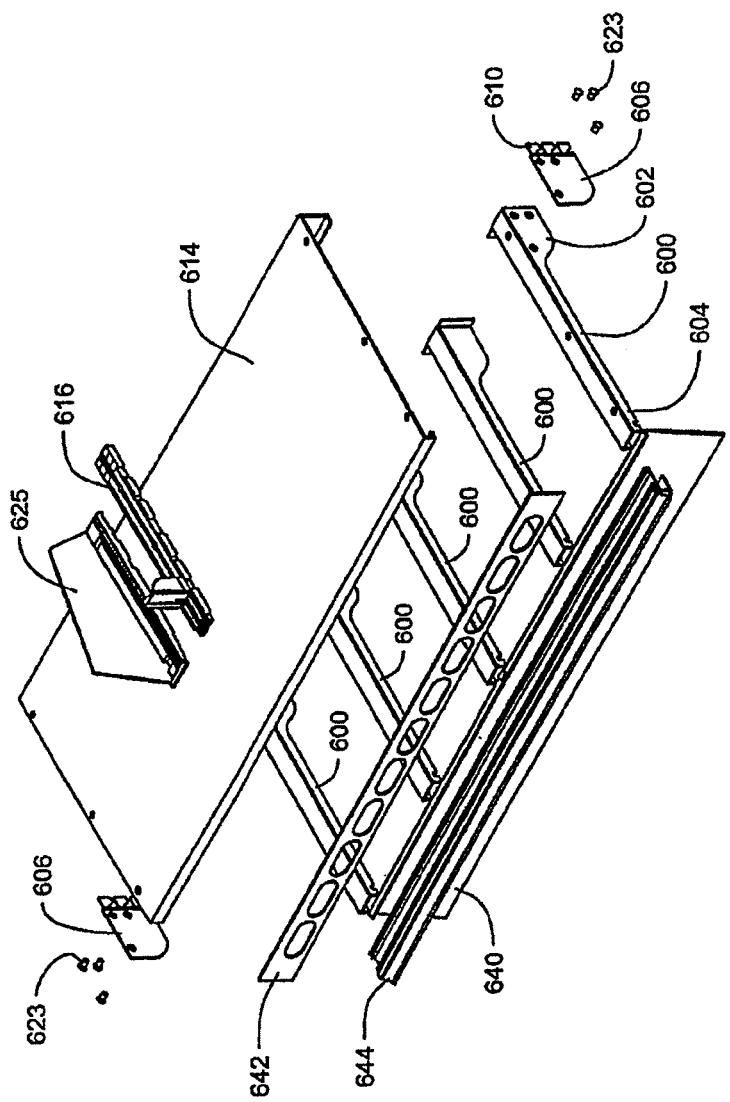
FIG. 72 is an isometric exploded view of the shelf system of FIG. 61 with multiple low profile shelf supports and with optional mounting brackets.

Referring to FIGS. 72-73, it should be understood that multiple low profile shelf supports 600 may be positioned underneath the shelf 614, depending on the size and configuration of the shelf. It should further be understood that multiple pusher systems 616 and dividers 625 may be positioned on the shelf 614 to merchandise multiple rows of product on the shelf.

FIGS. 79-91 illustrate another aspect of the invention, namely a merchandise system 810. Similar to the other embodiments, the merchandise system 810 improves product merchandising by limiting the number and the frequency with which product can be removed from, for example, a merchandising shelf by using various methods such as slowing the rate at which product can be pushed towards the front edge of a merchandising shelf.

Referring to FIGS. 79-84, in an exemplary embodiment, merchandise system 810 includes a base 812. The base 812 defines a generally flat planar surface that may be configured to engage with or mount onto any known shelf used in a store, as well as any other merchandise system 810, and in any known mounting configuration and orientation. The base 812 defines a front edge 826, a back edge 828, a first side edge 820, a second side edge 822, and one or more tracks 814. As is further illustrated, a housing 850 can be mounted to the base 812 in any known mounting configuration and orientation. The housing 850 defines a top wall 852, a first side wall 854, a second side wall 856, and a front retaining wall 876. First and second side walls 854 and 856, respectively, can be used such that when more than one merchandise system 810 is placed adjacent to another like merchandise system 810 on a shelf or stacked on top of another like merchandise system 810, product resting on the base 812 of each respective merchandise system 810 remains separated or divided. In an embodiment, one merchandise system 810 can be stacked on top of another merchandise system 810 without need of a separate shelf between the two merchandise systems.

In an exemplary embodiment, front retaining wall 876 is mounted at an angle, (for example, approximately a 45° angle) relative to the base 812 and extends from the second side edge 822 to first side edge 820 towards the front edge 826. Angles other than approximately 45° are possible, including angles of approximately 15°, 30°, 60° and 75°, to name a few. Front retaining wall 876 can define a channel 888 located proximate the base 812. Channel 888 further can define a detent 886. Front retaining wall 876 and first side wall 854 define an opening 878 through which, as will be explained below, product can be removed by a customer or employee. In an embodiment, front retaining wall 876 does not fully extend from the second side edge 822 to first side edge 820. A lever 880 can be operatively coupled to the merchandise system 810 for ejecting product through the opening 878. In an exemplary embodiment, lever 880 is slidably mounted within the channel 888. The lever 880 can include a lever biasing element 882 and a lever hook 884 adapted to move product. As illustrated, lever biasing element 882 can be a coil spring positioned between lever hook 884 and detent 886. The one or more tracks 814 extend along the base 812 from the back edge 828 to the front retaining wall 876. As shown, a track 814 can be used with a pusher 816. It should be understood that more or less than two tracks could be used with the invention, depending on the particular application. The base 812 further defines a rack aperture 988 for use with a rack 986 as will be discussed below.

Figure 88:
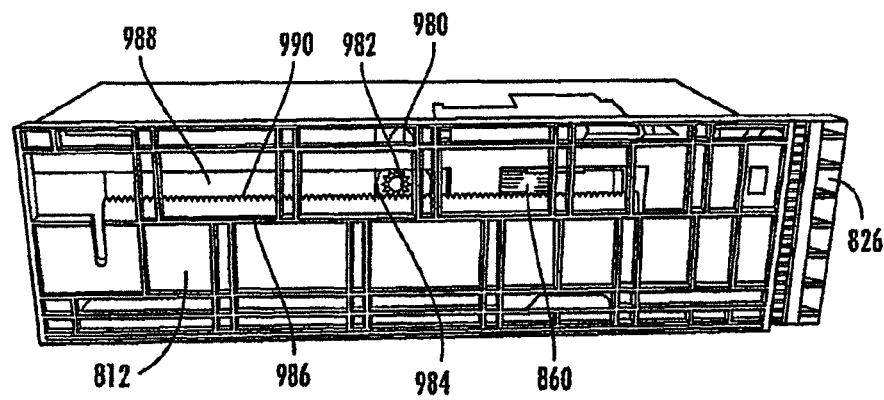
FIG. 88 is a bottom view of an exemplary merchandising system.
Figure 89:
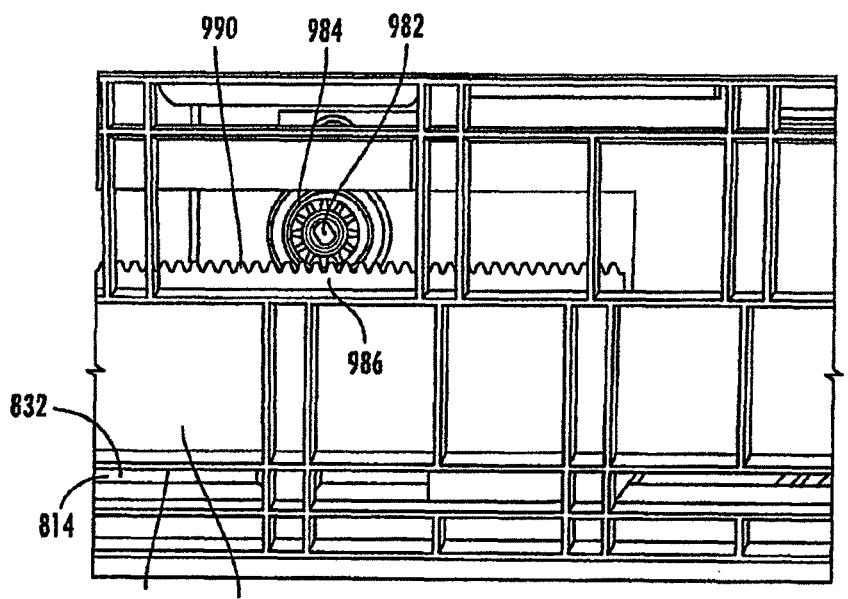
FIG. 89 is a partial bottom view of the merchandising system of FIG. 88.

Referring to FIGS. 88 and 89, in an exemplary embodiment, the one or more tracks 814 extend longitudinally along the length of the base 812 and define at least one rail 830 and an elongated aperture or channel 832 in the base 812. The aperture 832 and rail 830 are sized and shaped to receive and mount a mating element of the pusher 816. The pusher 816 is slidably mounted to the base 812 such that the pusher 816 does not lift out of the track 814. The present invention contemplates the use of other shapes of rails and apertures to mount the pusher 816 to the base 812. Other pusher mounting techniques are possible with the invention.

The pusher 816 also contains at least one pusher urging element 860 used to urge the pusher 816 toward the front of the shelf. The pusher urging element 860 may be any biasing element including, without limitation, a flat coil spring. The present invention may use one or more pusher urging elements 860 to urge the pusher 816 depending on the desired application. The pusher urging element 860 may be mounted to the pusher 816 and the base 812 using any known mounting technique. In the exemplary embodiment, one end of the pusher urging element 860 is secured to the base 812 near the front edge 826 of the base 812, and the opposing end of the pusher urging element 860 is positioned behind the pusher 816 to urge the pusher 816 toward the front of the shelf. Further, pusher 816 includes an angled pusher face 892. In an exemplary embodiment, angled pusher face 892 is positioned such that its angle relative to the base 812 corresponds to the angle of front retaining wall 876. It should be understood, however, that angled pusher face 892 can be positioned at other angles and can have various dimensions and shapes.

Figure 85:
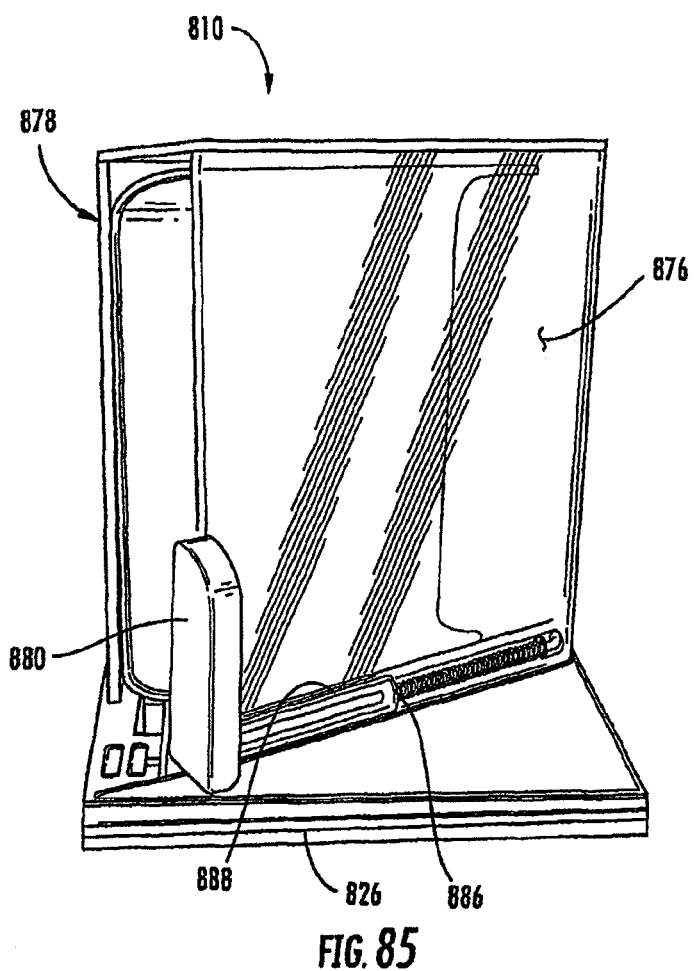
FIG. 85 is another front view of the merchandising system of FIG. 79.
Figure 86:
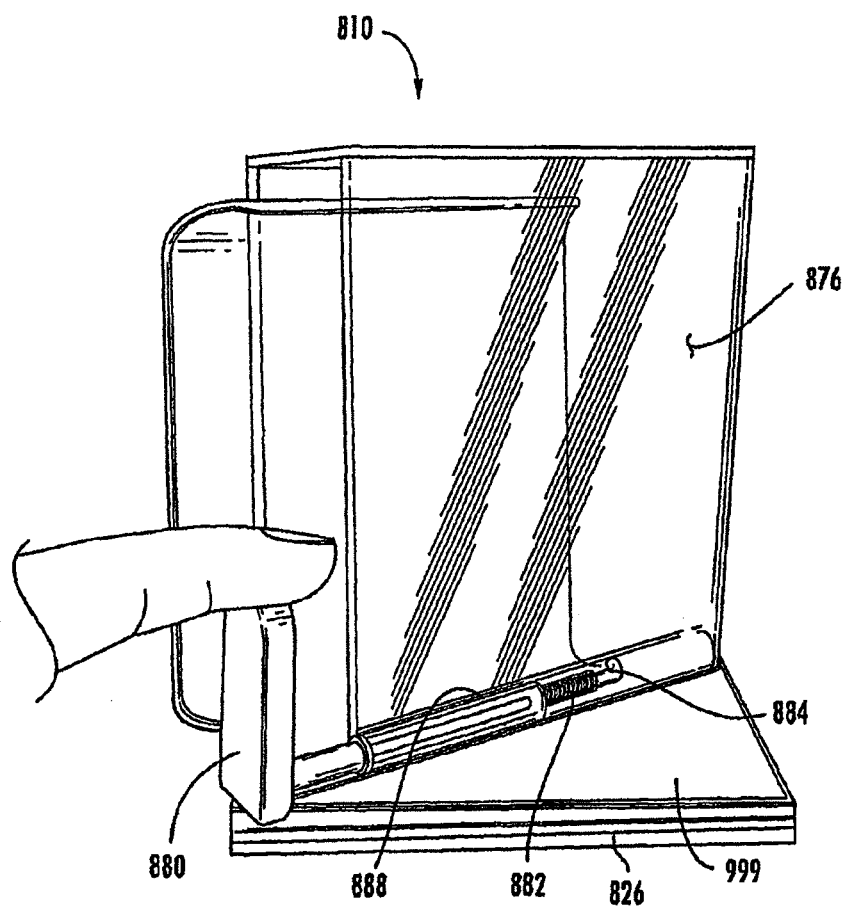
FIG. 86 is another front view of the merchandising system of FIG. 79 illustrating product being removed from the merchandising system.
Figure 87:
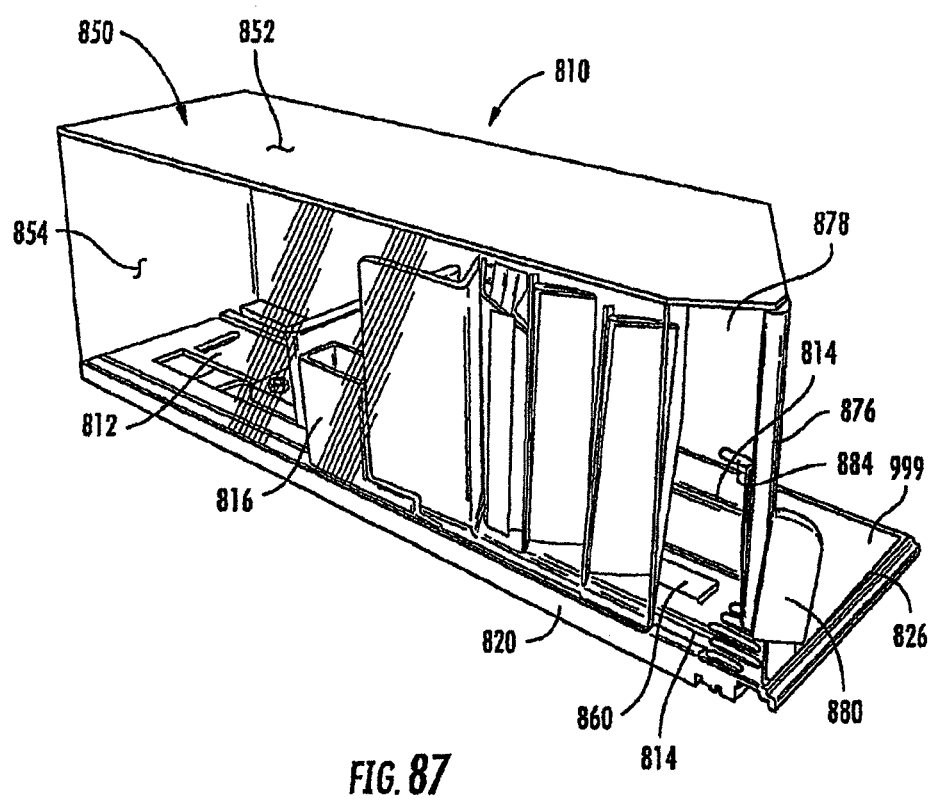
FIG. 87 is another isometric view of the merchandising system of FIG. 79 illustrating product being moved toward the front end of the merchandising system.

Referring to an embodiment of the invention in FIGS. 85 and 86, pusher 816 will urge the product toward the front retaining wall 876. When product is positioned between the front retaining wall 876 and pusher 816, only a single product can be accessed by customers or employees because the opening 878 is equal in dimension to less than the width of two products. In an embodiment, the opening 878 is no more than approximately 50% wider that the width of a single product. In another embodiment the opening 878 is roughly the width of a single product yet wide enough to allow a single product to pass through the opening 878. The positioning and dimensions of opening 878, in combination with the positive pressure the pusher 816 places on product against the front retaining wall 876, hampers a customer or employee's ability to remove products using solely digits (i.e., fingers) or digital force. To facilitate the removal of a single product, when product is positioned between the front retaining wall 876 and pusher 816, a force can be applied to lever 880 such that lever 880 can be slidably translated. As lever 880 is slidably translated, lever hook 884 engages the most forward positioned product. When the customer or employee slidably translates lever 880 to a fully extended position, the single product is partially ejected from the housing 850 and can be easily removed by the customer or employee. Further, when lever 880 is in a fully extended position, lever biasing element 882 is compressed between lever hook 884 and detent 886. Accordingly, when a customer or employee stops applying force to the lever 880, lever biasing element 882 biases lever 880 back into its original position.

In the embodiment described below, when customers or employees reach and pull out the product available to them, the pusher 816 is slowly urged toward the front retaining wall 876 by pusher urging element 860 and, after a predetermined period of time, a single product once again is positively pressured between the pusher 816 and the front retaining wall 876 such that the product is adjacent opening 878. An attempt by a customer or employee to remove or urge the next product forward after a first product is removed is hampered because the product is positioned at an angle corresponding to angled pusher face 892 and thus, if a customer or employee attempts to tip the product forward, the product will be biased in a standing position by the second side wall 856. The speed at which the pusher moves can be controlled by various devices including, without limitation, a dampened gear assembly discussed below. By providing a merchandise system that urges product forward at a slow rate of speed, a customer or employee can be inhibited from removing more than one product at a time and is assisted in removing product only once every pre-determined amount of time.

In an embodiment of the invention, to provide the desired slow rate of speed for the pusher 816, an exemplary dampened gear assembly 980 may be mounted to the pusher 816. The dampened gear assembly 980 may include a gear 982 and a gear housing 984 that can be filled with any dampening fluid known in the art. A portion of gear 982 is housed within gear housing 984. A rack 986 can be mounted to rack aperture 988. The rack 986 defines a plurality of teeth 990. Gear 982 of gear assembly 980 is adapted to engage the plurality of teeth 990 of rack 986. In operation, when product is removed from the base 812, and pusher 816 is urged forward by pusher urging element 860, gear assembly 980 acts to slow the rate at which pusher 816 is urged forward. This can be accomplished because rotation of gear 982 is regulated by the dampening fluid located in gear housing 984 which acts to resist movement of the gear 982 within gear housing 984. Again, other dampening techniques may be used with the present invention to affect the desired slow rate of movement of the pusher toward the front of the shelf.

In an embodiment, front retaining wall 876 is made of a clear or transparent material that allows for the product to be viewed through front retaining wall 876. In an embodiment, front retaining wall 876 enables advertisements or marketing materials to be placed on front retaining wall 876. Base 812 also can include a display area 999 (see FIG. 79) for advertising or marketing material as well as product information such as product pricing information. Because display area 999 can include product information, merchandise system 810 can be, as was discussed above, stacked on top of another like merchandise system 810 without the use of shelves.

In an embodiment, a locking device (not shown) can be used to prevent the removal of product. Such locking device may include a rotatable barrier, a door, or a locking clip. The locking device, for instance, could prevent product from fitting through opening 878 such that when the merchandise system 810 is not in use, neither employees nor customers can access the product.

It should be understood that the merchandise system 810 can be altered such that first side wall 854 and second side wall 856 are reversed and thus, opening 878 is on the opposite side. As can be understood by one in the art, in this embodiment, the angled pusher face 892, front retaining wall 876, and the lever 880, among other things, are also reversed.

Figure 90:
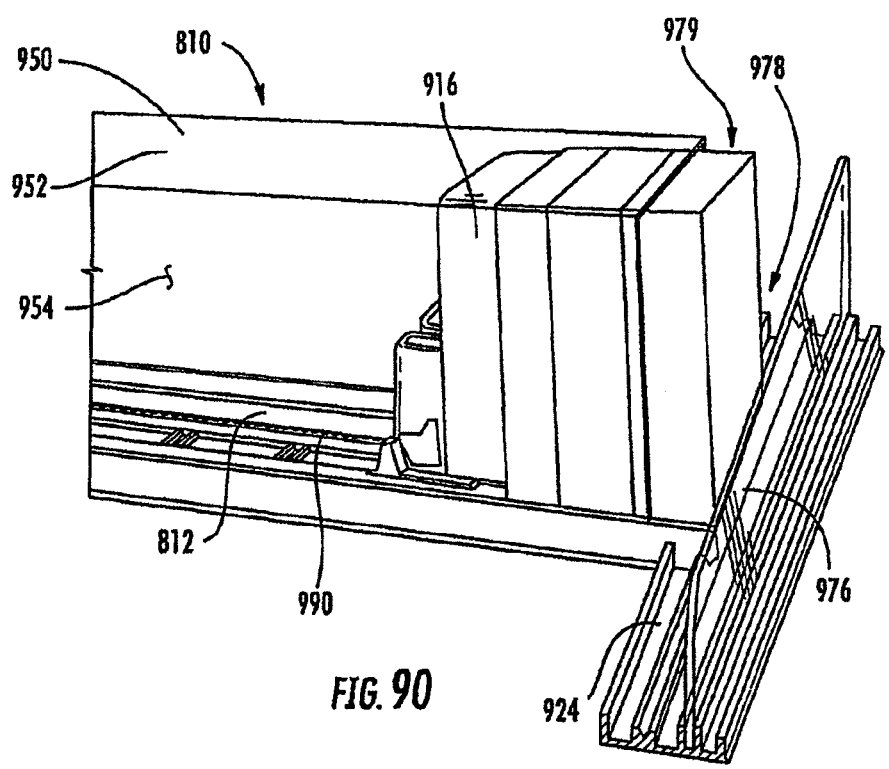
FIG. 90 is a side view of an exemplary merchandising system.
Figure 91:
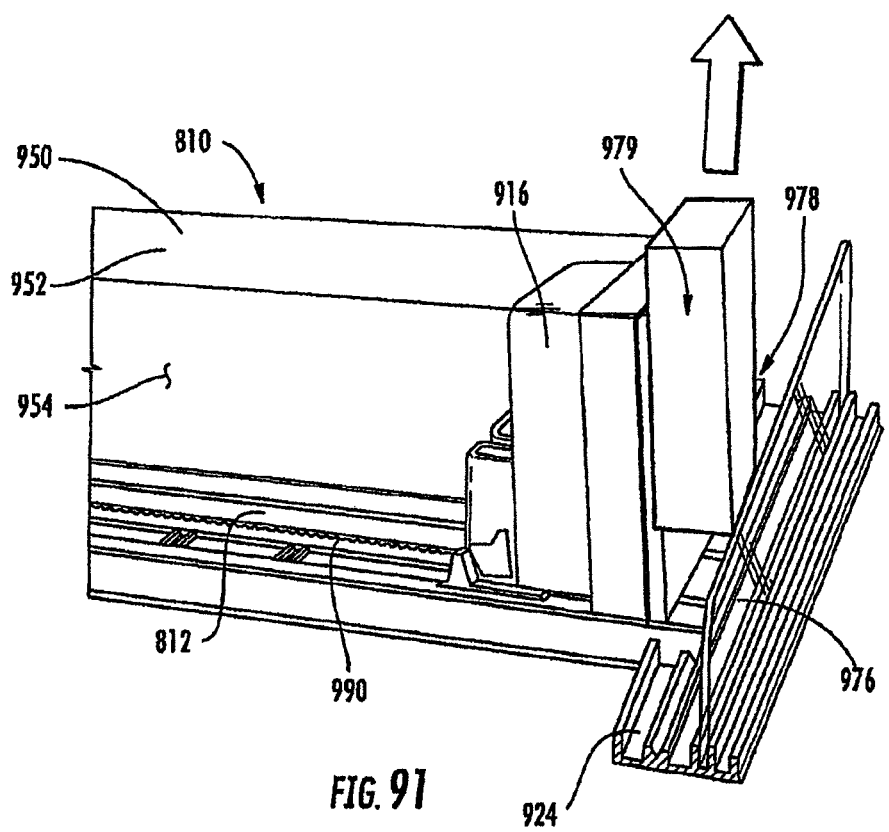
FIG. 91 is another side view of the merchandising system of FIG. 90 illustrating product being removed from the merchandising system.

Referring to FIGS. 90 and 91, in another embodiment, a housing 950 defines a top wall 952, a first side wall 954, and an opposing second side wall. A front edge of the base 812 is configured to mount to or on a rail 924 in any known manner. As discussed above, the base 812 may include a rack and rack aperture wherein the rack defines a plurality of teeth 990 (as shown in FIGS. 90 and 91) such that a gear of a gear assembly can be adapted to engage the plurality of teeth 990. The rail 924 includes a front retaining wall 976 to retain product that is pushed toward the rail. Front retaining wall 976 and housing 950 define an opening 978 that is roughly equal to the width of a single product. The pusher 916 will urge the product toward the rail 924. When one merchandise system 810 is be placed adjacent to another like merchandise system 810 on a shelf, product can only be removed through the top portion 979 of the opening 978. Accordingly, when product is positioned between the front retaining wall 976 and pusher 916, only a single product can be accessed by customers or employees. It will be further understood that a device, such as a lever trigger (not shown), may be used to facilitate a customer or employee to partially or fully eject product through the top portion 979 of the opening 978.

FIGS. 92A-101C illustrate another aspect of the invention, namely a merchandise system 1010. Similar to the other embodiments, the merchandise system 1010 improves product merchandising by limiting the number and the frequency with which product can be removed from, for example, a merchandising shelf by using various methods such as an electronic lock-out mechanism which locks the merchandising shelf and multiple shelves when too many products are removed at one time. The merchandise system 1010 may generally include a base 1012 and housing 1050, a door assembly or door 1020, a locking assembly, and an electronic control unit 1080.

Figure 92A:
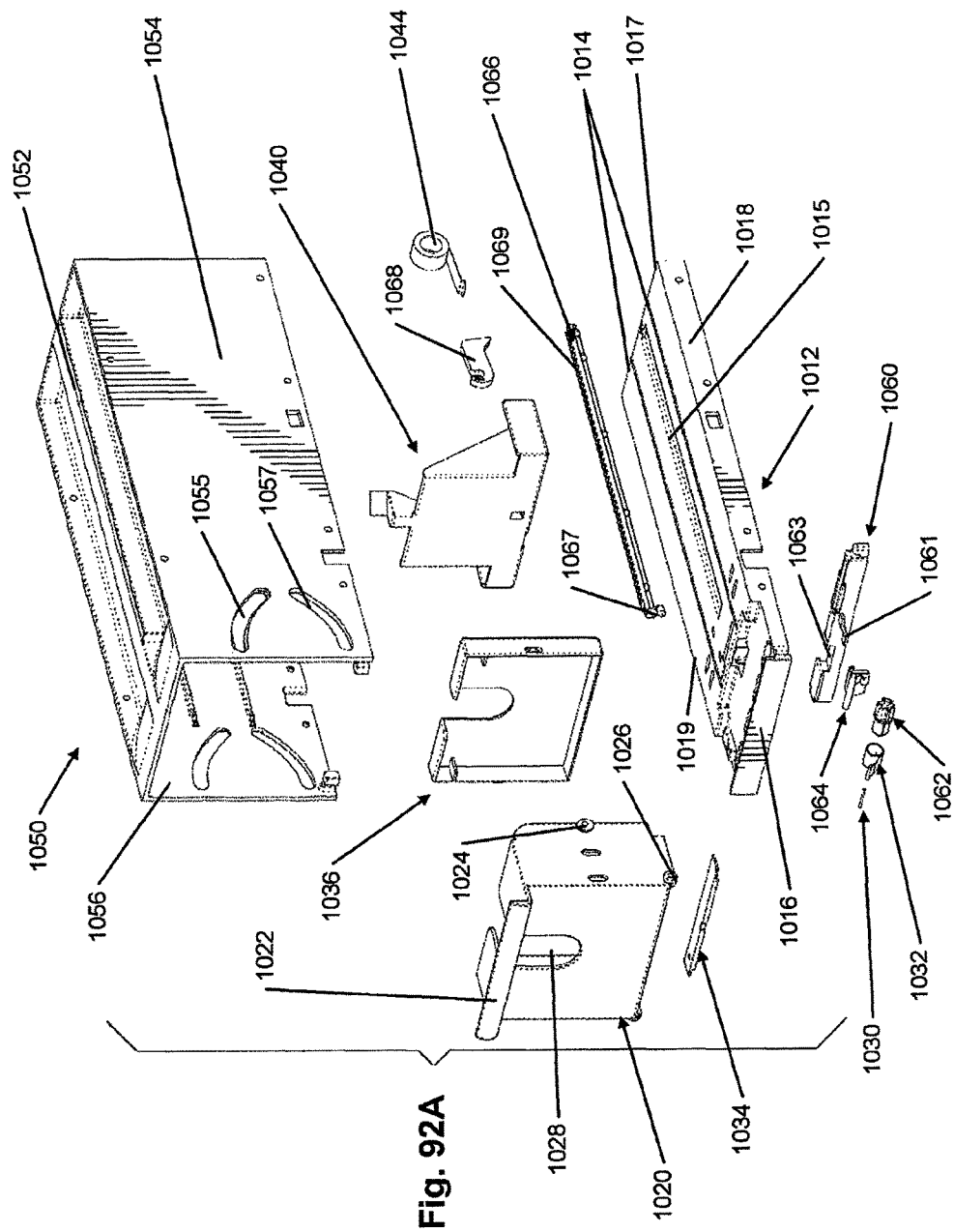
FIG. 92A is partial exploded view of an embodiment of a merchandise system in accordance with one or more aspects of the present invention.
Figure 92B:
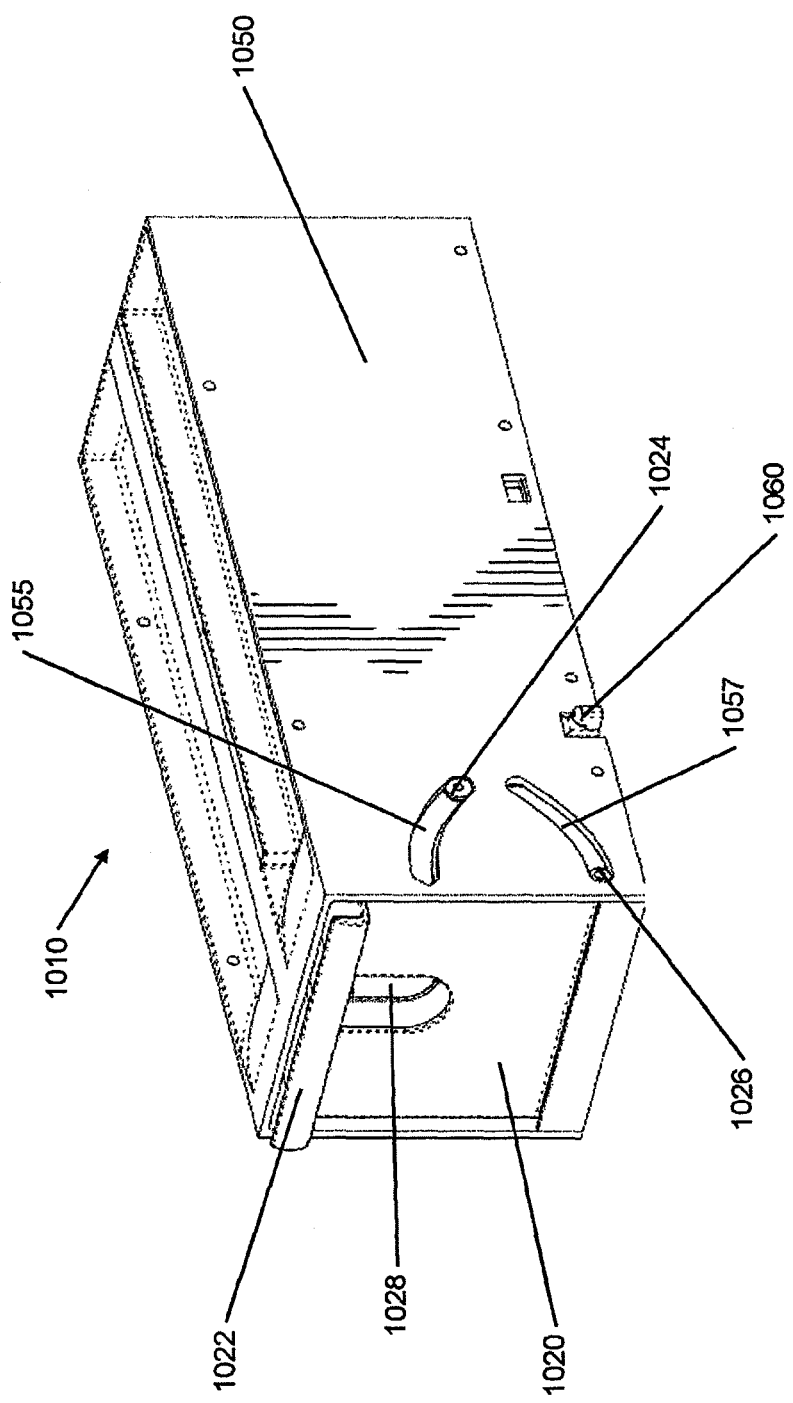
FIG. 92B is an isometric view of the merchandise system of FIG. 92A in accordance with one or more aspects of the present invention.

Referring to FIG. 92A, in an exemplary embodiment, merchandise system 1010 includes a base 1012. The base 1012 defines a generally flat planar surface that may be configured to engage with or mount onto any known shelf used in a store, as well as any other merchandise system 1010, and in any known mounting configuration and orientation. The base 1012 defines a front edge 1016, a back edge 1017, a first side edge 1018, a second side edge 1019, and one or more tracks 1014. Additionally, the base 1012 may include a ratchet shaft slot 1015. The ratchet shaft slot 1015 may be configured to accept the ratchet shaft 1066 as will be described below. The ratchet shaft slot 1015 may extend longitudinally along the length of the base 1012. The ratchet shaft slot 1015 is sized and shaped to receive and mount the ratchet shaft 1066.

As is further illustrated in FIG. 92A, a housing 1050 can be mounted to the base 1012 in any known mounting configuration and orientation. The housing 1050 defines a top wall 1052, a first side wall 1054, and a second side wall 1056. The housing 1050 may also include a rear retaining wall (not shown in the figures). The first and second side walls 1054 and 1056, respectively, can be used such that when more than one merchandise system 1010 is placed adjacent to another like merchandise system 1010 on a shelf or stacked on top of another like merchandise system 1010, product resting on the base 1012 of each respective merchandise system 1010 remains separated or divided. In an embodiment, one merchandise system 1010 can be stacked on top of another like merchandise system 1010 without need of a separate shelf between the two merchandise systems.

As shown in FIG. 92A, the one or more tracks 1014 may extend along the base 1012 from the back edge 1028 to the door 1020. As shown, a track 1014 can be used with a pusher 1040. It should be understood that more or less than two tracks could be used with the invention, depending on the particular application.

As illustrated in FIG. 92A, the one or more tracks 1014 extend longitudinally along the length of the base 1012 and may define at least one rail and/or an elongated aperture or channel in the base 1012. The track is sized and shaped to receive and mount a mating element of the pusher 1040. The pusher 1040 may be slidably mounted to the base 1012 such that the pusher 1040 does not lift out of the track 1014. The present invention contemplates the use of other tracks to mount the pusher 1040 to the base 1012. Other pusher mounting techniques are possible with the invention.

The pusher 1040 also contains at least one pusher urging element 1044 used to urge the pusher 1040 toward the front of the shelf. The pusher urging element 1044 may be any biasing element including, without limitation, a flat coil spring or a spiral torsion spring. The present invention may use one or more pusher urging elements 1044 to urge the pusher 1040 depending on the desired application. The pusher urging element 1044 may be mounted to the pusher 1040 and the base 1012 using any known mounting technique. In the exemplary embodiment, one end of the pusher urging element 1044 is secured to the base 1012 near the front edge 1016 of the base 1012, and the opposing end of the pusher urging element 1044 is positioned behind the pusher 1040 to urge the pusher 1040 toward the front of the door 1020.

In an exemplary embodiment, the merchandise system 1010 also includes a product door assembly. The door assembly may include a door1 1020, a door pin 1030, a door spring 1032, a door stiffener 1034, and a door spacer 1036. The door 1020 may be designed to rotate outward while holding only one product and allow the consumer to remove only one product from the merchandise system 1010. The door 1020 may be in a closed position or an open position. The operation of the door 1020 will be explained in more detail below.

The door 1020, as illustrated in FIG. 92A may include a handle 1022. The handle 1022 as shown in FIG. 92A is located on the upper section of the door 1020, such that the door 1020 can be opened from the top of the door 1020. The handle 1022 can be other configurations that allow a consumer to pull open the door 1020 from the upper section of the door 1020.

The door 1020, as illustrated in FIG. 92A may also include a first roller 1024 and a second roller 1026. The first roller 1024 may be engaged with an upper slot 1055 located on the first side wall 1054 of the housing 1050. The second roller 1026 may be engaged with a lower slot 1057 located on the first side wall 1054 of the housing 1050. Without departing from this invention, the slots 1055 1057 and rollers 1024 1026 may be located on either side of the housing 1050 and the door 1020 respectively. Additionally, without departing from this invention, there may be a pair of upper slots 1055, with one slot located on the first side wall 1054 and a second slot located on the second side wall 1056; a pair of lower slots 1057, with one slot located on the first side wall 1054 and a second slot located on the second slide wall 1056; and a pair of first rollers 1024 and a pair of second rollers 1026 that may engage the corresponding slots on each of the first and second side walls 1054 1056. The rollers 1024 and 1026 are configured to slide from one end of its corresponding slot 1055 1057 to the other end of the corresponding slot 1055 1057 during the operation of the door 1020. The specific operation of the door 1020 will be described more below.

The door 1020 may also include an opening 1028. The opening 1028 may be located on the consumer side of the door 1020 and may allow the consumer or user to press or touch the product without opening the door 1020. As will be described further below, the opening 1028 can be used during the restocking process.

Figure 93:
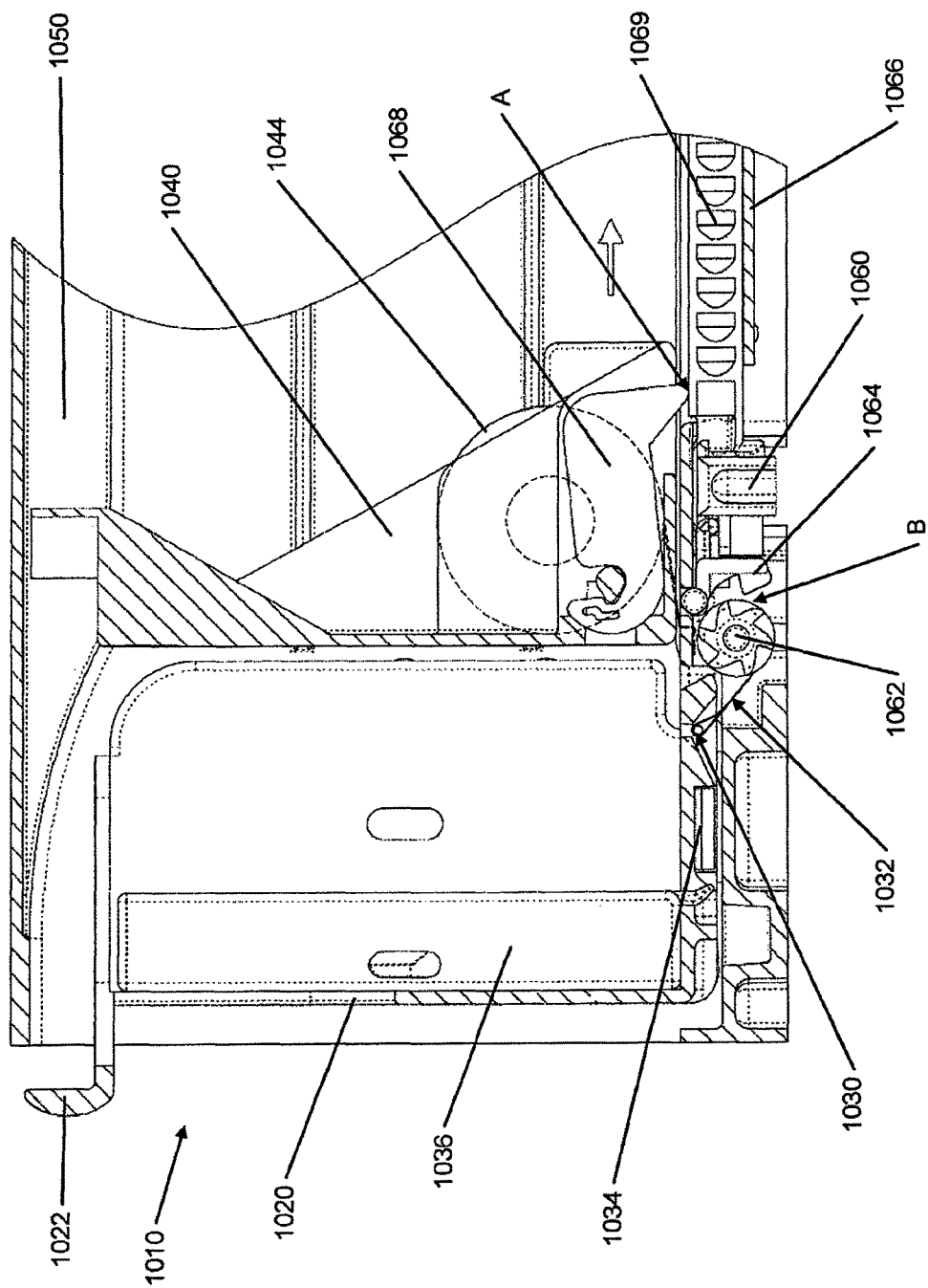
FIG. 93 is a side view of the merchandise system of FIG. 92A in accordance with one or more aspects of the present invention.

The door assembly may also include a door pin 1030 and a door spring 1032, as illustrated in FIGS. 92A and 93. The door pin 1030 may be cylindrical in shape and may be any suitable material, such as plastic or metal. The door spring 1032, as shown in FIG. 92A, is a spiral torsion spring or a flat coil spring that includes a first end or free end and a second end. The door spring 1032 may be other suitable spring types without departing from this invention. The door pin 1030 and the door spring 1032 engage both the door 1020 and the base 1012 to attach the door 1020 to the base 1012. The door pin 1030 may be located at the base or bottom of the door 1020. The first end or free end of the door spring 1032 may engage the door pin 1030 at the base or bottom of the door 1020. The second end of the door spring 1032 may engage a portion of the locking mechanism of the merchandising system 1010, such as a locking gear 1062 as will be described below. As the door 1020 is opened by providing downward and outward pressure on the handle 1022, the door spring 1032 is pulled away from the locking gear 1062, thereby uncoiling the door spring 1032 and providing a closing bias to the door 1020. When pressure is released from the handle 1022, the bias from the door spring 1032 causes the door 1020 to return to the closed position. The operation of the door 1020 with the door spring 1032 will be described more below.

Additionally, the door assembly may include a door stiffener 1034 as shown in FIG. 92A. The door stiffener 1034 may be located at the bottom of the door 1020. The door stiffener 1034 may provide additional support, especially to the bottom of the door 1020 as the door 1020 is rotated from the closed position to the open position.

Additionally, as illustrated in FIGS. 92A and 93, the door assembly may include a door spacer 1036. The door spacer 1036 may be installed against the back side of the door 1020 to create a slot for the product when the door 1020 is opened. The door spacer 1036 may be required so that the door 1020 and merchandise system 1010 can accommodate different size packages of product. For example, a wide door spacer 1036 may be installed to the door 1020 for smaller or thinner packages and a thin or even no door spacer 1036 may be installed to the door 1020 for larger or thicker packages. Depending on the size and shape of the package, the door spacer 1036 may take on various different shapes to accommodate the different sizes and shapes of the packages.

In an embodiment, the door 1020, and specifically the front of the door 1020, is made of a clear or transparent material that allows for the product to be viewed through the door 1020. Additionally, the door 1020 may enable advertisements or marketing materials to be placed on the front of the door 1020. Additionally, the base 1012 can include a display area for advertising or marketing material as well as product information such as product pricing information. Because the display area can include product information, merchandise system 1010 can be, as discussed above, stacked on top of another merchandise system 1010 without the use of shelves. Additionally, instead of using a door 1020 as described above, the merchandising system may include a button-release system that includes a button to help access or dispense product. For example, when the button is pressed, the product may be released by the use of a pusher or a slow-moving pusher to discharge the product at a bottom opening for the customer to recover.

Figure 98A:
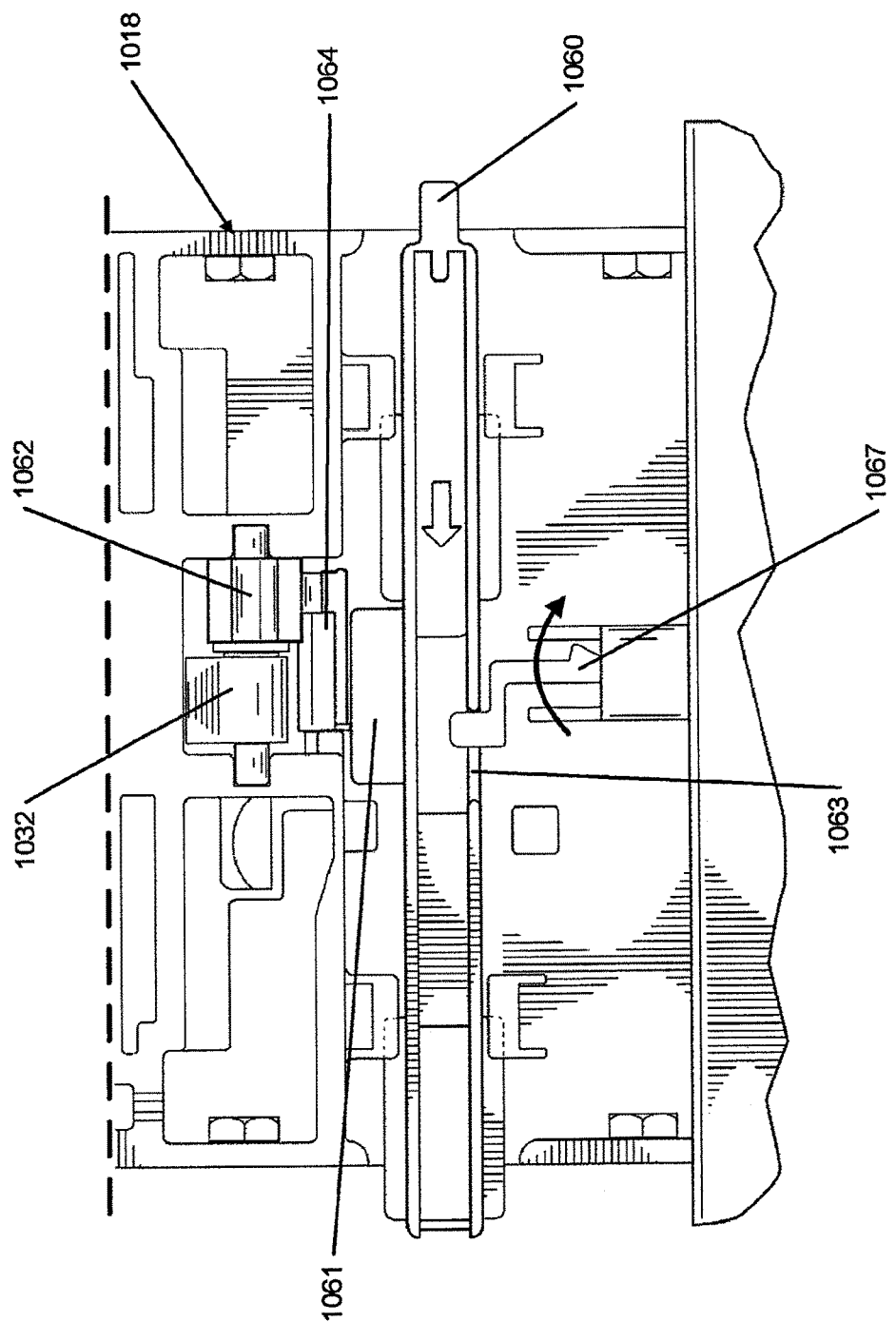
FIG. 98A is a partial bottom view of the merchandise system of FIG. 92A in accordance with one or more aspects of the present invention.
Figure 98B:
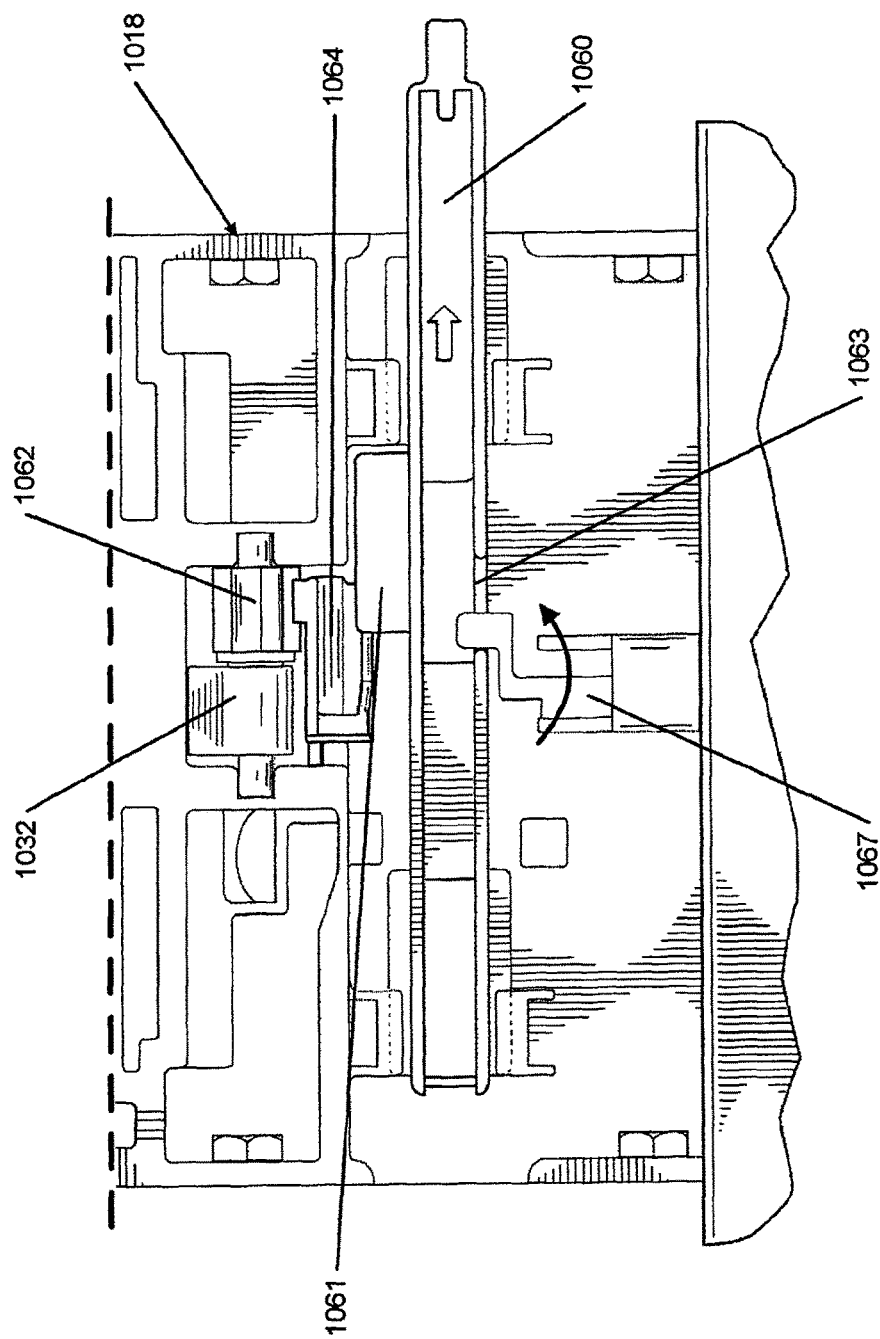
FIG. 98B is a partial bottom view of the merchandise system of FIG. 92A in accordance with one or more aspects of the present invention.

The merchandise system 1010 as illustrated in FIGS. 92A, 98A, and 98B may also include a locking assembly. The locking assembly may generally include a locking bar 1060, a locking gear 1062, a locking latch 1064, a ratchet shaft 1066, and a pusher lock 1068.

As illustrated in FIGS. 92A, 98A, and 98B, the locking bar 1060 is an elongated bar that extends approximately the lateral length of the base 1012. The locking bar 1060 may be located along the bottom or underneath the base 1012. As illustrated in FIG. 92A, the base 1012 includes an opening 1018A located along the first side 1018 and a second opening located along the second side 1019 (not shown). The locking bar 1060 may fit within this opening 1018A. Additionally, the locking bar 1060 may include a locking member 1061 located on the side of the locking bar 1060 as illustrated in FIG. 92A. The locking member 1061 may be configured to engage the locking latch 1064 during locking operations as will be described further below. Additionally, the locking bar may include a slot 1063. The slot 1063 may be configured to engage a locking end 1067 of the ratchet shaft 1066 during locking operations as will be described further below. The locking bar 1060 may be made of any suitable material, such as metal or plastic. Additionally, the locking bar 1060 may be configured to attached to an adjacent locking bar 1060 when multiple merchandise systems 1010 are configured together adjacently.

As illustrated in FIGS. 92A, 98A, and 98B, the locking mechanism also includes the locking gear 1062. The locking gear 1062 may include a set of gear teeth on one end and a rounded surface on the other end. The gear teeth of the locking gear 1062 may be configured to engage with the locking latch 1064 during locking operations as will be described further below. Additionally, the door spring 1032 may be located on the rounded surface end to provide the bias for the door to open and close. The door opening operation will be described further below. The locking gear 1062 may be made of any suitable material, such as metal or plastic.

As illustrated in FIGS. 92A, 98A, and 98B, the locking mechanism also includes the locking latch 1064. The locking latch 1064 may be configured to engage with the locking bar 1060, and specifically the slot 1063 on the locking bar 1060. The locking latch 1064 may also be configured to simultaneously engage with the locking gear 1062. The locking latch 1064 may engage both the locking bar 1060 and the locking gear 1062 during locking operations as will be described further below. The locking latch 1064 may be made of any suitable material, such as metal or plastic.

As illustrated in FIG. 92A, the locking mechanism also includes the ratchet shaft 1066. The ratchet shaft 1066 is sized and shaped to fit within the ratchet shaft slot 1015 in the base 1012. The ratchet shaft 1066 includes one side with a plurality of teeth 1069. The other sides of the ratchet shaft 1066 may be smooth. The ratchet shaft 1066 may also include a locking end 1067. The locking end 1067 may be located at the approximately location of the locking bar 1060, such that the locking end 1067 engages the locking bar 1060 and specifically the locking slot 1063 on the locking bar 1060 during locking operations as will be described below. Additionally, the plurality of teeth 1069 are configured to engage the end of the pusher lock 1068 during locking operations as will be described below. The ratchet shaft 1066 may be made of any suitable material, such as metal or plastic.

As illustrated in FIG. 92A, the locking mechanism also includes the pusher lock 1068. The pusher lock 1068 may be connected to or engaged with the pusher 1040. The pusher lock 1068 may have a pointed end opposite the side that is engaged with the pusher 1040. The pointed end of the pusher lock 1068 may be configured to engage the plurality of teeth 1069 on the ratchet shaft 1066 during locking operations as will be described below. The pusher lock 1068 may be made of any suitable material, such as metal or plastic.

Figure 94:
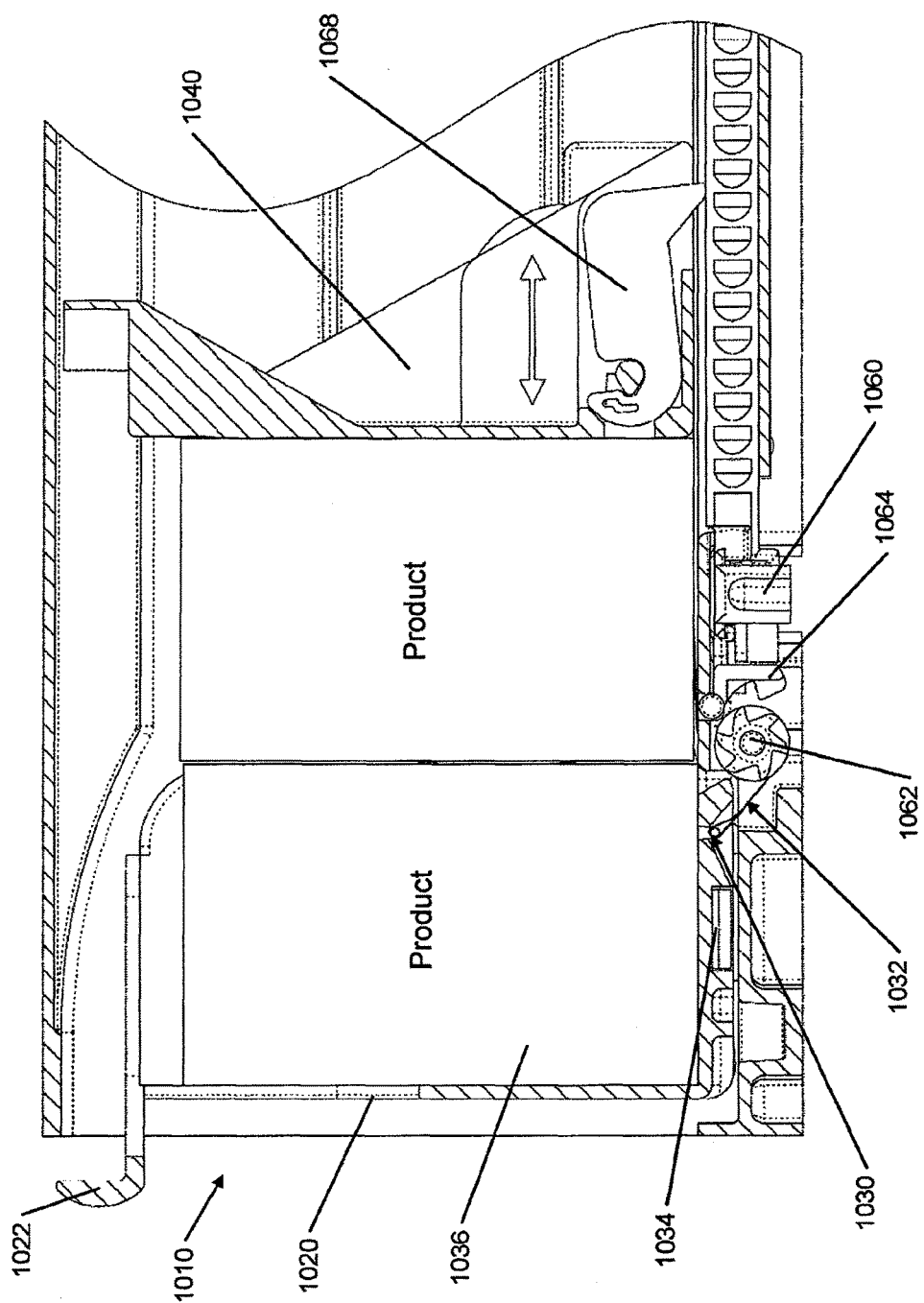
FIG. 94 is a side view of the merchandise system of FIG. 92A in accordance with one or more aspects of the present invention.

The operation of the merchandise system 1010 includes both locking and door opening and these operations can be done simultaneously. As illustrated in FIG. 93, the merchandise system 1010 is shown in an unlocked condition with the door 1020 closed. In this configuration, the door 1020 is closed and the door spring 1032 is not extended or uncoiled. The locking bar 1060 is not extended. The locking latch 1064 is not engaged with the locking gear 1062. The ratchet shaft 1066 is rotated such that one of the smooth sides faces upward toward the pusher lock 1068. As annotated as reference letter "A" in FIG. 93, when the ratchet shaft 1066 is in the position as shown, the pointed end of the pusher lock 1068 rests on the smooth side of the ratchet shaft 1066. This allows the pusher 1040 to move freely both forward and backward. As further annotated as reference letter "B" in FIG. 93, when the locking latch 1064 is in the position shown, the locking gear 1062 can rotate freely, thereby allowing the door spring 1032 to uncoil and the door 1020 to swing open when pressure is applied to the door handle 1022. FIG. 94 illustrates a similar configuration that includes product with the merchandise system 1010 in an unlocked condition with the door 1020 closed.

Figure 95:
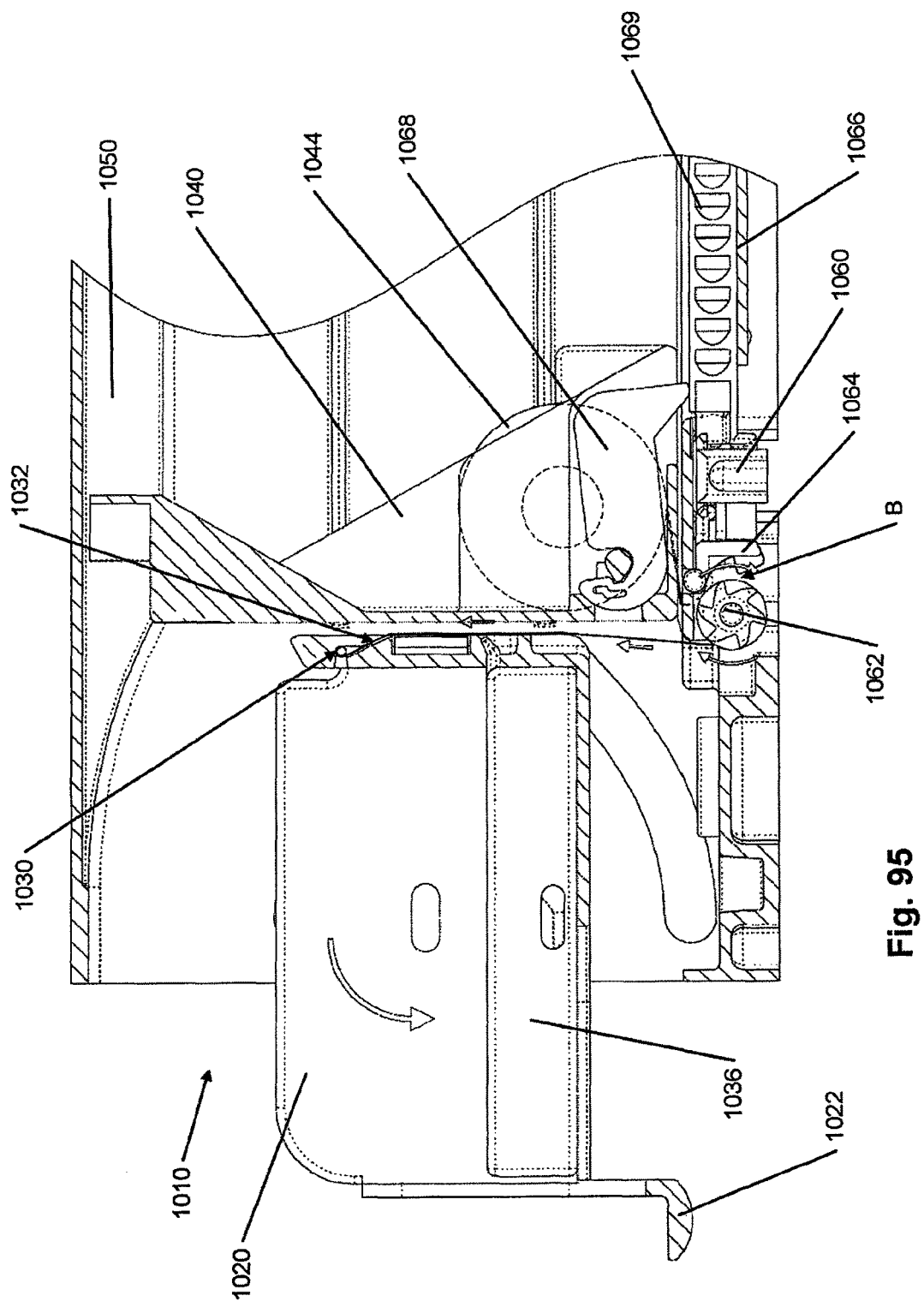
FIG. 95 is a side view of the merchandise system of FIG. 92A in accordance with one or more aspects of the present invention.

FIG. 95 illustrates a configuration with the merchandise system 1010 in an unlocked condition with the door 1020 open. In this configuration, the door 1020 is open with the door spring 1032 extended and uncoiled. The locking bar 1060 is not extended. The locking latch 1064 is not engaged with the locking gear 1062. The ratchet shaft 1066 is rotated such that one of the smooth sides faces upward toward the pusher lock 1068. As annotated as reference letter "B" in FIG. 93, when the locking latch 1064 is in the position shown, the locking gear 1062 can rotate freely, thereby allowing the door spring 1032 to uncoil and the door 1020 to swing open when pressure is applied to the door handle 1022.

Figure 96:
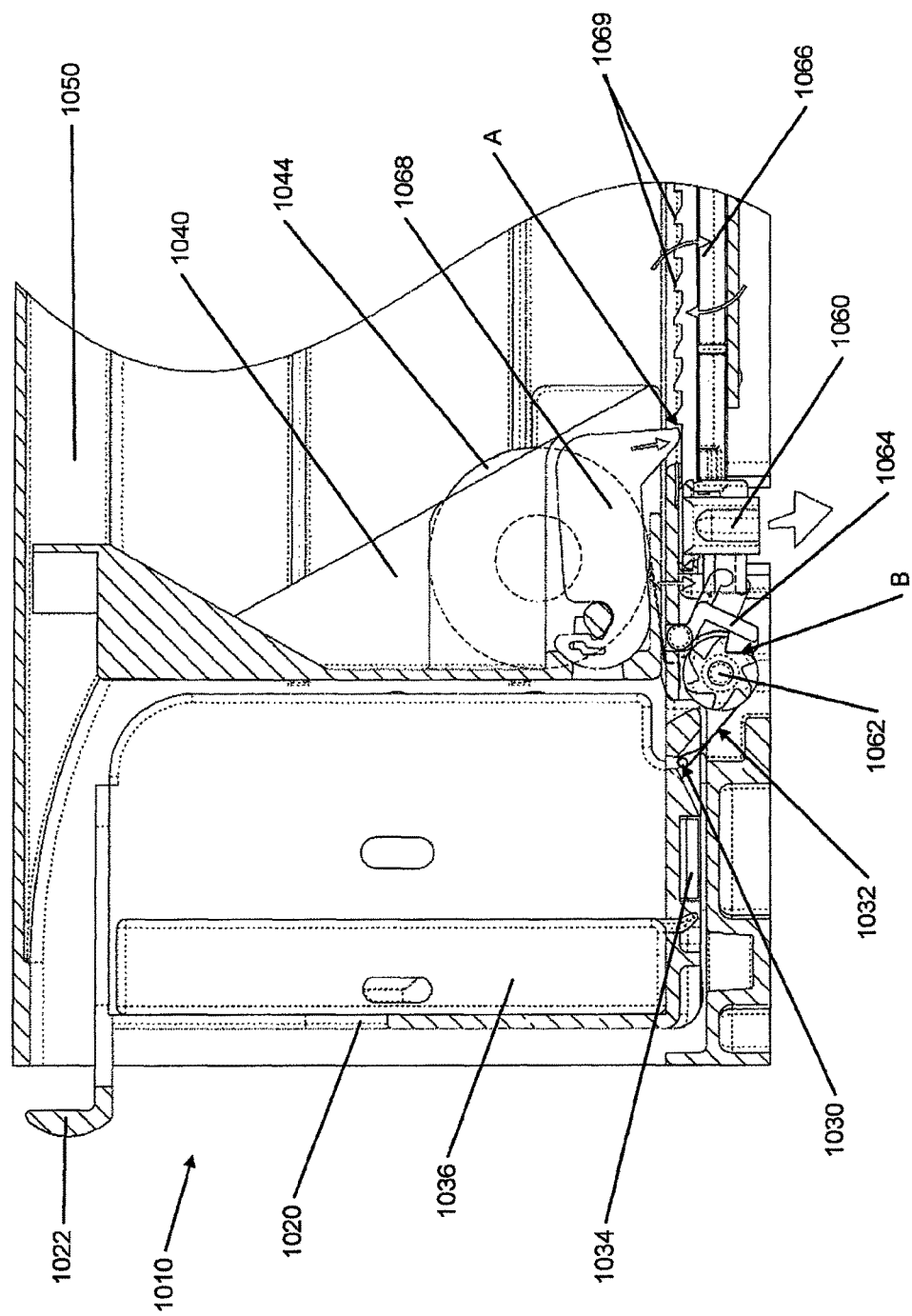
FIG. 96 is a side view of the merchandise system of FIG. 92A in accordance with one or more aspects of the present invention.

FIG. 96 illustrates a configuration with the merchandise system 1010 in a locked condition with the door 1020 closed. In this configuration, the door is closed with the door spring 1032 not extended and not uncoiled. The locking bar 1060 is extended. When the locking bar 1066 shift positions, the locking bar 1066 forces the locking latch 1064 to engage the locking gear 1062 and the locking bar 1066 rotates the ratchet shaft 1066. The locking latch 1064 is engaged with the locking gear 1062. The ratchet shaft 1066 is rotated such that the side with the plurality of teeth 1069 faces upward towards the pusher lock 1068, thereby engaging the pusher lock 1068 with one of the plurality of teeth 1069 on the ratchet shaft 1066. As annotated as reference letter "A" in FIG. 96, when the ratchet shaft 1066 rotates into the position shown, the pointed end of the pusher lock 1068 falls into one of the plurality of teeth 1069 on the ratchet shaft 1066, thereby locking the pusher paddle 1040 at the current position. Additionally, as annotated as reference letter "B" in FIG. 96, when the locking latch 1064 is in the position shown, the locking latch 1064 engages the gear teeth on the locking gear 1062. The locking gear 1062 cannot rotate clockwise and thus the door spring 1032 cannot uncoil. This locks the door 1020 from swinging open.

Figure 97:
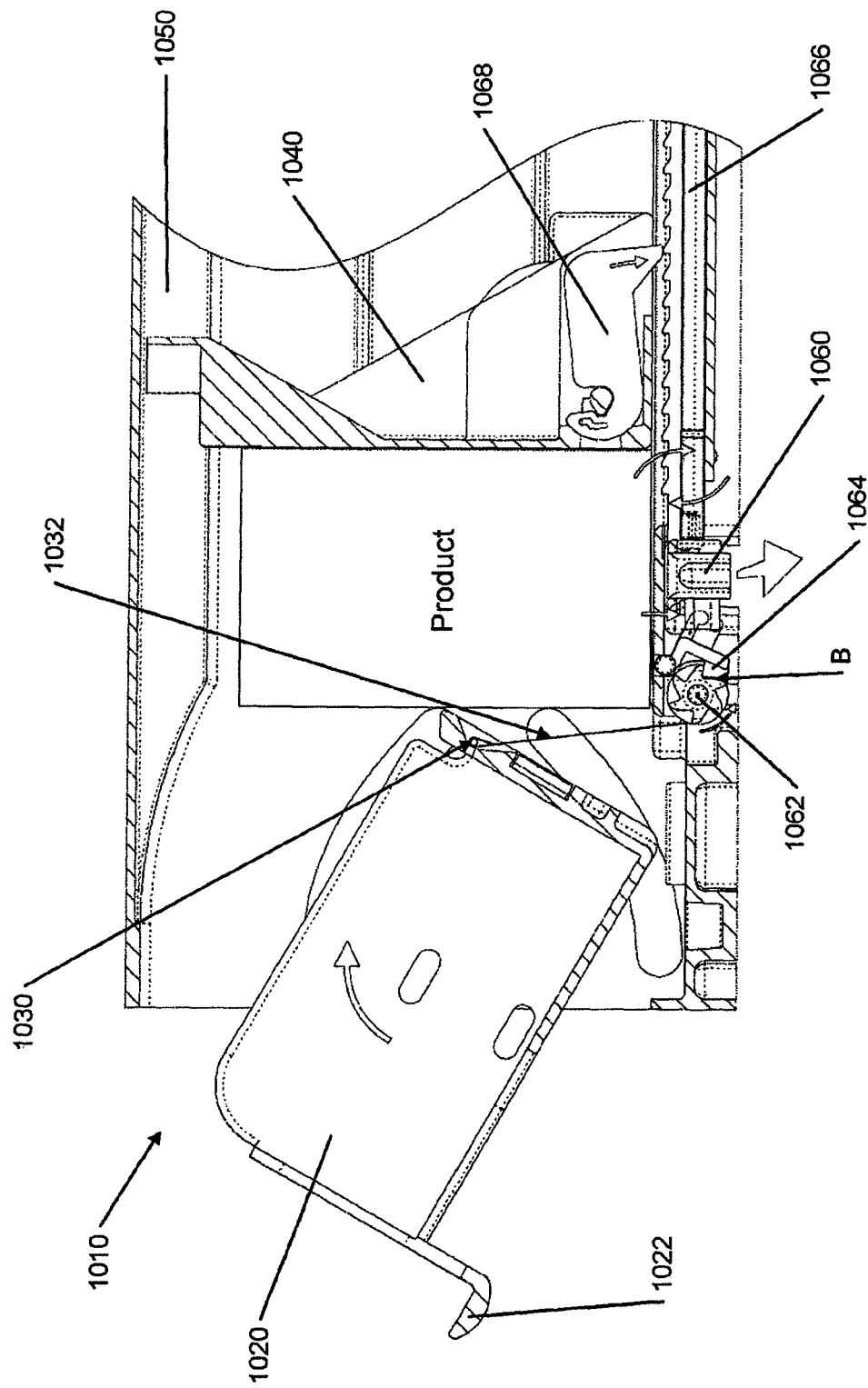
FIG. 97 is a side view of the merchandise system of FIG. 92A in accordance with one or more aspects of the present invention.

FIG. 97 illustrates a configuration with the merchandise system 1010 in a locked condition with the door 1020 open. In this configuration, the door is open with the door spring 1032 extended and uncoiled. As was previously described above for FIG. 96, when the locking bar 1066 shift positions, the locking bar 1066 forces the locking latch 1064 to engage the locking gear 1062 and the locking bar 1066 rotates the ratchet shaft 1066. The locking latch 1064 is engaged with the locking gear 1062. The ratchet shaft 1066 is rotated such that the side with the plurality of teeth 1069 faces upward towards the pusher lock 1068, thereby engaging the pusher lock 1068 with one of the plurality of teeth 1069 on the ratchet shaft 1066. As annotated as reference letter "B" in FIG. 97, when the locking latch 1064 is in the position shown, the locking latch 1064 engages the gear teeth on the locking gear 1062. The locking gear 1062 cannot rotate clockwise and thus the door spring 1032 cannot uncoil. This locks the door 1020 from swinging open. However, the locking gear 1062 can ramp over the locking latch 1064 in a counter clockwise motion, thus allowing the door spring 1032 to recoil and the door 1020 to close.

FIG. 98A illustrates a bottom view of the merchandise system 1010 in an unlocked condition. As is illustrated in FIG. 98A, similar to the description above for FIG. 93, the locking bar 1060 is not extended. Because the locking bar 1060 is not extended, the slot 1063 on the locking bar 1060 presses against the locking end 1067 of the ratchet shaft 1066 and keeps the ratchet shaft 1066 in the position with the pusher lock 1068 resting on the smooth side of the ratchet shaft 1066. Additionally, because the locking bar 1060 is not extended, the locking member 1061 is not engaged with the locking latch 1064, thereby allowing the locking gear 1062 to rotate freely and allow the door spring 1032 to uncoil and the door 1020 to swing open.

FIG. 98B illustrates a bottom view of the merchandise system 1010 in a locked condition. As is illustrated in FIG. 98B, similar to the description above for FIG. 96, the locking bar 1060 is extended. When the locking bar 1060 extends, the slot 1063 on the locking bar 1060 presses against the locking end 1067 of the ratchet shaft 1066, thereby rotating the ratchet shaft 1066 such that the side with the plurality of teeth 1069 faces upward and engages the pusher lock 1068. Additionally, when the locking bar 1060 extends, the locking member 1061 engages the locking latch 1064, thereby moving the locking latch 1064 to engage with the locking gear 1062 and the gear teeth. The locking gear 1062 cannot rotate clockwise, and thus the door spring 1032 cannot uncoil. This locks the door 1020 from swinging open.

Figure 99:
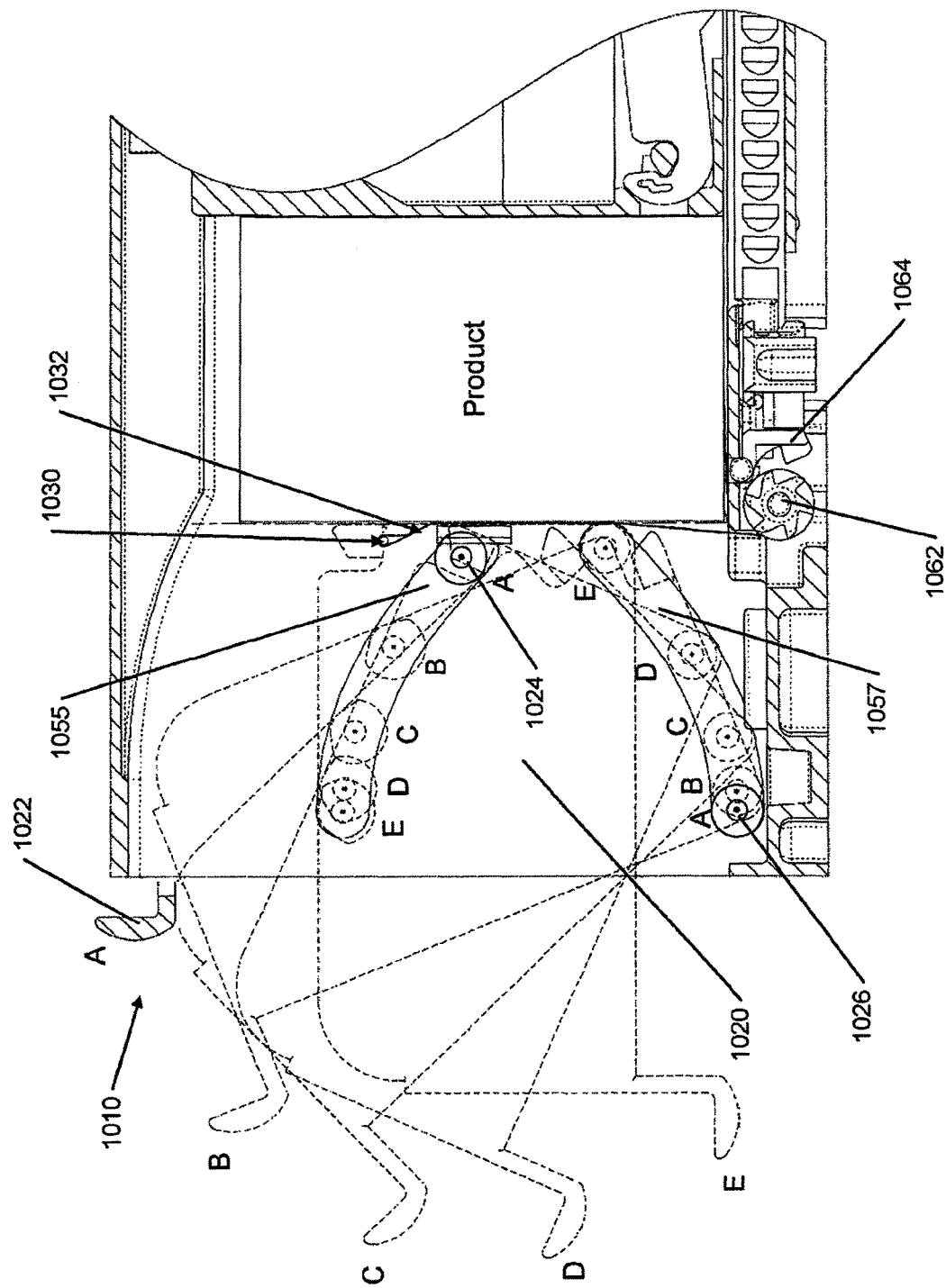
FIG. 99 is a side view of the merchandise system of FIG. 92A in accordance with one or more aspects of the present invention illustrating the opening of the door.

FIG. 99 illustrates another feature of the merchandise system 1010, namely the operation of the door 1020. As is illustrated in FIG. 99, the door includes a first roller 1024 and a second roller 1026. The first roller 1024 may slidably engage with an upper slot 1055 in the housing 1050. The second roller 1026 may slidably engage with a lower slot 1057 in the housing 1050. During the door operation, through the design of the first roller 1024, the second roller 1026, the upper slot 1055, and the lower slot 1057, the back end and the floor of the door 1020 keeps the next product behind the door from sliding forward. The door 1020 continually contacts the product along the same vertical plane throughout the door's motion. As is shown in FIG. 99, through reference letters "A" through "E", the door operation is represented from the closed position to the open position, with "A" representing the closed position and "E" representing the open position. As illustrated by "A", the first roller 1024 is positioned in the lower portion of the slot 1055, the second roller is positioned in the lower portion of the slot 1057 and the door handle 1022 is closed. As the door 1020 moves to position "B", as can been seen in FIG. 99, the first roller 1024 moves a longer distance along the upper slot 1055 than does the second roller 1026 along the lower slot 1057. As the door 1020 moves to position "C", the first roller 1024 has almost moved to the end of the upper slot 1055, while the second roller 1026 has not moved much along the lower slot 1057. As the door 1020 moves to position "D", the second roller moves a longer distance along the lower slot 1057, while the first roller 1024 moves a smaller distance along the upper slot 1055. As the door 1020 moves to position "E", the second roller 1026 again moves a longer distance along the lower slot 1057 to the final upper position in the lower slot 1057 and the first roller 1024 moves a small amount into the final upper position in the upper slot 1055. The design and shape of the upper slot 1055 and the lower slot 1057 combined together with the geometry of the door 1020 allow the door to contact the product on the same vertical plane throughout the motion of the door 1020, thereby keeping the next product behind the door from sliding forward. Once the product is removed from the door 1020 by the consumer, the pusher 1040 and pusher spring 1044 will push the next product into the door 1020 when the door 1020 returns to the closed position, thereby reloading the door 1020 with product.

Figure 100:
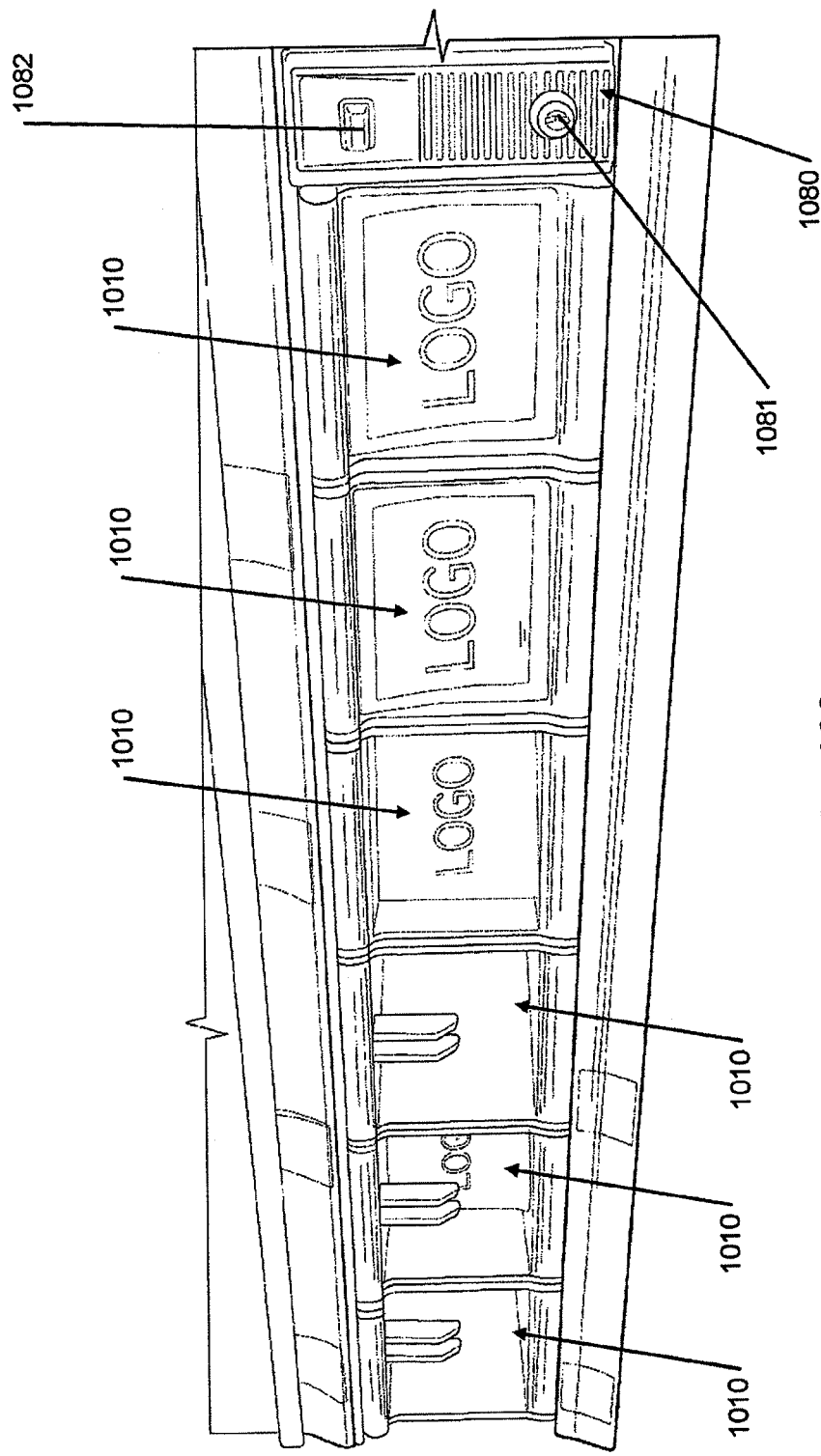
FIG. 100 is a isometric view of multiple merchandise systems with an electronic control unit in accordance with one or more aspects of the present invention.
Figure 101:
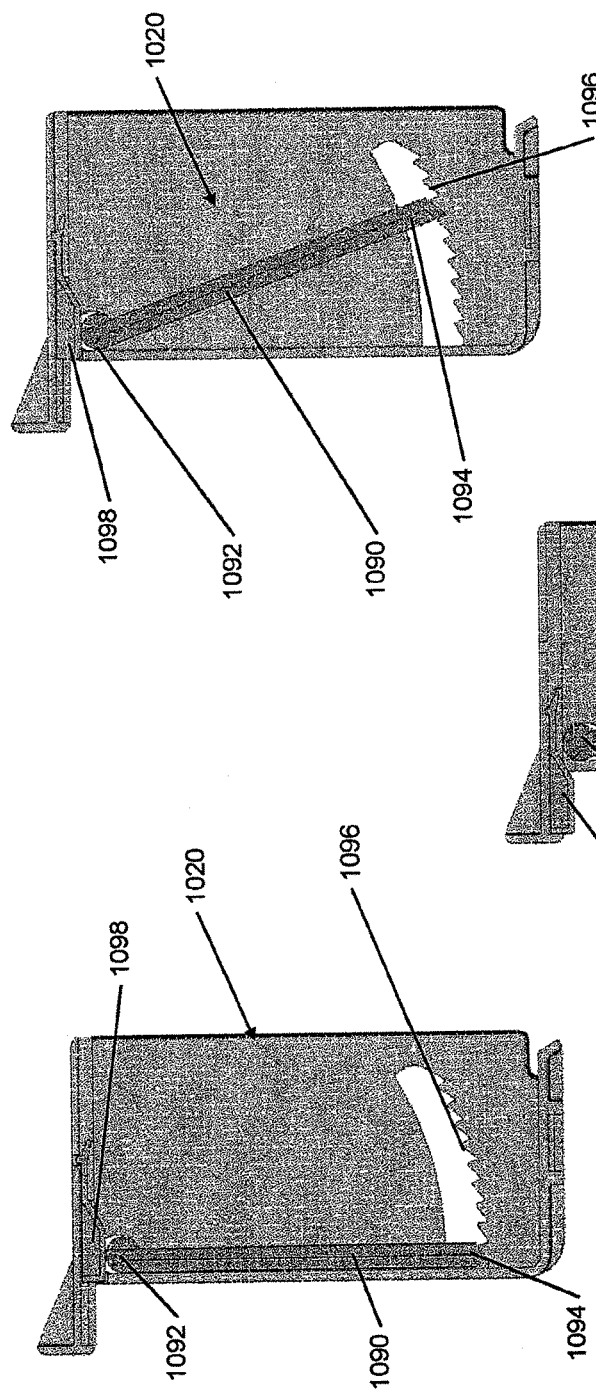
FIGS. 101A-C depict an alternative embodiment of the door spacer bar of the invention.

As was described above, more than one merchandise system 1010 may be placed adjacent to other like merchandise systems 1010 on a shelf. Additionally, the merchandise system 1010 may include an electronic control unit 1080 to control the locking operations of all merchandise systems linked together. As shown in FIG. 100, multiple merchandise systems 1010 may be linked together. Additionally, an electronic control unit 1080 may be located at the end of the linked merchandise systems 1010. The electronic control unit 1080 may be used to improve product merchandising by limiting the number and the frequency with which product can be removed from the merchandise systems 1010 by locking and/or alarming the merchandise systems 1010 when too many products are removed at one time.

For the present embodiment described above in FIGS. 92A through 99, the electronic control unit may include a mechanical member (not shown) linked to the locking bars 1060 of the adjacent merchandise systems 1010. This mechanical member may be activated to move based on the parameters set in the electronic control unit 1080, thereby extending or moving the linked locking bars 1060 of the merchandise systems 1010. When the linked locking bars 1060 extend or move, the locking bars 1060 lock the doors 1020 and the pushers 1040 on the merchandise systems 1010 as described above.

A number of parameters may be included or loaded into the electronic control unit 1080 to control the flow of product by alarming and/or locking the merchandise systems 1010 without departing from this invention. One such parameter may be the electronic control unit 1080 locking the merchandise systems after a certain number of consecutive door openings, such as three door openings. For example, if a consumer attempts to open any three doors consecutively on the merchandise system 1010, the electronic control unit 1080 may then alarm and send a signal to the mechanical member, thereby extending and moving the locking bars 1060 and locking the doors 1020. This parameter may be changed based on the needs of the store or consumers and products, such as after two times, four times, five times, or more. Additionally, the definition of "consecutive" may also be varied within the electronic control unit 1080. For example, "consecutive" may mean three door openings within a 10-minute time period, or within a 5-minute time period. Additionally, "consecutive" could mean that time between individual or multiple door openings must be greater than two minutes, or greater than one minute, or greater than some other time variable. Multiple variations of number of openings and time variables may be used for the electronic control unit 1080 without departing from this invention.

Additionally, when the electronic control unit 1080 is triggered to lock or alarm, the electronic control unit 1080 may also be configured to send a signal to an alarm system or messaging system. For example, when the electronic control unit 1080 is triggered to lock or alarm, the electronic control unit 1080 may send a signal to an intercom system in a store the signals the store personnel to come to the merchandise system 1010 to either reset the system or to deal with a possible theft situation. Additionally, without departing from the invention, the electronic control unit 1080 can send an electronic signal to many other devices or systems, including, but not limited to, office phones, cell phones, cash registers, office computers, emails, etc. In addition to sending an electronic signal, the electronic control unit 1080 may light an alarm light 1082, as illustrated in FIG. 100.

The electronic control unit 1080 may also include a key system 1081 as illustrated in FIG. 100. The key system 1081 may be utilized to reset an alarm or locked situation. Additionally, the key system 1081 may be utilized to override the locking system if a key is left in the key system 1081. This override capability may be advantageous to store personnel when stocking or restocking the merchandise system 1010. The key system 1081 may be utilized for various other functions without departing from this invention.

In an alternate embodiment the door assembly may also include a door spacer bar 1090 as illustrated in FIGS. 101A, 101B, and 101C. The door spacer bar 1090 may be used as an alternative to the door spacer 1036 illustrated in FIGS. 92A and 93. The door spacer bar 1090 may include an attached end 1092 and a locking end 1094. The attached end 1092 may be attached, pinned, or connected to the door 1020 near the front of the door 1020 such that the locking end 1094 of the door spacer bar 1090 can rotate away from the front of the door 1020. The locking end 1094 may rotate away from the front of the door 1020. The locking end 1094 may move and be locked into place in one of a plurality of door spacer bar teeth 1096. The door spacer bar teeth may be configured to lock the locking end 1094 of the door spacer bar 1090 at the depth of the package. Additionally, the door spacer bar 1090 may include a door spacer bar locking tab 1098 located to lock in the top of the rotational door spacer bar as illustrated in FIGS. 101A, 101B, and 101C. The door spacer bar locking tab 1098 may slide from an unlocked position to a locked position, wherein the locking tab 1098 locks the attached end of the door spacer bar 1090.

The door spacer bar 1090, like the door spacer 1036, may allow the user to adjust the door for different depths of packages in the display. FIG. 101A illustrates the door spacer bar 1090 not adjusted for depth of packages. As illustrated in FIG. 101A, the door spacer bar 1090 is flush against the front of the door 1020 and the locking tab 1098 is in the locked position, thereby locking the door spacer bar 1090 in place. FIG. 101B illustrates the door spacer bar 1090 being adjusted for a thinner depth of package. As illustrated in FIG. 101B, the locking tab 1098 may slide to the unlocked position and the door spacer bar 1090 is rotated away from the front of the door 1020. FIG. 101C illustrates the door spacer bar 1090 in the adjusted position and locked for a thinner depth of a package. As illustrated in 101C, the locking tab 1098 is positioned back in the locked position and the locking end 1094 of the door spacer bar 1090 is seated in one of the plurality of door spacer bar teeth 1096.

Variations and modifications of the foregoing are within the scope of the present invention. It should be understood that the invention disclosed and defined herein extends to the individual features and all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A security shelf system comprising:
a display system including a front retaining wall mounted on a shelf and extending upward from the shelf;
a movable barrier mounted to the system above the front retaining wall, the movable barrier extending from a mounting above the front retaining wall downward towards the shelf, wherein the barrier is movable from a closed position that inhibits access to product on the shelf to an open position that permits limited access to product on the shelf, wherein the barrier permits removal of product from the shelf over the front retaining wall and wherein the movable barrier overlaps at least a portion of the front retaining wall when the movable barrier is in a closed position that inhibits access to the product on the shelf;
a camera and monitor placed in the vicinity of the display system and wherein the monitor is configured to switch from displaying an advertisement to displaying images from the camera; and
a wireless power source for powering either the camera or monitor, wherein the wireless power source includes an electromagnetic source resonator and an electromagnetic receiving resonator, wherein the electromagnetic source resonator receives energy from an external power supply and then generates an electromagnetic oscillating field, and wherein the electromagnetic source resonator transfers electromagnetic energy wirelessly from the generated oscillating field to the electromagnetic receiving resonator, wherein the electromagnetic receiving resonator is positioned at a distance away from the electromagnetic source resonator, wherein the wirelessly transferred electromagnetic energy excites the electromagnetic receiving resonator and causes energy to build up in the electromagnetic receiving resonator, and wherein the built up energy is transferred out as a power supply to power the camera or monitor placed in the vicinity of the display shelf.

2. The security shelf system of claim 1 further comprising illuminated signage, overhead header lights, LED lights, decorative lights and safety lighting mounted to or in the vicinity of the display shelf, wherein the energy from the electromagnetic receiving resonator is transferred out as a power supply to power one or more of the illuminated signage, overhead header lights, LED lights, screens, monitors, tablets, conductive ink, decorative lights and safety lighting.

3. The security shelf system of claim 1 further comprising alarms, store computers, mobile devices, remotes, sensors, and motion detectors used in the vicinity of the display shelf, wherein the energy from the electromagnetic receiving resonator is transferred out as a power supply to power one or more of the alarms, store computers, mobile devices, remotes, sensors, and motion detectors.

4. A security shelf system comprising:
a first shelf and a second shelf, the first shelf having a first front edge;
a plurality of vertical dividers positioned between the first shelf and the second shelf;
a plurality of product urging devices for urging product toward the front of the system,
a retaining wall positioned adjacent the first front edge and extending toward the second shelf, the retaining wall having a height for obstructing access to the items placed between the first shelf and the second shelf; and
a barrier mounted to the system above the first shelf, wherein the barrier pivots between an open and closed position to substantially obstruct access to items placed between the first shelf and the top wall when in the closed position,
wherein the retaining wall and the barrier substantially block access to items placed between the first shelf and the top wall when the barrier is in the closed position, and wherein the barrier permits the removal of a limited number of product when the barrier is in the open position,
a sensor and alert device for detecting that the barrier is not in the closed position,
a wireless power source for powering either the sensor or alert device, wherein the wireless power source includes an electromagnetic source resonator and an electromagnetic receiving resonator, wherein the electromagnetic source resonator receives energy from an external power supply and then generates an electromagnetic oscillating field, and wherein the electromagnetic source resonator transfers electromagnetic energy wirelessly from the generated oscillating field to the electromagnetic receiving resonator, wherein the electromagnetic receiving resonator is positioned at a distance away from the electromagnetic source resonator, wherein the wirelessly transferred electromagnetic energy excites the electromagnetic receiving resonator and causes energy to build up in the electromagnetic receiving resonator, and wherein the built up energy is transferred out as a power supply to power the sensor or alert device.

5. The security shelf system of claim 4 further comprising illuminated signage, overhead header lights, LED lights, decorative lights and safety lighting mounted to or in the vicinity of the shelf system, wherein the energy from the electromagnetic receiving resonator is transferred out as a power supply to power one or more of the illuminated signage, overhead header lights, LED lights, screens, monitors, tablets, conductive ink, decorative lights and safety lighting.

6. The security shelf system of claim 4 further comprising alarms, store computers, mobile devices, remotes, and motion detectors used in the vicinity of the shelf system, wherein the energy from the electromagnetic receiving resonator is transferred out as a power supply to power one or more of the alarms, store computers, mobile devices, remotes, and motion detectors.

7. The security shelf system of claim 4, wherein the product urging devices is selected from the group consisting of spring-urged pusher, gravity-fed device and vibration-urged device, wherein the energy from the electromagnetic receiving resonator is transferred out as a power supply to power one or more of product urging devices.

8. The system of claim 4, wherein the sensor is selected from the list consisting of a push-button switch, a motion sensor and a magnetic switch, wherein the energy from the electromagnetic receiving resonator is transferred out as a power supply to power one or more of the push-button switch, a motion sensor and a magnetic switch.

* * * * *